US006826405B2

(12) United States Patent
Doviak et al.

(10) Patent No.: US 6,826,405 B2
(45) Date of Patent: *Nov. 30, 2004

(54) APPARATUS AND METHOD FOR INTELLIGENT ROUTING OF DATA BETWEEN A REMOTE DEVICE AND A HOST SYSTEM

(75) Inventors: William Doviak, Pottstown, PA (US); David L. Whitmore, Bethlehem, PA (US); Flex Houvig, Wayne, PA (US)

(73) Assignee: Padcom, Inc., Bethlehem, PA (US)

( * ) Notice: Subject to any disclaimer, the term of this patent is extended or adjusted under 35 U.S.C. 154(b) by 347 days.

This patent is subject to a terminal disclaimer.

(21) Appl. No.: 10/164,581

(22) Filed: Jun. 10, 2002

(65) Prior Publication Data

US 2003/0017845 A1 Jan. 23, 2003

Related U.S. Application Data

(63) Continuation of application No. 08/932,532, filed on Sep. 17, 1997, now Pat. No. 6,418,324, which is a continuation-in-part of application No. 08/456,860, filed on Jun. 1, 1995, now Pat. No. 5,717,737.

(51) Int. Cl.[7] .................................................. H04Q 7/20
(52) U.S. Cl. ..................................... 455/445; 455/552.1
(58) Field of Search ............................ 455/426.1, 453, 455/454, 458, 466, 459, 552.1, 553.1, 556, 557, 445, 517; 379/114, 210, 211, 207, 214, 220, 272, 274, 279; 370/237, 238, 259, 244, 271, 310, 410, 466, 400, 401, 250

(56) References Cited

U.S. PATENT DOCUMENTS 4,697,281 A   9/1987   O'Sullivan
4,833,701 A   5/1989   Comroe et al.
4,837,800 A   6/1989   Freeburg et al.

(List continued on next page.)

FOREIGN PATENT DOCUMENTS

JP   63224422   9/1988
JP   3-32125    2/1991

OTHER PUBLICATIONS

"KeyWareTM—A Wireless Distributed Computing Environment", Racotek White Paper, RACOTEK, Inc., Minneapolis, MN, 1995.

(List continued on next page.)

*Primary Examiner*—Jean Gelin
(74) *Attorney, Agent, or Firm*—Greenblum & Bernstein, P.L.C.

(57) ABSTRACT

An apparatus and method is provided for transparent communication between a remote or mobile device and a fixed communication host network. The apparatus and method may include a remote network controller that logically resides between the host network and the existing infrastructure(s) that are used to provide communications network contact with one or more remote devices. The remote network controller is connected to the host communication network as a protocol-appropriate communications controller so that remote devices are indistinguishable to the host network from the locally-attached devices. Each remote device may be provided with an asynchronous serial data interface to communicate with a mobile data controller. The mobile data controller, in combination with the remote network controller, provides end-to-end data communication such that incompatible protocols are transparent to the remote device and host communication network. A router may be provided which selects a communications network in accordance with user configured parameters. The router communicates over a plurality of incompatible networks and is capable of using a variety of different protocols. Switching between the plurality of incompatible networks is transparent to the remote device and host communication network.

72 Claims, 38 Drawing Sheets

U.S. PATENT DOCUMENTS

| | | | |
|---|---|---|---|
| 4,969,184 | A | 11/1990 | Gordon et al. |
| 4,972,457 | A | 11/1990 | O'Sullivan |
| 4,989,230 | A | 1/1991 | Gillig et al. |
| 5,042,082 | A | 8/1991 | Dahlin |
| 5,127,041 | A | 6/1992 | O'Sullivan |
| 5,173,933 | A | 12/1992 | Jabs et al. |
| 5,212,724 | A | 5/1993 | Nazarenko et al. |
| 5,249,218 | A | 9/1993 | Sainton |
| 5,257,401 | A | 10/1993 | Dahlin et al. |
| 5,260,988 | A | 11/1993 | Schellinger et al. |
| 5,325,362 | A | 6/1994 | Aziz |
| 5,353,334 | A | 10/1994 | O'Sullivan |
| 5,367,563 | A | 11/1994 | Sainton |
| 5,379,448 | A | 1/1995 | Ames et al. |
| 5,404,392 | A | 4/1995 | Miller et al. |
| 5,412,375 | A | 5/1995 | Wood |
| 5,420,574 | A | 5/1995 | Erickson et al. |
| 5,434,863 | A | 7/1995 | Onishi et al. |
| 5,452,471 | A | 9/1995 | Leopold et al. |
| 5,457,680 | A | 10/1995 | Kamm et al. |
| 5,479,480 | A | 12/1995 | Scott |
| 5,504,746 | A | 4/1996 | Meier |
| 5,530,945 | A | 6/1996 | Chavez, Jr. et al. |
| 5,537,220 | A | 7/1996 | Ezumi et al. |
| 5,550,893 | A | 8/1996 | Heidari |
| 5,555,553 | A | 9/1996 | Jonsson |
| 5,559,860 | A | 9/1996 | Mizikovsky |
| 5,564,077 | A | 10/1996 | Obayashi et al. |
| 5,566,236 | A | 10/1996 | MeLampy et al. |
| 5,598,412 | A | 1/1997 | Griffith et al. |
| 5,602,843 | A | 2/1997 | Gray |
| 5,610,905 | A | 3/1997 | Murthy et al. |
| 5,610,974 | A | 3/1997 | Lantto |
| H1641 | H | 4/1997 | Sharman |
| 5,625,673 | A | 4/1997 | Grewe et al. |
| 5,633,873 | A | 5/1997 | Kay et al. |
| 5,659,596 | A | 8/1997 | Dunn |
| 5,673,268 | A | 9/1997 | Sharma et al. |
| 5,697,055 | A | 12/1997 | Gilhousen et al. |
| 5,710,986 | A | 1/1998 | Obayashi et al. |
| 5,717,737 | A | 2/1998 | Doviak et al. |
| 5,732,359 | A | 3/1998 | Baranowsky, II et al. |
| 5,761,623 | A | 6/1998 | Lupien et al. |
| 5,790,554 | A | 8/1998 | Pitcher et al. |
| 5,793,843 | A | 8/1998 | Morris |
| 5,802,483 | A | 9/1998 | Morris |
| 5,825,775 | A | 10/1998 | Chin et al. |
| 5,826,188 | A | 10/1998 | Tayloe et al. |
| 5,828,659 | A | 10/1998 | Teder et al. |
| 5,839,075 | A | 11/1998 | Haartsen et al. |
| 5,870,673 | A | 2/1999 | Haartsen |
| 5,878,344 | A | 3/1999 | Zicker |
| 5,890,054 | A | 3/1999 | Logsdon et al. |
| 5,910,951 | A | 6/1999 | Pearce et al. |
| 5,915,214 | A | 6/1999 | Reece et al. |
| 5,943,333 | A | 8/1999 | Whinnett et al. |
| 5,978,679 | A | 11/1999 | Agre |
| 5,987,011 | A | 11/1999 | Toh |
| 6,032,042 | A | 2/2000 | Kauppi |
| 6,122,514 | A | 9/2000 | Spaur et al. |
| 6,198,920 | B1 | 3/2001 | Doviak et al. |
| 6,449,259 | B1 | 9/2002 | Allain et al. |
| 6,546,425 | B1 | 4/2003 | Hanson et al. |
| 2002/0098840 | A1 | 7/2002 | Hanson et al. |
| 2003/0120811 | A1 | 6/2003 | Hanson et al. |

OTHER PUBLICATIONS

"MAVRIC 2000: Integrated Data and Voice Communications System", MAVRIC 2000 Performance Specifications Brochure, Metric Systems Corp., Acton, MA, 1991.

"RacoNet: Mobile Data Communication Services Product Catalog," Rev. 1.03, RACOTEK, Inc., Minneapolis, MN, 1993.

"Racotek: Design Considerations for Mobile Data Applications", Racotek 400–0054–00, RACOTEK, Inc., Minneapolis, MN, Jan. 1993.

"RacoNet: Mobile Data Communications Services Price List", Rev. 1.03, RACOTEK, Inc., Minneapolis, MN, 1993.

"MPS II System Component: Mobile System Printer", Racotek Sales Brochure, RACOTEK, Inc., Minneapolis, MN, Feb. 1990.

"MPS II System Component: Mobile System Data Terminal", *Racotek* Sales Brochure, RACOTEK, Inc., Minneapolis, MN, Feb. 1990.

"MPS II Component: Adaptive Network Modem", Racotek Sales Brochure, RACOTEK, Inc., Minneapolis, MN, Feb. 1990.

"Racotek Overview", RACOTEK, Inc., Minneapolis, MN, 1993.

"Unify Your Mobile Data Communications with RacoNet", Racotek Sales Brochure, RACOTEK, Inc., Minneapolis, MN, 1992.

"The Race is Won by the Fleet", Racotek Sales Brochure, RACOTEK, Inc., Minneapolis, MN, publication date unknown.

*Datalines*, vol. 5, No. 2, RACOTEK, Inc., Minneapolis, MN, Apr. 1993.

*Datalines*, vol. 5, No. 3, RACOTEK, Inc., Minneapolis, MN, Sep. 1993.

*Datalines*, vol. 6, No. 1, RACOTEK, Inc., Minneapolis, MN, Feb. 1994.

"RACOTEK/HDC: Operations Booklet for Mobile Data Terminals", RACOTEK, Inc., Minneapolis, MN, 1993.

SHPANCER et al., "Open Data–On–Voice Systems for SMRs", RACOTEK—Radio Computer Technologies, presented at NABER's 1990 Annual Meeting, May 9–12, Tampa, FL, 1990.

"How to Hold Together a Business that Heads Off in Every Direction", RaCoNet Networking Software, Racotek Sales Brochure, RACOTEK, Inc., Minneapolis, MN, publication date unknown.

Robert J. Fraser, "The MTS–Part II", *Communications*, pp. 52–55, Aug. 1991.

"Wireless Data Communications and RAM Mobile Data", RAM Mobile Data Sales Brochure, RAM Mobile Data U.S.A., 1992.

"RAM Mobile Data: Field Service", RAM Mobile Data Sales Brochure, RAM Mobile Data U.S.A., 1992.

"Market Opportunities for System Integrators, Mobile Data Terminal Manufacturers, Radio and Modem Manufacturers, and Software Developers", RAM Mobile Data Sales Brochure, RAM Mobile Data U.S.A., publication date unknown.

*On the Air*, a quarterly publication of ARDIS, Lincolnshire, IL, vol. 3, Spring 1993.

*On the Air*, a quarterly publication of ARDIS, Lincolnshire, IL, vol. 4, Jul. 1993.

*On the Air*, a quarterly publication of ARDIS, Lincolnshire, IL, vol. 5, Fall 1993.

Robert B. Euler, "Making the Mobile Communications Connection", *MSM Magazine*, Jun. 1990.

"ARDIS Marks First Birthday of Network Operation", ARDIS News Release, ARDIS, Lincolnshire, IL, Apr. 1991.

"ARDIS Extends its Reach into Canada", ARDIS News Release, ARDIS, Lincolnshire, IL, Feb. 1992.

"ARDIS Focuses on Sales Force Automation", ARDIS News Release, ARDIS, Lincolnshire, IL, Oct. 1993.

"ARDIS Sets the Standard for Wireless Data Communications", ARDIS News Release, ARDIS, Lincolnshire, IL, publication date unknown.

"How Does One Overnight Delivery Service Guarantee Overnight Success?", ARDIS Sales Advertisement, ARDIS, Lincolnshire, IL, publication unknown.

"ServiceXpress", ARDIS Sales Brochure, ARDIS, Lincolnshire, IL, publication date unknown.

"ARDIS is the First Radio Frequency Network for the Motorola Envoy Wireless Personal Communicator", *Communication by Ardis*, ARDIS Sales Brochure, ARDIS, Lincolnshire, IL, publication date unknown.

"ARDIS", Company Profile Brochure, ARDIS, Lincolnshire, IL, publication date unknown.

"ARDISmailSM 100: The Wireless E–Mail Package", ARDIS Sales Brochure, ARDIS, Lincolnshire, IL, publication date unknown.

"Congratulations. You Have the Sale!", ARDIS Sales Brochure, ARDIS, Lincolnshire, IL, publication date unknown.

"Wireless Solutions Can Mean the Difference . . . ", ARDIS Sales Brochure, ARDIS, Lincolnshire, IL, publication date unknown.

"Achieving the Highest Level of Productivity with New Thinking and a New Vision", ARDIS Sales Brochure, ARDIS, Lincolnshire, IL, publication date unknown.

Form S–1 Registration Statement of RACOTEK Inc. (with exhibits), as filed with the Securities and Exchange Commission on Oct. 22, 1993.

Amendment No. 1 to Form S–1 Registration Statement of RACOTEK Inc., as filed with the Securities and Exchange Commission on Nov. 4, 1993.

Ericsson GE, "Mobile Data System Evolution", publication date unknown.

Ericsson GE, "Mobile Data Questions & Answers", dated Mar. 3, 1994.

Ericsson GE, "Private Radio Systems EDACS® Data Advantage™ Technical Description", publication date unknown.

Motorola, Inc., "Integrated Voice and Data System Description", publication date unknown.

Motorola, Inc., "VRM–100 Vehicular Radio Modem", publication date unknown.

Motorola Private Systems Division Land Mobile Products Sector, "VRM 100 Vehicular Radio Modem For Integrated Voice; and Data Operation on Smartnet and SmartZone Trunked Radio Systems and Conventional Radio Systems—Product Description", Apr. 5, 1994.

Motorola Mobile Data Division, "RPM Native Mode Interface R1.1 Reference Manual", published Sep., 1992.

English Language Abstract of JP 63–224422.

English Language Abstract of JP 3–32125.

Johnson, David, "Protocols for Adaptive Wireless and Mobile Networking", *IEE Personal Communcations*, vol. 3, No. 1, pp. 34–42, Feb. 1996.

Hills, Alex et al., "A Wireless Data Network Infrastructure at Carnegie Mellon University", *IEE Personal Communications*, vol. 3, No. 1, pp. 56–63, Feb. , 1996.

Johnson, David B., "Scalable Support for Transparent Mobile Host Internetworking", *Wireless Networks*, vol. 1, No. 3, pp. 311–321 (1995).

Johnson, David B., "Scalable and Robust Internetwork Routing for Mobile Hosts", 14th International Conference on Distrbuted Computing Systems, Jun. 21–24, 1994, Pozman, Poland.

Johnson, David B., "Ubiquitous Mobile Host Internetworking", *Proceedings of the Fourth Workshop on Workstation Operating Systems*, IEEE Computer Society, Oct. 1993.

Perkins, Charles et al., "IMHP: A Mobile Host Protocol for the Internet", *Computer Networks and ISDN Systems*, vol. 27, No. 3, pp. 479–491 (1994).

Johnson, David B., "Mobile Host Internetworking Using IP Loose Source Routing", Carnegie Mellon University, School of Computer Science (1993).

Perkins, Charles et al., "Mobility Support in IPv6", *Proceedings of the Second Annual International Conference on Mobile Computing and Networking (MobiCom '96)*, Nov. 10–12, 1996.

Solomon, J., "Applicability Statement for IP Mobility Support", The Internet Engineering Taskforce, RFC 2005, Oct. 1996.

Thyfault, M., "Wireless has a Support Act—Carriers at Comdex Tout Applications for Cellular Digital Packet Data," *Information Week* (1993). Available from DIALOG Corporation.

Wexler, J., "CDPD Spec Could Embrace Analog Nets," *Network World* vol. 12, No. 13 (Mar. 1995): pp. 17, 24. Available from DIALOG Corporation.

"Hybrid Cellular Data Technology in Works," *Telecommunications Alert* vol. 12, No. 222 (Nov. 1995). Available from Lexis.

Schwartz, J., "GTE Mobilnet Retrofits CDPD Network to Connect with Analog Cellular," *Communications Week* (1996): p. 53. Available from DIALOG Corporation.

"GTE Closer to Installing Circuit Switched–CDPD Gateway;Plans to Offer National 'CDPD Access'via '800' Number Service," *Wireless Data News*, vol. 4, Issue 6 (Mar. 1996). Available from DIALOG Corporation.

Washburn, B., "CDPD: The Tower of Power," *America's Network* (Aug. 1996): p. 42. Available from Lexis.

Steward, S., "A circuitous Route to CDPD Expansion; Cellular Digital Packet Data," *Cellular Business* vol. 13, No. 9 (Sep. 1996): p. 102. Available from Lexis.

"Sierra Wireless Adds CS–CDPD," *Business Wire* (Jan. 1997), Available from World Wide Web: (http://www.sierrawireless.com/news/cdpd.html), downloaded Mar. 12, 2002.

Sukow, R., "GTE Wireless's CS–CDPD Technology Will Be Commercially Available Feb. 3" *Communications Today* (Jan. 1997). Available from DIALOG Corporation.

"Wireless: GTE, Hughes Network Systems and PCSI Join to Provide Nationwide Wireless Access for 'Super Phones,' Other Intelligent Devices," *EDGE, on & about AT&T* (Feb. 1997). Available from DIALOG Corporation.

Pate, K.,"CS–CDPD May Solve Wireless Data User Problem with Coverage (Circuit Switched–Cellular Digital Packet Data Is Launched to Allow Data Users to Access CDPD Functionality Across an Entire Network)," *RCR Radio Communications Report* vol. 16, No. 5 (Feb. 1997):p. 2. Available from DIALOG Corporation.

"GTE Wireless Launches Long–Anticipated CS–CDPD Service; Other Cellular Carriers Continue to Reject Hybrid Approach," *Wireless Data News*, vol. 5, Issue 3 (Feb. 1997). Available from DIALOG Corporation.

"Industry News: CS–CDPD Goes Nationwide," *Advanced Transportation Industry Review*. (May 1997). Available from DIALOG Corporation.

"Dueling Realities: Cellular Data Developers Struggle to Build Business, Yet Foresee Future Consumer, Ad–Supported Market," *Wireless Data News*, vol. 5, Issue 11 (May 1997). Available from DIALOG Corporation.

"GTE Wireless Offers National Access for 'Super Phones'," *Cellular Business* (Jun. 1997). Available from DIALOG Corporation.

Morris, J., "Guide to Wireless Data Networks," Sierra Wireless, (Jul. 1997), available on the World Wide Web: (http://www.ofb.net/heath/ardis/2110152.pdf).

"GTE, Sierra Announce CDPD Solution (GTE Wireless and Sierra Wireless Introduced a Circuit Switched Cellular Digital Packet Data Solution)," *RCR Radio Communications Report* (Jun. 1998):p. 8. Available from DIALOG Corporation.

"GTE, Sierra Wireless Bring Circuit–Switched CDPD to Indiana Law Enforcement," *Wireless Data News*, vol. 6, Issue 15 (Jul. 1998). Available from DIALOG Corporation.

"Sierra Modem Adds Coverage (Indiana State Police Department is the First in US to Use New Circuit–Switched CDPD Modem from Sierra Wireless," *Wireless Week* (Jul. 1998):p. 14. Available from DIALOG Corporation.

"GTE and Sierra Wireless Extend Reach of Cellular Digital Packet Data Networks Nationwide," Available from World Wide Web: (http://www.sierrawireless.com/news/gte&swi.html), downloaded Mar. 12, 2002.

"MP215: The First Ever CS–CDPD 3W Modem. (End–to–end wireless IP anywhere—Automatically)," Tri–M Systems, Coquitlam, B.C., Canada.

"CS–CDPD," Available from World Wide Web: (http://www.sierrawireless.com/alliance/nettech_cscdpd.asp.), downloaded Mar. 12, 2002.

"Circuit Switch Cellular Digital Packet Data," Available from World Wide Web: http://www.leapforum.org/published/internetworkMobility/split/node91.html), downloaded Mar. 18, 2002.

"MP215 Modem Installation,Configurarion, and User's Guide,"Revision 1.0, Part No. 2110036, Sierra Wireless, Jun. 1998.

"Where There's Voice, There's Now Cost–effective Data with Lucent Technologies' New Circuit Switched CDPD Capability," Lucent Technologies, Jun. 1996.

Hunt, Craig, "TCP/IP Network Administration" O'Reilly & Associates, Inc., pp. 28–35 (1992).

Chen, J.B. et al., "MOSS: A Mobile Operating System Substrate", Harvard University Division of Applied Sciences, May 1995.

Baker, M., "Changing Communication Environments in MosquitoNet," Proceedings of the IEEE Workshop on Mobile Computing Systems and Applications, Dec. 1994.

Cheshire, S. et al., "Internet Mobility 4×4", Proceedings of SIGCOMM '96, Stanford California, Aug. 1996.

Cheshire, S. et al., "Experiences with a Wireless Network in MosquitoNet", Proceedings of the IEEE Hot Interconnects Symposium '95, Aug. 1995.

Zhao, X. et al., "Flexible Network Support For Mobility," Proceedings of the Fourth Annual ACM/IEEE International Conference on Mobile Computing and Networking (MobiCom 1998), Dallas Texas, Oct. 1998.

Baker, M. et al., "Supporting Mobility In MosquitoNet," Proceedings of the 1996 USENIX Technical Conference, San Diego, California, Jan. 1996.

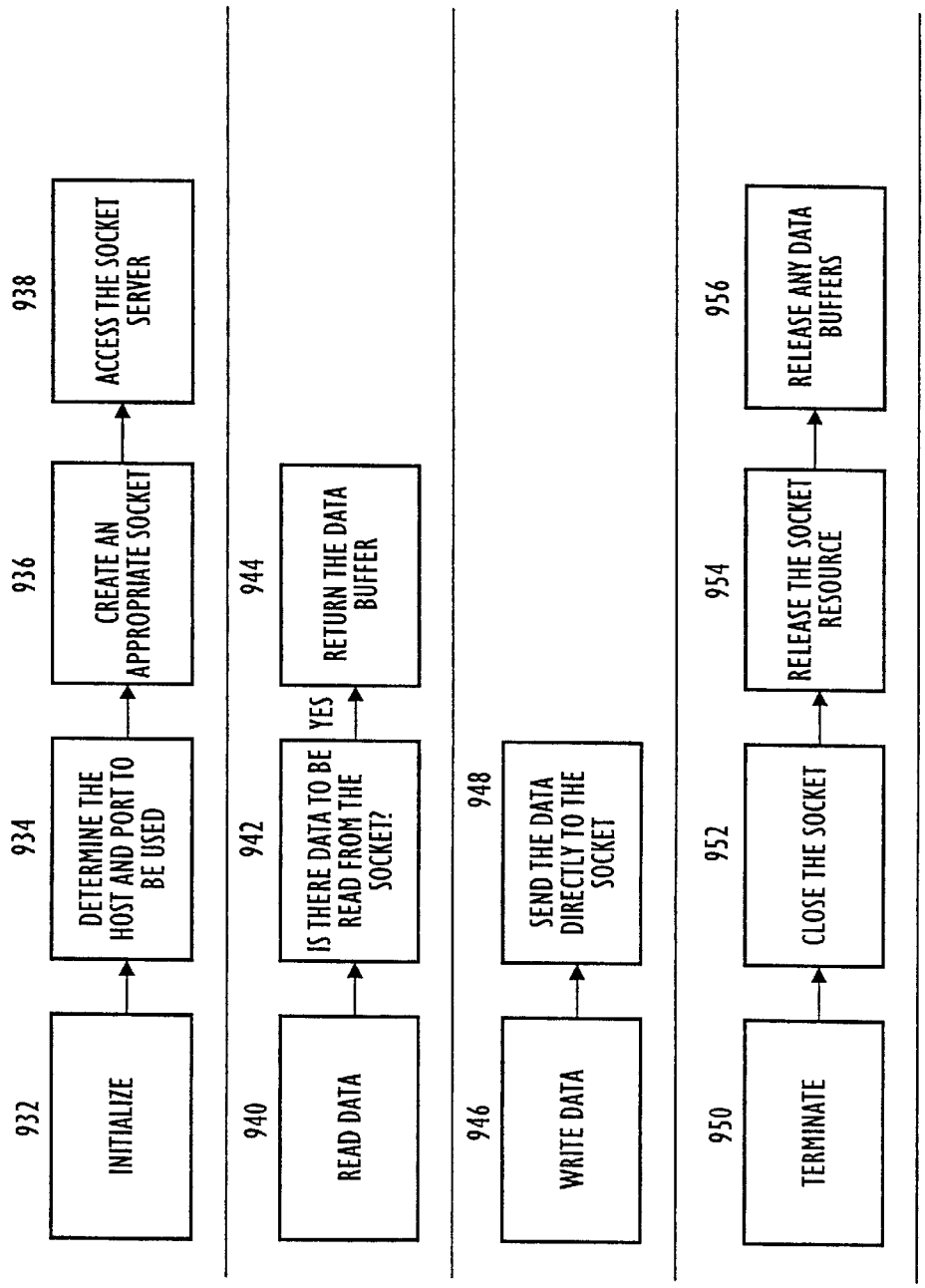

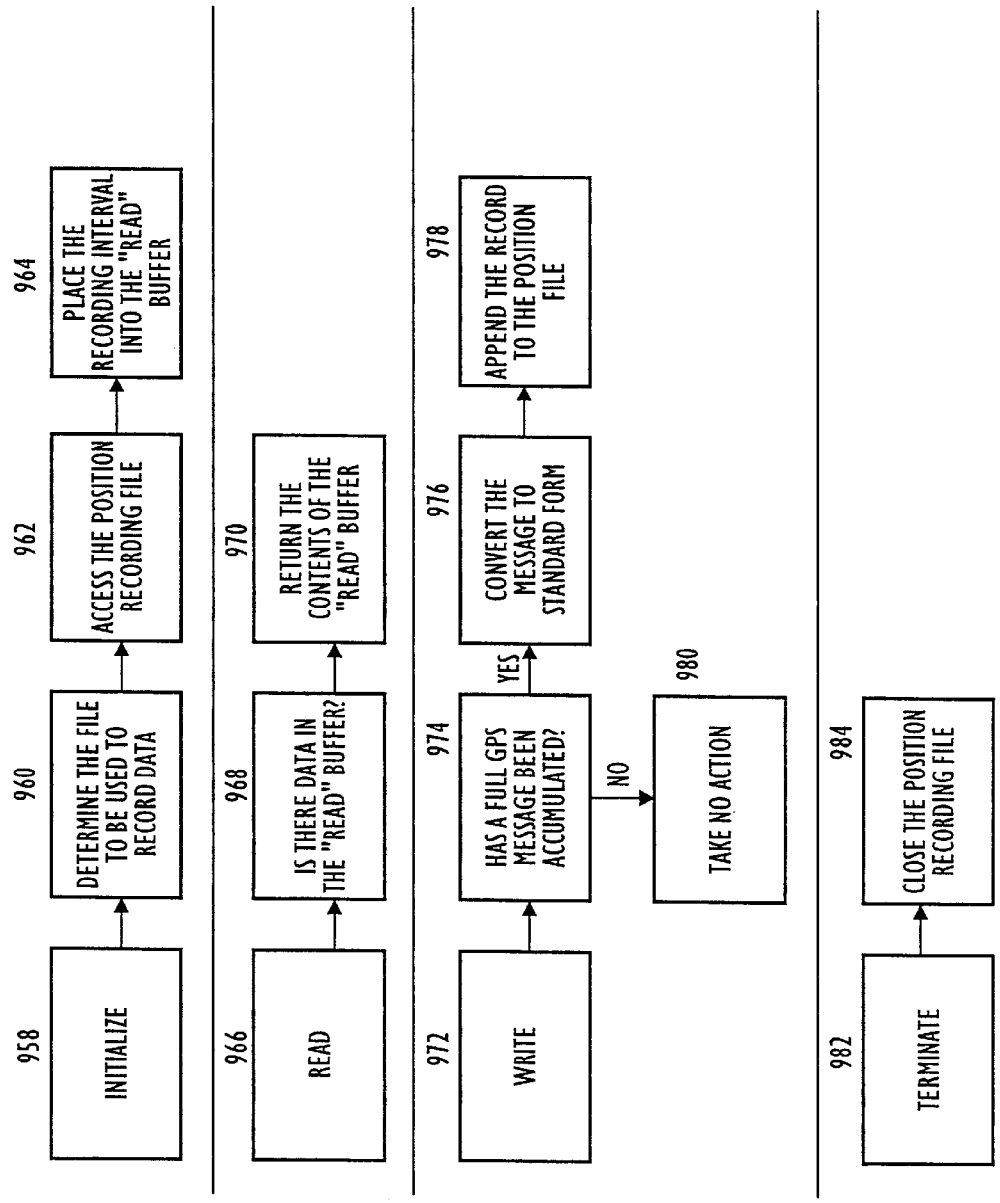

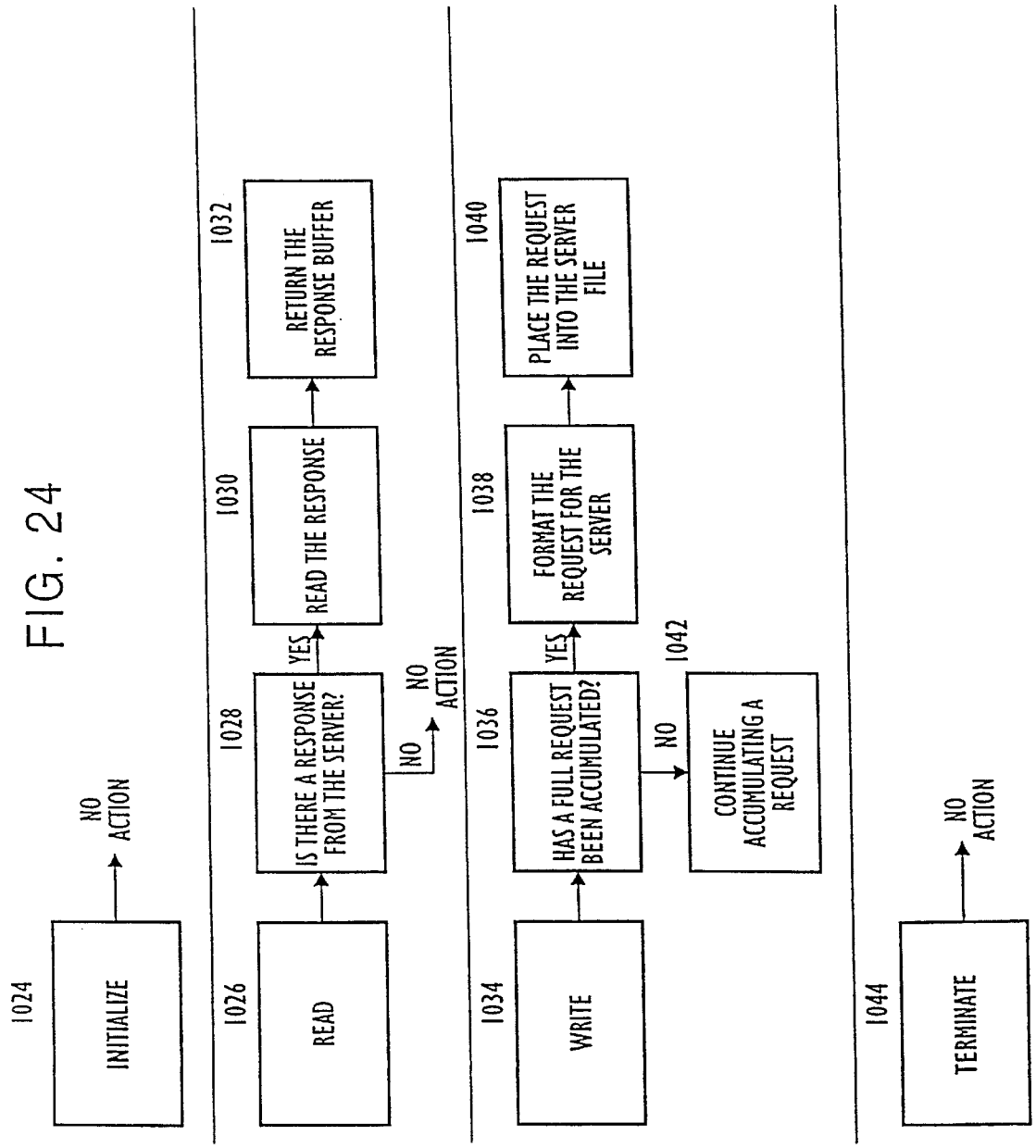

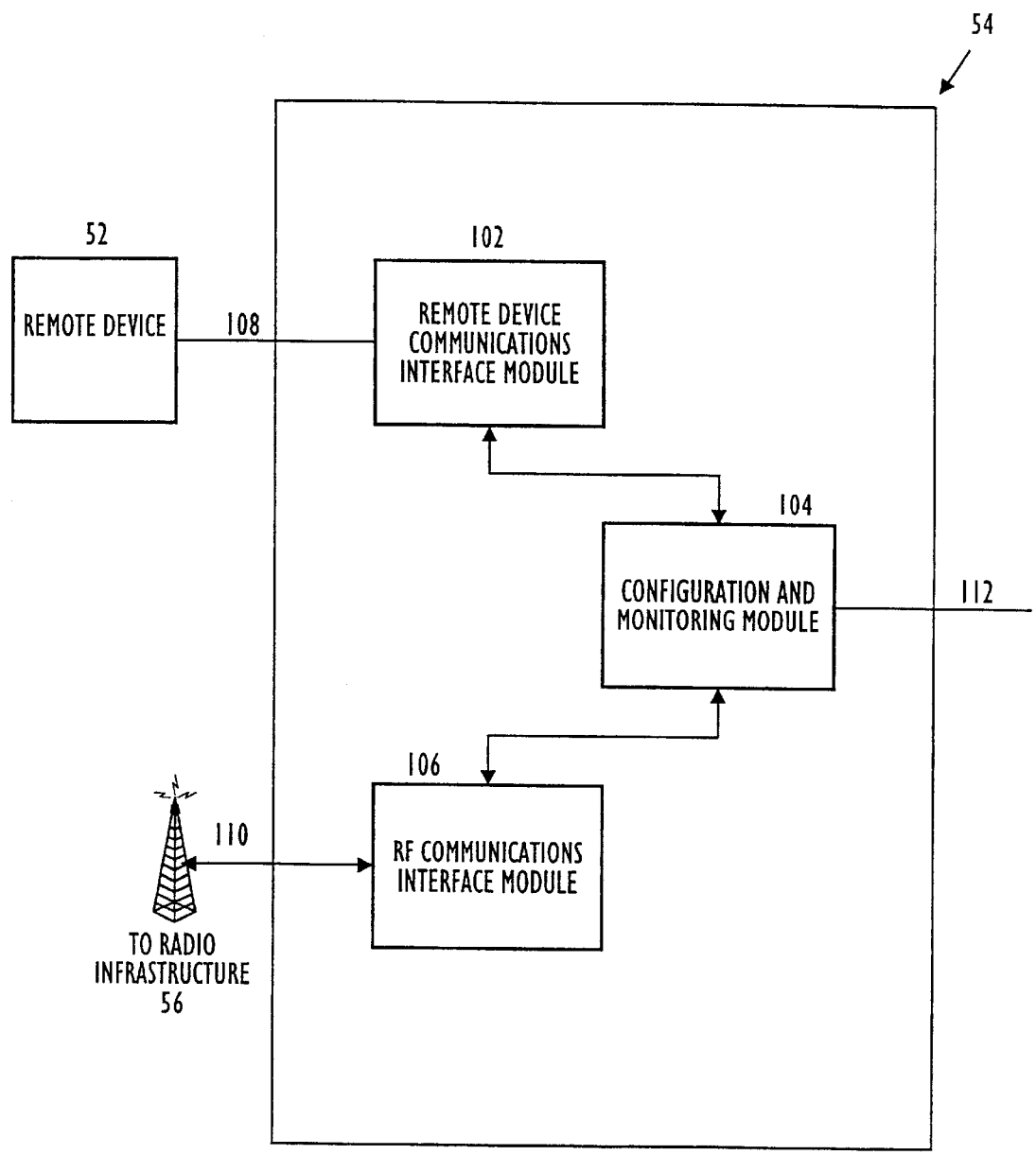

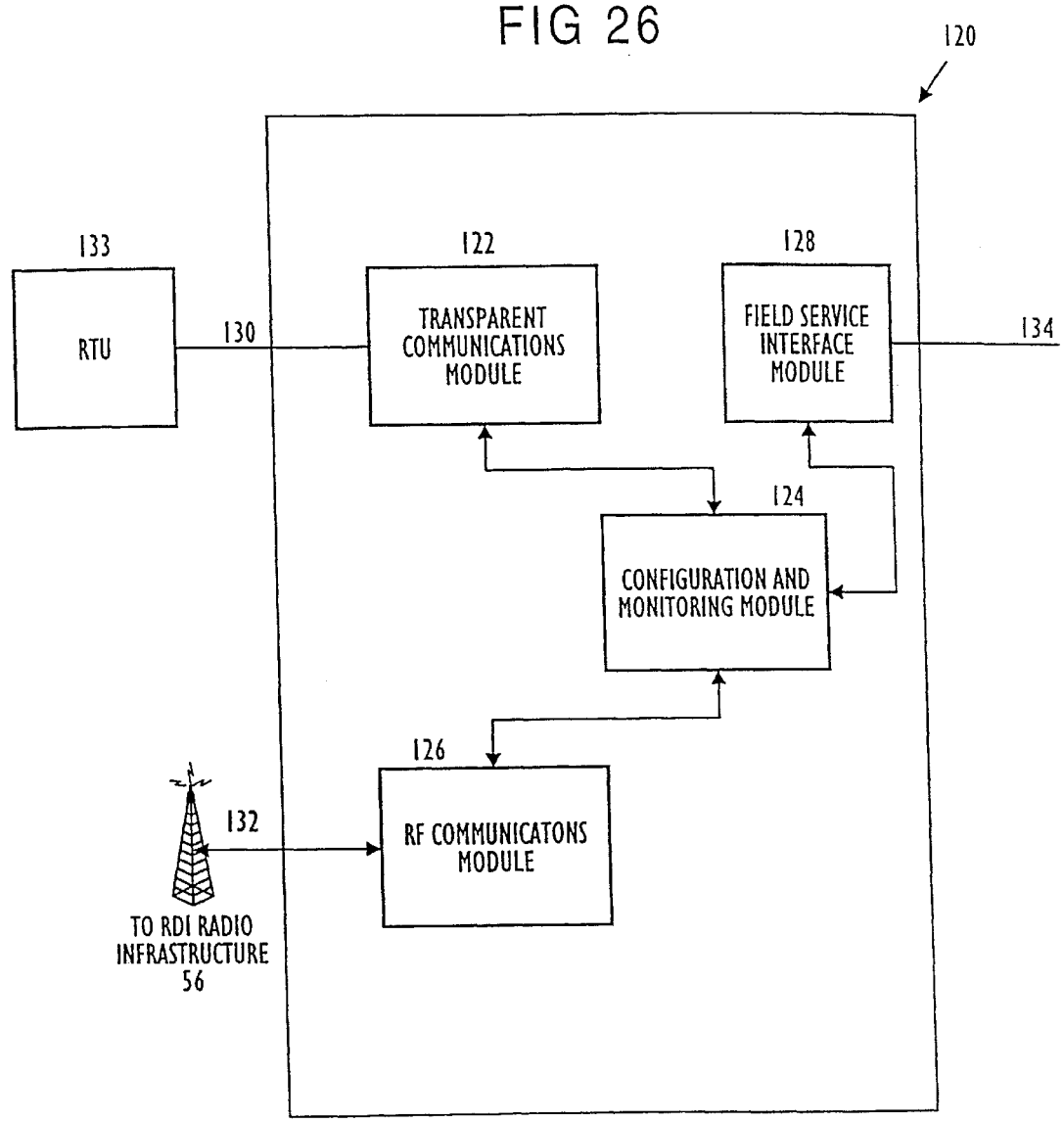

APPARATUS AND METHOD FOR INTELLIGENT ROUTING OF DATA BETWEEN A REMOTE DEVICE AND A HOST SYSTEM

CROSS-REFERENCE TO RELATED APPLICATION

This is a continuation of U.S. application Ser. No. 08/932,532, filed on Sep. 17, 1997, now U.S. Pat. No. 6,418,324, which is the Continuation-In-Part of U.S. application Ser. No. 08/456,860, filed Jun. 1, 1995 (now U.S. Pat. No. 5,717,737), the contents of which are expressly incorporated by reference herein in their entireties.

BACKGROUND OF THE INVENTION

1. Field of Invention

The present invention relates to the transportation of data through dissimilar communications media. More particularly, the present invention relates to an apparatus and method for transporting data between a remote mobile or fixed terminal device and a host system over multiple, dissimilar communications media. The communications media over which the data is transported include wireless data links, wired data links or a combination of wireless and wired data links which are selected based upon a set of preference metrics.

2. Background Information

The ability to transport data between mobile and/or fixed terminal devices and host computer systems have been generally available for many years. Networks designed to transport this data currently exist in a wide variety of wireless and wired network architectures. Both apparatus and method exists for transporting data through multiple, similar media types as well as the automatic selection of alternate communication paths based upon a plurality of preference metrics.

Often, when multiple networks are available from a common location such as a vehicle, great benefit may be derived by allowing uniform communications through all available networks. Certain networks may perform better for bulk data transfers where another may perform interactive messaging in an optimal fashion. One network may be preferable because of its low cost but an alternate, more expensive network may be acceptable as a backup if the low-cost network is unavailable.

Other examples include U.S. Pat. No. 5,412,375, to WOOD, which discloses a system for selecting one of a plurality of interfaces to a single wireless communications system in accordance with the capabilities of a subscriber unit and the capabilities of a base unit. A list of air interface capabilities of the subscriber unit and the base unit are compared by a controller to determine a compatible interface. As disclosed in WOOD, the plurality of air interfaces include Analog Mobile Phone System (AMPS), Time Division Multiple Access (TDMA) and Code Division Multiple Access (CDMA). While the WOOD system does select from one of a plurality of interfaces which may be applicable for data communication, the routing decision is based on the capabilities of the endpoints rather than the preference metrics of the transporting networks. The endpoint devices, in this case, must be aware of the peculiarities of the wireless environment.

U.S. Pat. No. 5,420,574, to ERICKSON et al., discloses a subscriber unit attached to a trunked mobile radio having a data input. The mobile radio communicates both voice and data message formats over a wireless network to a base station via channels that are allocated by a trunked data controller which is connected to a host network. Channel states and communication parameters are set in accordance with the type of information (e.g., voice or data) that is being transmitted or received. While the ERICKSON et al. system dynamically switches between incompatible message formats without the intervention of the endpoint devices, only a single data path is provided. In addition, the incompatibility of the two alternate paths arises from a difference in message formats rather than the use of independent, incompatible networks.

Further, the transportation of data through alternate, incompatible communications media is a problem that does not have a uniform solution in the art. This problem is exacerbated in wireless communication networks where protocols, timing and other incompatibilities render an otherwise acceptable level of service inadequate. Attempts to provide data links through incompatible networks have suffered from the same obstacles that hindered data communications prior to open standards becoming widely accepted, i.e., proprietary protocols visible to the endpoint terminal devices make the devices inflexible and expensive and the interoperation of similar devices with incompatible networking components is difficult and complex.

Networks may be interconnected by routers which operate at the network level and convey messages between compatible networks. Routers make logical decisions about the pathway through which data is to be directed in the networks based upon a variety of preference metrics. A router is generally implemented as an autonomous device with multiple connections to the networks through which data is to be routed. Routers operate at the network layer and can recognize and manage protocols and multiple connections to networks. Routers usually operate in accordance with the address provided by the particular protocol of the network, and normally provide routing between and through networks utilizing the same network protocol and can route between networks that use different data-link layers, such as Ethernet, Token-Ring, Serial PPP, etc. Another type of router includes two routers loosely-coupled through a protocol-neutral datalink, where the linked routers are considered as a single "virtual" router.

Dissimilar networks may be connected by gateways which are devices that interconnect two or more dissimilar networks. A gateway differs from a router in that the endpoint terminal devices may implement a dissimilar or incompatible protocols. Gateways often perform specific protocol conversions at the layers above the network layer to move data from one type of network to another. In this regard, the Open Systems Interconnection (OSI) model includes seven "layers" to provide communications between heterogeneous (i.e., incompatible) systems. The layers, from lowest to highest, are: the physical layer, the data link layer, the network layer, the transport layer, the session layer, the presentation layer, and the application layer. Each of the layers performs a specific task in transporting data between two or more entities. Such a layered structure is shown in *The TCP/IP Companion*, by Martin R. Arick, Wiley-QED, pp. 18–19.

U.S. patent application Ser. No. 08/456,860, to DOVIAK et al., for example, discloses a system in which a distant mobile or fixed terminal device transports data through a plurality of wireless network to an endpoint which may or may not implement the same network protocol as the distant device. However, while the DOVIAK et al. system is capable transmitting data over a plurality of dissimilar wireless communications networks, the system does not automatically transmit data through differing ones of a plurality of dissimilar networks in accordance with preference metrics to reach the data-link endpoints. Thus, the system does not automatically provide redundant or alternate pathways through which data may be delivered.

U.S. Pat. No. 5,537,220 to EZUMI et al., discloses a portable facsimile apparatus provided with a capability to communicate over a plurality of communications lines. As disclosed in EZUMI et al., the facsimile machine may communicate over telephone lines or a mobile communication unit. A NCU (controller) is provided within the facsimile machine to discriminate whether the facsimile machine is connected to the telephone line or to the mobile communication unit. The NCU functions to adjust the data rate, and transmitting and receiving signal levels based on which communication system it is communicating. Although this concept may be extended to a generic protocol-neutral data networking environment, the EZUMI et al. system provides for the selection of only one single path to the exclusion of other, possible viable path based solely on which link is plugged into the NCU. Further, the EZUMI et al. system does not switch communication paths within the boundaries of a communication session thereby further limiting its usefulness in a connectionless, packet data environment such as a TCP/IP network.

U.S. Pat. No. 5,602,843, to GRAY, discloses a PBX-based integrated telecommunications system having a wired subsystem connected to wired terminals, and a wireless system for connecting to mobile terminals. A controller is provided which manages base stations and communicates to wireless handsets. When communicating to a handset, the controller determines which base station is in communication with the handset and directs the base station to send packet-based information to that handset. A separate PBX controller is provided to communicate with the wired terminals. The PBX controller includes a proximity sensor to detect wireless handsets such that when a handset is detected in proximity to a wired terminal, messages are forwarded to the wired terminal rather than the wireless handset. While the GRAY system dynamically selects the route to a terminal device based upon a preference metric (wireless proximity), the alternate routing technique does not address transporting data between the same two endpoints. In addition, GRAY provides no means to provide alternate path routing for a terminal device through either the wireless or wired handsets.

U.S. Pat. No. 5,452,471, to LEOPOLD et al., discloses a communication system having a primary and one or more subordinate communication systems. In the illustrated embodiment, the primary communication system is a satellite-base communication system having the widest area of coverage. Each of the satellites within the system defines a cell area which moves as the orbiting satellites move. The secondary and tertiary communications systems are disclosed as terrestrial based, stationary systems having base stations fixed near the surface of the earth (e.g., fixed to a building), where each subordinate system has an increasingly smaller region of coverage. The secondary and tertiary systems include a controller located at a monitoring location within each region. Each of the communications systems includes a link to a central office to enable communications over the public switched telephone network. The LEOPOLD et al. communication systems and mobile subscriber units operate within one frequency spectrum, however, the primary and secondary communication systems operate together by using orthogonal channels to prevent interference. In addition, when communicating with secondary systems, the mobile subscriber unit transmits at a relatively low power such that the primary system will not receive the transmission. The mobile subscriber unit is programmed to utilize the communication system having the smallest area of coverage such that if the subscriber unit has three communications systems available, the subscriber unit will utilize the tertiary communications system (i.e., the system having the smallest area of coverage) based on a designed assumption that the more subordinate the communication system is, the higher the capacity of the system. While the system of LEOPOLD et al. dynamically selects a route based upon a set of preference metrics such that the terminal endpoints are unaware of the routing selection, a common data-link protocol is required throughout all possible associated networks. In addition, the wireless frequencies employed must be derived from a continuous, compatible set of frequencies which prevents the device from selecting among inherently incompatible networks.

Despite the teachings of these prior attempts, users of mobile or fixed wireless data communications are provided with systems of limited capacity and flexibility when routing data through more than one network. In addition, such systems require special hardware and/or software developed for and compatible with the networks, which may require additional training of support personnel and end-users. Further, users of wireless mobile data communication services are provided with only a limited ability to control costs associated with sending and receiving data to and from remote devices, and are limited in their hardware and software design implementations. In previous teachings, the candidate networks must be compatible with one another at either the network or the data-link level. Thus, routing data through inherently incompatible networks such as Cellular Digital Packet Data (CDPD) and Ericsson EDACS is not possible as these are incompatible at both the data-link and network levels. Moreover, known systems do not allow a customer to use existing RF wireless infrastructures, including existing hardware and software, with only minor modifications needed to transport data from a mobile device to a host computer network. In addition, past attempts do not permit wireless data communications in a manner that is transparent to the remote device. Further, prior systems do not provide the flexibility to users such that a plurality of different remote devices may communicate with the wired host network irrespective of the radio infrastructure and transmission protocol employed. Such features, without the above-noted drawbacks, would be highly desirable to provide flexibility and ease of use, and to give users of portable data devices greater control over their hardware and software design.

SUMMARY OF THE INVENTION

In view of the foregoing, the present invention, through one or more of its various aspects, embodiments and/or specific features or sub-components thereof, is thus presented to bring about one or more objects and advantages, such as those specifically noted below.

A general object of the present invention is to provide an apparatus and method for transporting data from a remote, wireless device to a wired network. Another object of the invention is to provide a remote device with an interface to present data to the wired network through RF wireless communication.

More particularly, an object of the present invention is to provide an apparatus that resides between an existing wired communications network and an existing radio-frequency network to provide a wireless RF connection between a remote device and the wired network.

Another object of the present invention is to provide an apparatus and method for a completely transparent data path between a remotely located device and an existing wired network using a wireless RF communications link without either the remote device, or the wired network being aware that a wireless RF communications link is being employed.

Still another object of the present invention is to provide an apparatus and method for a completely transparent data path between a remotely located device and an existing wired network through a plurality of different wireless RF communications link protocols and a plurality of different wired networks protocols selected by the user.

Still another object of the present invention is to provide an apparatus which functions as a protocol-appropriate communications controller and makes remote devices indistinguishable from locally attached devices to a wired network.

According to one aspect of the present invention, an apparatus for transporting data between a remote device and a host communication network using a wireless communications link is provided. The apparatus comprises a mobile data controller connected to the remote device and the wireless communications link. The mobile data controller comprises a remote data conversion means for converting data to be transported between the remote device and the host communication network. The remote data conversion means converts the transported data between a remote device transmission format utilized by the remote device and a wireless link transmission format utilized by the wireless communications link.

The apparatus also comprises a network interface means for interfacing the host communication network with the wireless communications link. The network interface means comprises a wireless link conversion means for converting the transported data between the wireless link transmission format and a network interface format utilized by the network interface means; and a host network conversion means for converting the transported data between the network interface format and a host network format utilized by the host communication network.

The apparatus further comprises a means for transporting the transported data over the wireless communication in accordance with the wireless link transmission format, the wireless link transmission format and the host network format being incompatible. According to another aspect of the present invention, the network interface means comprises a remote network controller that logically resides on the host communication network and performs the functions of a network communication controller.

According to another aspect of the present invention, the apparatus for transporting data further comprises a plurality of network interface means connected by a local network and a synchronization means for synchronizing the transfer of information between the network interface means, the information comprising routing tables and health and status information.

According to the present invention a method of transporting data from a mobile device to a host network is provided. The remote device and a wireless communications link are connected by a mobile data controller, and the host communication network and the wireless communications link being interfaced by a network interface device.

The method includes the steps of: converting, at the mobile data controller, data to be transported between the remote device and the host communication network, the converting step converting the transported data between a remote device transmission format utilized by the remote device and a wireless link transmission format utilized by the wireless communications link; transporting the transported data over the wireless communications link in accordance with the wireless link transmission format; receiving, at the network interface device, the transport data from the wireless communications link; converting, at the network interface device, the transported data between the wireless link transmission format and a network interface format utilized by the network interface device, the wireless link transmission format and the host network format being incompatible; further converting, at the network interface device, the transported data between the network interface format and a host network format utilized by the host communication network; and forwarding the transported data to the host communication network in accordance with the host network format.

In a preferred embodiment, the transportation step further comprises determining wireless communications link selection criteria; dynamically selecting a wireless communications link from a plurality of incompatible wireless communications links in accordance with the selection criteria; and switching to the selected wireless communications link. Afterwards, the following steps are continuously repeated: dynamically selecting a next wireless communications link from the plurality of incompatible networks in accordance with the selection criteria; determining whether to switch wireless communications links; and switching to the next wireless communications link in response to a result of the determination.

According to another aspect of the present invention, an apparatus for transporting data over a plurality of incompatible networks between a first device and a second device is provided. The apparatus comprises a system for determining network selection criteria. In addition, the apparatus comprises a selection system for dynamically selecting a network from the plurality of incompatible networks in accordance with the network selection criteria and a switching system for switching to the selected network to use for data transport.

According to another aspect of the present invention, the apparatus transports data via a plurality of protocols over a plurality of incompatible networks in which the transportation of data is transparent to the first and second devices and to an end user. The protocols may include but are not limited to Internet Protocol (IP) and transparent protocol.

According to another aspect of the present invention, the apparatus for transporting data further comprises a system interfacing protocolized data into a plurality of incompatible networks using different protocols.

According to another aspect of the present invention, the switching system switches networks during the time between the transport of consecutive data packets.

According to another aspect of the present invention, the system for determining network selection criteria uses two classes of parameters to determine the next network to use for transport of data.

According to another aspect of the present invention, the selection system further determines a next network to switch to from the plurality of incompatible networks in accordance with the network selection criteria, when the selected network becomes unavailable. In addition, a monitoring system is provided which monitors the availability of the incompatible networks to determine whether the next network is available for data transport.

According to yet another aspect, a method is provided for dynamically routing data over multiple dissimilar parallel wireless networks that are each monitored for status information. The method includes maintaining a priority of each wireless network. The priorities indicate a most preferred path. The method also includes determining availability of each wireless network based upon status information associated with each wireless network. The method also includes indicating a current most preferred network from the wireless networks determined to be available, the indication being based upon the network priorities. The method further includes switching from a current network, which is dissimilar from the current most preferred network, to the current most preferred network during a transmission. At least one of the current network and current most preferred network is time continuous. The method also includes remaining connected to the current network for a period of time after switching to the current most preferred network.

In another aspect, a computer readable medium storing a program is provided for dynamically routing data over multiple dissimilar parallel wireless networks that are each monitored for status information. The medium includes a priority code segment that maintains a priority of each wireless network. The priorities indicate a most preferred path. The method includes an availability code segment that determines availability of each wireless network based upon status information associated with each wireless network; and an indicating code segment that indicates a current most preferred network from the wireless networks determined to be available. The indication is based upon the network priorities. The medium further includes a switching code segment that switches from a current network, which is dissimilar at a link layer from the current most preferred network, to the current most preferred network during a transmission while remaining connected to the current network for a period of time after switching to the current most preferred network.

In yet another aspect, a router is provided for dynamically routing data over multiple dissimilar parallel wireless networks that are each monitored for status information. The router includes a priority system that maintains a priority of each wireless network, the priorities indicating a most preferred path. The router also includes multiple transmitters, each transmitter operating with one of the wireless networks. The router further includes a determining system that determines availability of each wireless network based upon status information associated with each wireless network, and an indicator that indicates a current most preferred network from the wireless networks determined to be available. The indication is based upon the network priorities. The router also includes a switch that switches from a current network, which is dissimilar from the current most preferred network, to the current most preferred network during a transmission while remaining connected to the current network for a period of time after switching to the current most preferred network.

In still another aspect, a computer readable medium is provided for storing a program for dynamically routing data over multiple dissimilar parallel wireless networks that are each monitored for status information. The medium includes an availability code segment that ascertains availability of at least two of the wireless networks based upon the status information; and a determining code segment that determines whether to switch between networks when at least two networks are available, in response to a user configuration and each network's speed. The medium also includes a switching code segment that switches from a first available network to a second available network, which is dissimilar at a link layer from the first available network, during a transmission while remaining connected to both the first network and the second network for a period of time.

In yet another aspect, a method is provided for dynamically routing data over multiple dissimilar parallel wireless networks that are each monitored for status information. The method includes ascertaining availability of at least two of the wireless networks based upon the status information; and determining whether to switch between networks when at least two networks are available, in response to a user configuration and each network's speed. The method also includes switching from a first available network to a second available network during a transmission, the second network being dissimilar from the first network; and stopping transmitting over the first available network after switching to the second available network. The method further includes remaining connected to the first network for a period of time after switching to the second network.

In another aspect, a method is provided for dynamically routing data over multiple dissimilar parallel wireless networks that are each monitored for status information. The method includes determining availability of at least two of the wireless networks; and identifying a current most preferred network, when multiple wireless networks are determined to be available. The identification is based upon a speed of each available network. The method also includes switching from a current network, which is dissimilar at a link layer from the current most preferred network, to the current most preferred network during a transmission; and remaining connected to the current network for a period of time after switching to the current most preferred network.

In still another aspect, a mobile system includes a local device and a server. The local device may be a database server application, and resides on a local area network. The server is connected to the local device via the local area network, and connected to multiple incompatible wireless networks. The system also includes a mobile device connected to the incompatible wireless networks. The mobile device is associated with multiple transmitters, each transmitter operating with one of the dissimilar networks. The mobile device includes a client application that enables a remote user to send and retrieve data from the database server application via the server. The mobile device sends data to the database server application via at least two of the incompatible wireless networks while switching between the at least two incompatible wireless networks, and remains connected to the at least two incompatible wireless networks for a period of time after switching.

In still another aspect, a method is provided for dynamically routing data over multiple dissimilar parallel wireless networks that are each monitored for status information. The multiple wireless networks are simultaneously in coverage and each associated with a transmitter. The method includes maintaining a priority of each wireless network, the priorities indicating a most preferred network. The method further includes determining availability of each wireless network based upon status information associated with each wireless network, including determining if a previous network is available, and determining if a next network is available when the previous network is not available or is a lower priority than a current network. The method also includes indicating a current most preferred network from the wireless networks determined to be available. The indication is based upon the network priorities. The current most preferred network is the previous network when the previous network is available and the previous network is a higher priority than the current network, which is dissimilar at the link layer from the current most preferred network. The method further includes switching from the current network to the current most preferred network, which has a higher priority, during a transmission when the higher priority network becomes available. The method also includes interrupting transmitting over the current network after switching to the current most preferred network, and remaining connected to the current network for a period of time after switching to the current most preferred network.

In another aspect, a computer readable medium is provided for storing a program that enables switching between dissimilar wireless networks, at least one of the dissimilar networks being a GSM network connected between a server and a mobile device. The server is connected to a local device via a local area network. The medium includes an availability code segment that periodically checks the status of the dissimilar networks, including the GSM network; and a transmitting code segment. The transmitting code segment transmits an updated job status via the server to the local device to inform a dispatcher of locations of field service personnel. The updated status is transmitted via at least two of the dissimilar networks while switching between the at least two dissimilar networks when a second of the dissimilar networks is faster than a first of the dissimilar networks and when the second network has a higher priority than the first network. The mobile remains connected to the at least two dissimilar networks for a period of time after switching. The job status is updated by an application that also retrieves a list of jobs to be performed by field service personnel from the local device.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIGS. 20, 21, 22, 23A, 23B and 24 are flow charts of the various processes associated with a wired communication network interface module associated with the service interface in accordance with the present invention;

FIG. 25 is a block diagram of the various components of a mobile data controller of the present invention;

FIG. 26 is a block diagram of the various components of a remote gateway according to another aspect of the present invention;

DETAILED DESCRIPTION OF THE ILLUSTRATED EMBODIMENTS

Figure 1:
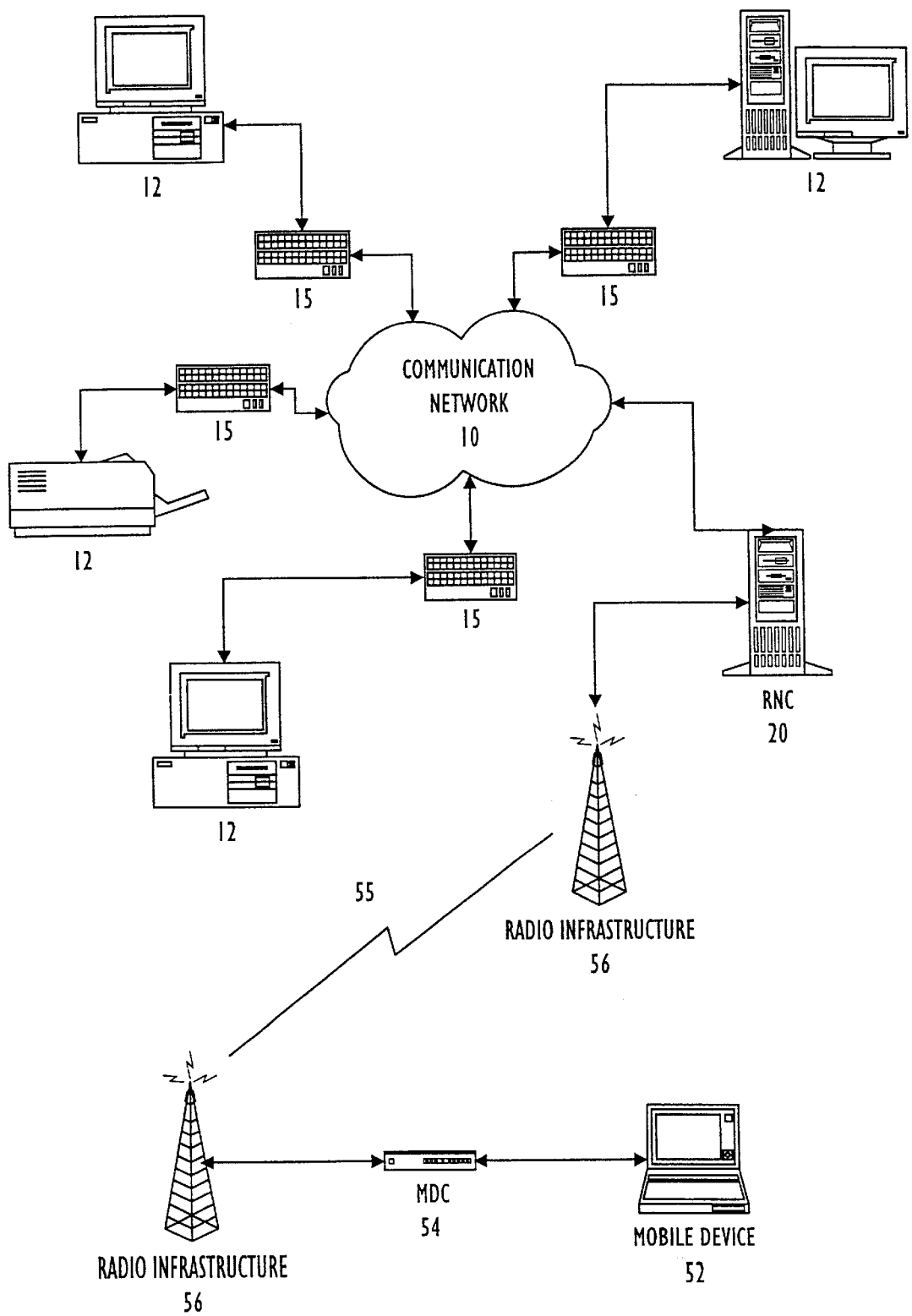
FIG. 1 illustrates a general overview of a remote network controller and mobile data controller in accordance with an aspect of the present invention.

Referring now to the accompanying drawings, FIG. 1 illustrates a general overview of a remote network controller and a mobile data controller in accordance with an aspect of the present invention. In FIG. 1, a wired communication network 10 is shown as a host network system having communications controllers 15 and locally-attached devices 12. The wired communication network 10 may be, for example, a Token Ring network or an Ethernet Local Area Network (LAN). The locally-attached devices 12 may include a personal computer, a workstation, a printer or network server, and reside at a plurality of dispersed locations. According to the present invention, a remote network controller 20 may also be provided which logically resides on the wired communication network 10 and acts as a protocol-appropriate communications controller to send and receive data to and from the communications network 10 and one or more remote or mobile devices 52. For purposes of illustration, only one of the remote devices 52 is shown in FIG. 1.

Remote devices 52 communicate via a mobile data controller 54 and a wireless radio-frequency (RF) communications link 55 created by the user's radio infrastructure 56 to the remote network controller 20. The mobile data controller 54 may convert asynchronous data from the remote device 52 into an appropriate protocol format of the radio infrastructure 56. In accordance with an aspect of the present invention, the remote devices 52, although not physically connected to the wired communication network 10, are logically connected to the wired communication network 10 through the radio infrastructure 56 and the remote network controller 20 and are indistinguishable from locally-attached devices 12. The remote devices 52 may be, for example, a laptop computer, personal digital assistant (PDA), a credit card reader, or a global positioning system (GPS) receiver. The radio infrastructure 56 may comprise a conventional point to point or trunking radio system.

The logical connection created by the remote network controller 20 between the remote device 52 and the wired communication network 10 is "transparent" to the user of the remote device 52, and to the wired communication network 10. In accordance with an aspect of the invention, the remote network controller 20 takes data transported by the radio infrastructure 56, irrespective of the format protocol of the radio infrastructure, and converts the data into a format protocol recognized by the wired network 10. Similarly, the remote network controller 20 of the present invention takes data from the wired network 10 and converts the data into a format protocol recognized by the radio infrastructure 56. Accordingly, the user of the remote device 52 does not have to perform any additional steps to send and receive data to and from the wired communication network 10, and the wired communication network 10 does not have to perform any additional steps to send and receive data to and from the remote device 52. The user of the remote device 52 interacts with the wired communication network 10 in a similar manner as a user of the locally-attached devices 12. Similarly, the wired communication network 10 interacts with the remote device 52 in a similar manner as the wired communication network interacts with the locally-attached devices 12.

Figure 2:
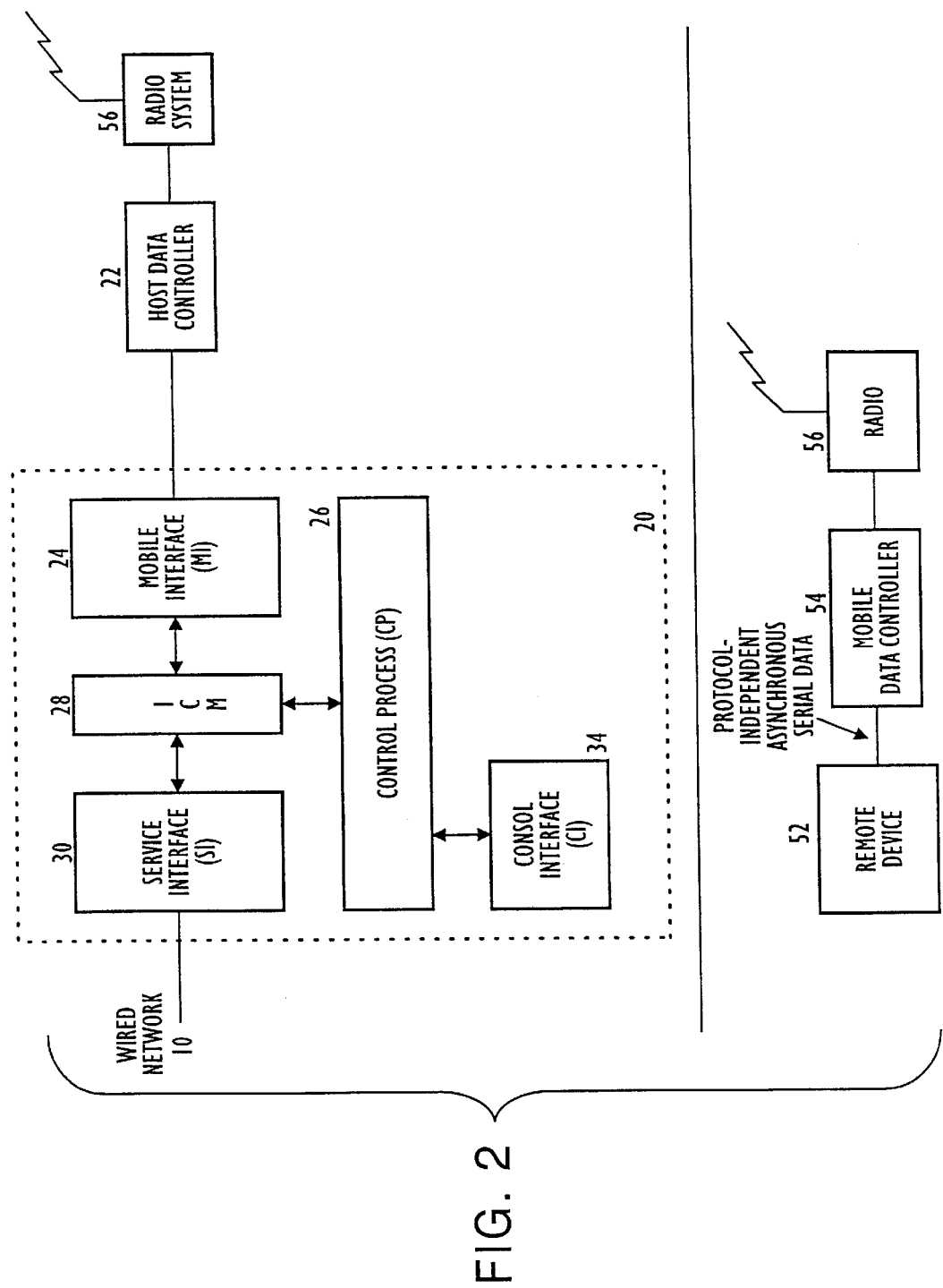
FIG. 2 illustrates a block diagram of the basic components of the remote network controller and mobile data controller of the present invention.

Referring now to FIG. 2, there is illustrated a block diagram of the basic components of the remote network controller 20 of the present invention. Each component of the remote network controller 20 will be generally described for introductory purposes and will later be described in greater detail below with reference to the accompanying drawings. The various components of the host data controller 22 and the mobile data controller 54 will also be discussed hereinafter with reference to FIGS. 13 and 25, respectively.

As shown in FIG. 2, the remote network controller 20 may comprise a service interface 30, a mobile interface 24, an interprocess communication manager 28, a control process module 26, and a console interface 34. The remote network controller may be implemented through a collection of software program modules and hardware components working cooperatively. The remote network controller 20 itself may run on a standard platform, such as a personal computer (PC) equipped with a commercially available processor or multi-processor, e.g., an Intel or Motorola based processor or multi-processor, and a commercially available operating system, such as an MS-DOS or UNIX based operating system. The remote network controller 20 may also contain an Ethernet controller or suitable network controller card depending on the wired communication network 10. In addition, the remote network controller 20 may include random access memory and physical storage media including hard disk and tape storage devices.

The wired communications network 10 is connected to the remote network controller 20 by the service interface 30. The service interface 30 handles all network connections. If several wired communications networks 10 are present, one or more service interfaces 30 may be provided to handle wired network connectivity. The service interface 30 connects to an interprocess communication manager 26. The interprocess communication manager 28 manages all interprocess message routing within the remote network controller 20. One or more mobile interfaces 24 may also be provided to handle connectivity with the radio infrastructure (s) 56. Each mobile interface 24 is also connected to the interprocess communication manager 28. The control process module 26 of the remote network controller 20 is provided to process management functions and data integrity. The control process module 26 is connected to the interprocess communication manager 28 and the console interface 34. The console interface 34 allows for user configuration and reporting of data.

As further illustrated in FIG. 2, the remote network controller 20 may be connected to a host data controller 22. One or more host data controllers 22 may be provided for connecting the remote network controller 20 to specific radio infrastructures 56, e.g., a Motorola trunked radio. The host data controller 22 may be connected to the mobile interface 24 of the remote network controller 20.

In the field, the remote device 52 is connected to the mobile data controller 54 which, in turn, is connected to the radio infrastructure 56 for transmitting and receiving data. The mobile data controller 54 is responsible for connecting the remote device 52 to the radio infrastructure 56 and to provide protocol-independent asynchronous serial data transfer to and from the remote device 52.

In order to provide transparent data transportation, whereby the network protocols and the protocols of the radio infrastructure 56 are transparent or invisible to the user, inbound asynchronous data from the remote device 52 is collected and transported to the wired communication network 10 in packets over the radio infrastructure 56. The data is sent using the existing protocols of the radio infrastructure 56. The remote network controller 20 accepts the data and encapsulates it into the appropriate protocol used by the wired communication network 10. The data is passed to the wired communication network 10 in a similar fashion for passing data from any of the other locally-attached devices 12. Similarly, outbound data to the remote device 52 from the wired communication network 10 is removed from the network protocol by the remote network controller 20. The remote network controller then encapsulates the data into the appropriate protocol associated with the radio infrastructure 56 and sends the data over the radio infrastructure 56 to the mobile data controller 54. Upon receipt of the data, the mobile data controller 54 removes the data from the radio infrastructure protocol and asynchronously sends the data to the remote device 52.

In accordance with the present invention, multiple wired networks 10 with different protocols may be linked to multiple RF environments in any combination by incorporating the remote network controller and mobile data controller of the present invention.

Figure 3:
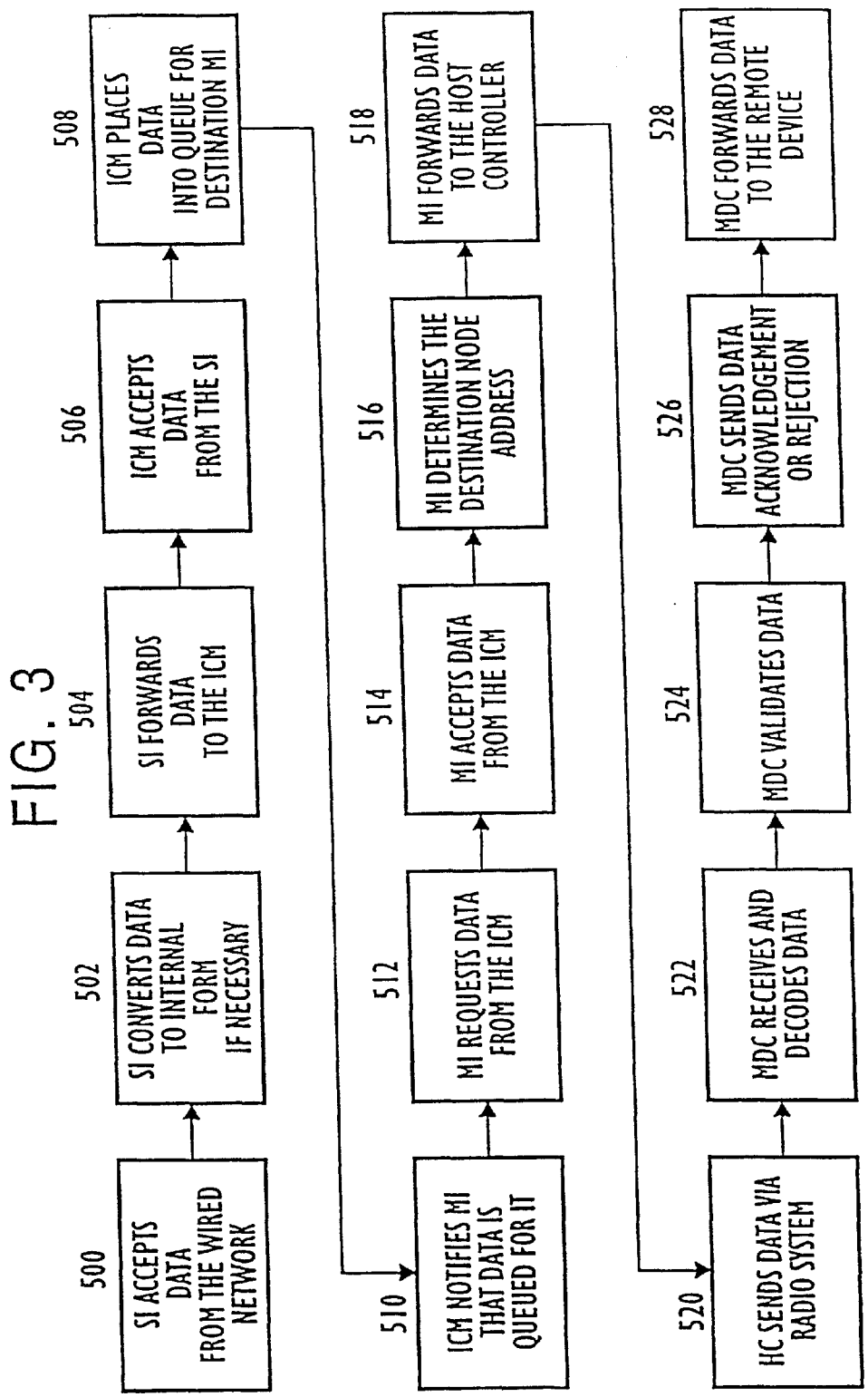
FIG. 3 is a high-level flow chart, according to the present invention, of the outbound data from a wired communication network to a remote device.

FIG. 3 is a high-level flow chart for transporting outbound data from the wired communication network 10 to the remote device 52. As shown in FIG. 3, when data is to be sent to the remote device 52, the service interface 30 of the remote network controller 20 accepts data from the wired communication network 10 at step 500. The service interface 30 then converts the data from the protocol used by the wired communication network 10 and encapsulates it into an internal protocol used by the remote network controller 20 at step 502. In addition, the service interface 30 may receive routing information from the wired communication network 10 as to what remote device 52 the data is to be passed, e.g., a network address or device identifier of the remote device 52.

At step 504, the service interface 30 forwards the data to the interprocess communication manager 28. The interprocess communication manager 28 accepts the data at step 506 and, at step 508, places the data in a queue for the appropriate destination mobile interface 24. The destination mobile interface 24 may depend on the radio infrastructure 56 employed by the user. The outbound data that is to be passed from the interprocess communications manager 28 to the mobile interface 24 may be encapsulated in an internal protocol of the remote network controller 20, along with routing information to specify the remote device 52 to which the data is to be sent. At step 510, the interprocess communication manager 28 notifies the mobile interface 24 that the data to be sent to the remote device 52 is queued for the mobile interface. The particular mobile interface 24 that the data is queued for depends on the particular radio infrastructure 56 employed to communicate with the destination remote device 52. At step 512, the mobile interface 24 requests that the queued data be sent from the interprocess communication manager 28. The mobile interface 24 may request data when it is free to send the data to a destination remote device 52 and not handling another process. At step 514, the mobile interface 24 accepts the queued data from the interprocess communication manager 28. Thereafter, at step 516, the mobile interface 24 determines, based on the queued data, the destination node address of the remote device 52 to which the data is to be sent. At step 518, the mobile interface 24 forwards the data to the appropriate host data controller 22 so that it may be sent over the radio infrastructure 56 at step 520. According to an aspect of the present invention, the host data controller 22 may receive the data, remove it from the internal protocol and encapsulate the data into a packet determined by the protocol used by the radio infrastructure 56. The packet of data may be broadcasted over the radio infrastructure 56 so as to enable the host data controller 22 to communicate with multiple mobile data controllers 54 simultaneously. The broadcasted data packet may include the identification of the specific mobile data controller 54 to which the packet is to be delivered, so that only uniquely identified mobile controller(s) may accept the packet.

Referring again to FIG. 3, at step 522, the mobile data controller 54 receives the data from the remote radio infrastructure 56 and decodes the data. The data packet, once received by the mobile data controller 54, is accepted and the data is removed from the packet. At step 524, the mobile data controller 54 validates the data and, at step 526, sends an acknowledgment or rejection message to the host data controller 22 via the radio infrastructure 56. According to the present invention, the remote network controller 20 and the host data controller 22 may be responsible for ensuring the integrity of the data transported over the radio infrastructure. As such, an error detection/retry mechanism may be employed to detect and correct data transmission errors. After the integrity of the data is verified, the mobile data controller 54 at step 528 will forward the data to the remote device 52. The data may be asynchronously transferred to the remote device 52 through a serial connection.

Figure 4:
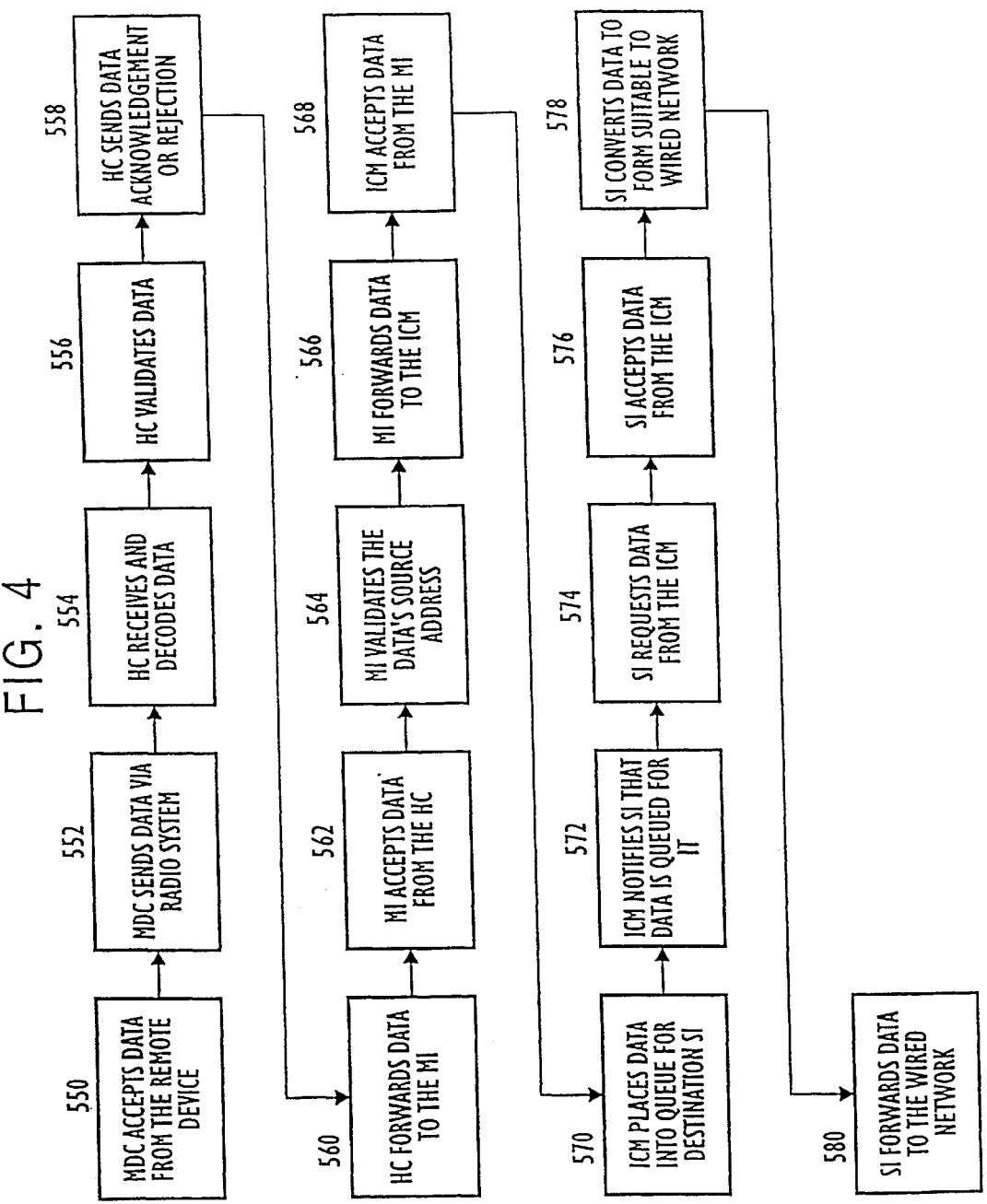
FIG. 4 is a high-level flow chart, according to the present invention, illustrating the flow of inbound data from a remote device to a wired communication network.

FIG. 4 is a high-level flow chart illustrating the processing of inbound data from the remote device 52 to the wired communication network 10. At step 550, the mobile data controller 54 accepts data from the remote device 52. At step 552, the mobile data controller 54 formats and sends the data to the remote network controller 20 via the radio infrastructure 56, which may comprise a modem. The data may be transmitted using the appropriate protocol of the radio infrastructure 56. The data may be modulated within the mobile data controller 54 prior to transmission via the radio infrastructure 56. The mobile data controller 52 may place the data from the remote device 52 into packets to be sent over the radio infrastructure 56. The packet size can be determined by one of three methods. The first is a maximum packet size. Once an upper limit of data is accumulated, the mobile data controller 54 may send the packet of information to the host data controller 22. For example, once 256 bytes of data are collected, the data may be sent by the radio infrastructure 56 over the RF communications link 55. The second method is a maximum time to wait before sending data. In this case the mobile data controller 54 will send a packet after waiting a predetermined period of time, no matter how much data is accumulated. The third method involves the mobile data controller 54 detecting a predefined "end-of-packet" character which causes all accumulated data to be transmitted.

At step 554, the host data controller 22 receives and decodes the data packet from the protocol of the radio infrastructure 56. Generally, the data arrives as a packet of a predetermined size. At step 556, the host data controller 22 validates the data and, thereafter, sends at step 558 an acknowledgment or rejection message to the mobile data controller 54 based on the validation process. According to an aspect of the present invention, the host data controller 22 may determine if the transmitted data packet is correct, or in error. The host data controller 22 may also determine if the data packet has arrived in the proper sequence, and that the packet is not a duplicate. As discussed above, the inbound data may be removed from the packet and encapsulated in the internal protocol used by the remote network controller 20. The internal protocol may contain additional information, such as the identification of the mobile data controller 54 which sent the information.

At step 560, the host data controller 22 forwards the data to the mobile interface 24. The mobile interface 24 accepts the data from the host data controller 22 at step 562. The mobile interface 24 validates the address of the source of the data (e.g., the particular mobile data controller 54 or remote device 52) at step 562. At step 566, the mobile interface 24 forwards the data to the interprocess communication manager 28, which accepts the data at step 568. The mobile interface may also pass the routing information specifying the remote device 52 from which the data originated. At step 570, the interprocess communication manager 28 places the data into a queue for the destination service interface 30. The particular destination service interface 30 will depend upon which wired communication network 10 the data is to be delivered. Included in the information which is passed to the service interface 30 is the destination address (i.e., the communication network 10 to which the data is to be delivered). At step 572, the service interface 30, when available to handle data, requests the data from the interprocess communication manager 28. The service interface 30 accepts the data at step 576 and converts the data into an appropriate form, i.e., protocol, usable by the wired communication network 10 at step 578. As a result, the data may be passed to the hardware device (e.g., an Ethernet controller) using the protocol required by the wired communication network 10. This configuration allows any existing network interface card to be used in conjunction with the remote network controller 20, because the data is placed into the appropriate network protocol by the service interface 30 before it is transmitted to the wired network. At step 580, the service interface 30 forwards the data to the wired communication network 10.

The validation process of the outbound data depicted in FIG. 3 and inbound data depicted in FIG. 4 does not depend on the type of wired communication network employed by the user. Through a single validation process performed by the host data controller 22 and the mobile data controller 54 (see steps 524 and 526 in FIG. 3 and steps 556 and 558 in FIG. 4), the integrity of the data transmitted from the wired communication network 10 to the remote device 52 through the radio infrastructure 56 is ensured. This validation process may include, for example, an error detection and retry mechanism to detect errors and to cause (when necessary) the retransmission of the data.

Figure 5:
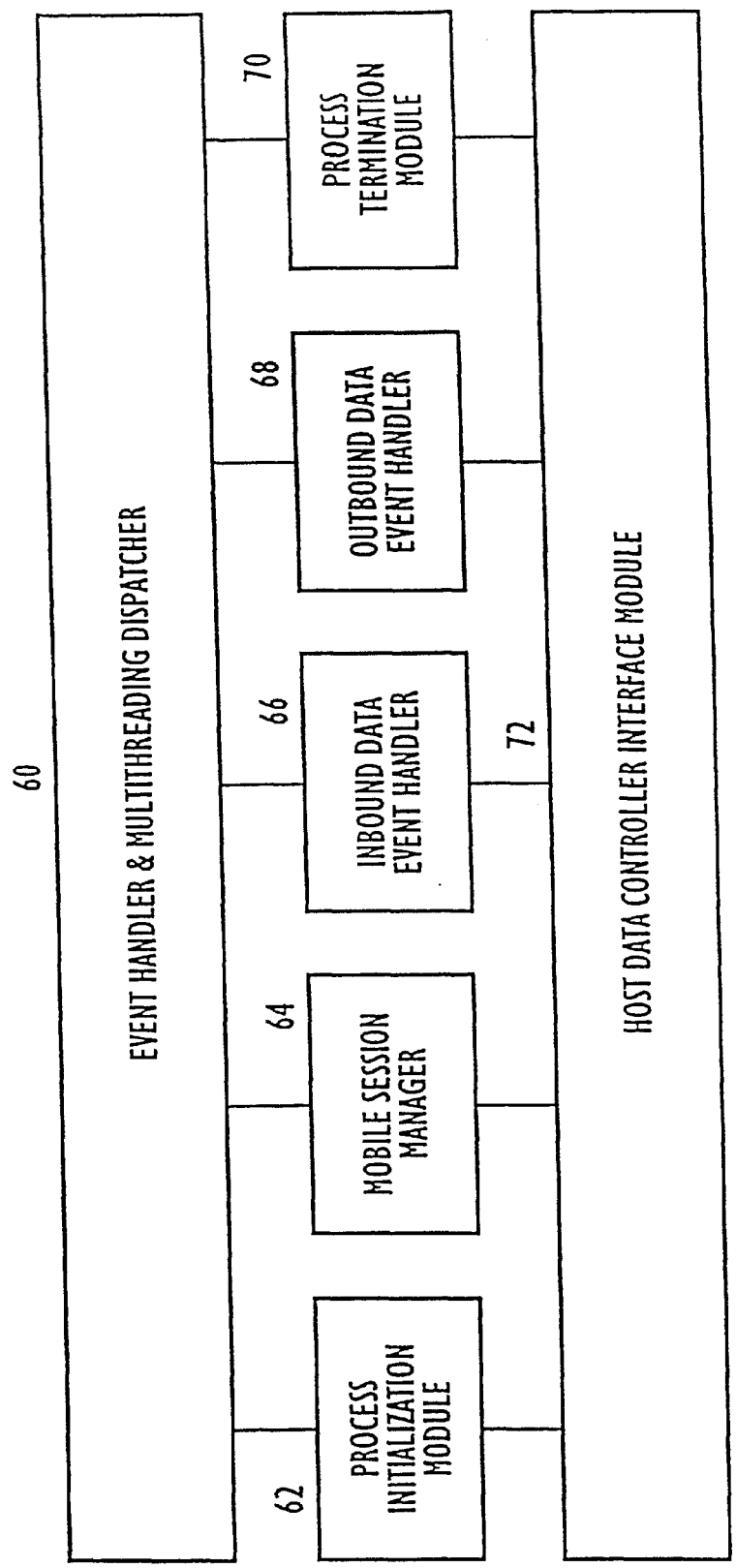
FIG. 5 illustrates a block diagram of the components of a mobile interface in accordance with the present invention.

Referring now to FIG. 5, there is illustrated a block diagram of the basic components of the mobile interface 24 of the remote network controller 20 of the present invention. As noted above, the mobile interface 24 is responsible for interfacing the remote network controller 20 with the host data controller 22 and the radio infrastructure 56. The mobile interface 24 may be a software interface that records statistical information related to inbound and outbound data. The mobile interface 24 may also be responsible for error detection and correction, and establishing and managing the mobile data sessions with the remote devices 52. The number of mobile interfaces 24 provided in the remote network controller 20 depends on the number of different types of radio infrastructures 56 employed by the user. Each type of radio infrastructure 56 may have its own associated mobile interface 24.

As shown in FIG. 5, the mobile interface 24 may include an event handler and multithreading dispatcher 60, a process initialization module 62, a mobile session manager 64, an inbound data event handler 66, an outbound data event handler 68, a process termination module 70 and a host data controller interface module 72. The event handler and multithreading dispatcher 60 may contain high-level logic and be used to control the overall execution flow of the mobile interface 24. The process initialization module 62 may be utilized to acquire resources and establish the operation environment for the mobile interface 24 process. The process initialization module 62 may also be provided to initialize the host data controller 22.

According to the present invention, the mobile session manager 64 may be provided to control the communications environment between the mobile data controller 54 and the host data controller 22. The inbound data event handler 66 responds to signals from the host data controller 22 indicating that inbound data is available and preprocess session control information. The outbound data event handler 68 is provided to respond to signals from the interprocess communication manager 28 indicating that outbound data is available or that a session control function is required. The process termination module 70 functions to release previously-acquired resources and terminate the mobile interface 24 process efficiently. The host data controller interface module 72 handles low-level interaction with the associated host data controller(s) 22.

Figure 6:
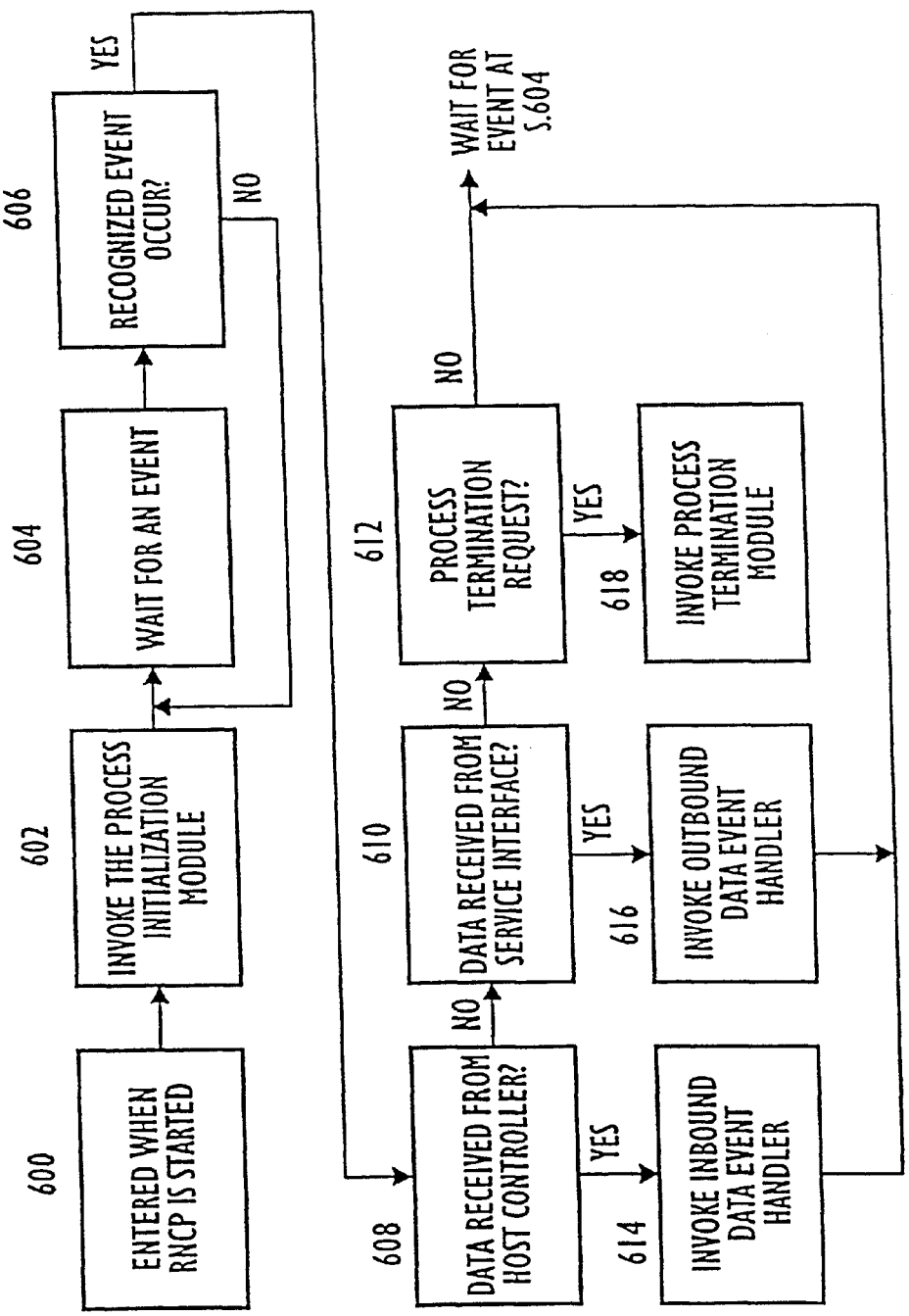
FIG. 6 is a flow chart of the processing of an event handler and multithreading dispatcher associated with the mobile interface of the present invention.

The process flow of the event handler and multithreading dispatcher 60 will now be described with reference to FIG. 6. At step 600, the process begins when the remote network controller 20 is powered up and initialized. At step 602, the process initialization module 62 is invoked (described below with reference to FIG. 7). At step 604, the event handler and multithreading dispatcher 60 waits for an event (e.g., receipt of inbound data) to occur. While the event handler and multithreading dispatcher 60 waits for an event to occur, mobile interface 24 may be placed in a "sleep" mode to conserve processor resources. At step 606, once an event occurs, the event handler and multithreading dispatcher 60 determines if it is a recognized event. If the event handler and multithreading dispatcher 60 determines it is not a recognized event at step 606, processing returns to step 604. If, however, the event handler and multithreading dispatcher 60 determines that the event is a recognized event at step 606, then processing continues at step 608, where the event handler and multithreading dispatcher 60 determines if the data was received from the host data controller 22.

At step 608, if the event handler and multithreading dispatcher 60 determines the data was received from the host data controller 22, the event handler and multithreading dispatcher 60 invokes the inbound data event handler 66, at step 614 (described below with reference to FIG. 9) and processing continues at step 604. If at step 608 the event handler and multithreading dispatcher 60 determines that the data was not received from the host data controller 22, then the event handler and multithreading dispatcher 60 determines whether the data was received from the service interface 30 at step 610.

If the event handler and multithreading dispatcher 60 at step 610 determines that the data was received from the service interface 30, then at step 616 the outbound data event handler 68 is invoked (described below with reference to FIG. 10) and processing returns to step 604. If the event handler and multithreading dispatcher 60 at step 610 determines that the data was not received from the service interface 30, then at step 612 the event handler and multithreading dispatcher 60 determines if there is a process termination request.

If, at step 612, the event handler and multithreading dispatcher 60 determines there is a process termination request, then at step 618, the process termination module 70 is invoked (described below with reference to FIG. 11). If, at step 612, the event handler and multithreading dispatcher 60 determines that there is not process termination request, then processing continues at step 604 to wait for another event.

Figure 7:
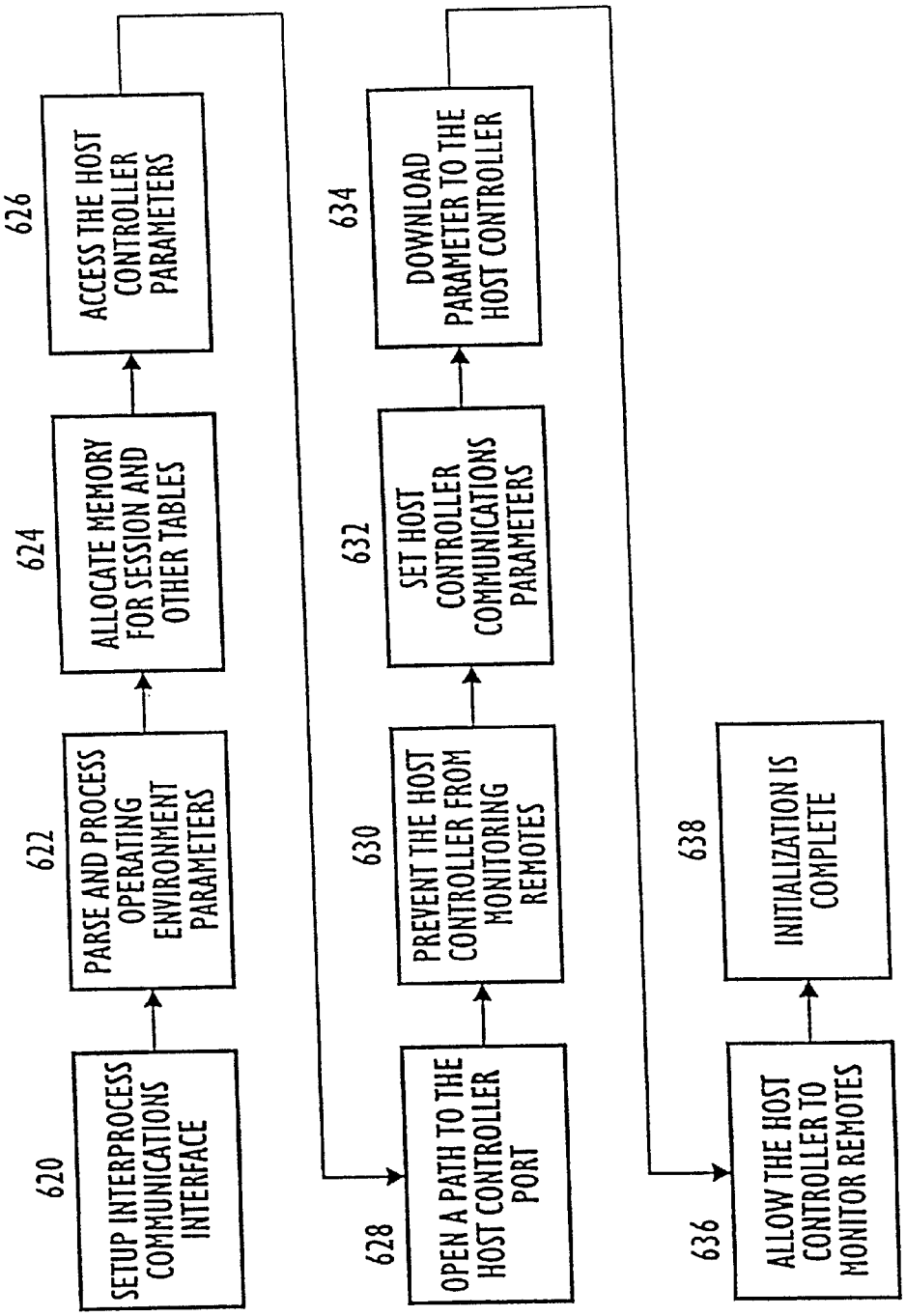
FIG. 7 is a flow chart for indicating the process flow of a process initialization module associated with the mobile interface of the present invention.

Referring now to FIG. 7, there is illustrated an exemplary flow chart for indicating the process flow of the process initialization module 62 of FIG. 5. At step 620, the interprocess communications interface is setup. At step 622, the operating environment parameters are parsed and processed. This includes the host data controller 22 parameters referenced in steps 626, 632 and 634 below. At step 624, memory is allocated for the session and other tables contained within the mobile interface 24, which are used to control data flow and other operations. At step 626, the host data controller 22 parameters are accessed. At step 628, a path to the host data controller 22 port is opened. At step 630, the host data controller 22 then is prevented from monitoring for an event from the remote device(s) 52. Step 630 prevents erroneous transmissions that may arise if the host data controller 22 attempts to monitor a remote device 52 before the initialization process is complete. At step 632, the host data controller 22 communication parameters are set. At step 634, the communication parameters are downloaded to the host data controller 22. After the initialization processes of steps 632 and 634 are completed, the host data controller 22 at step 636 is enabled to monitor the remote device(s) 52. At step 638, the entire initialization procedure is complete and processing returns to step 604 in FIG. 6.

Figure 8:
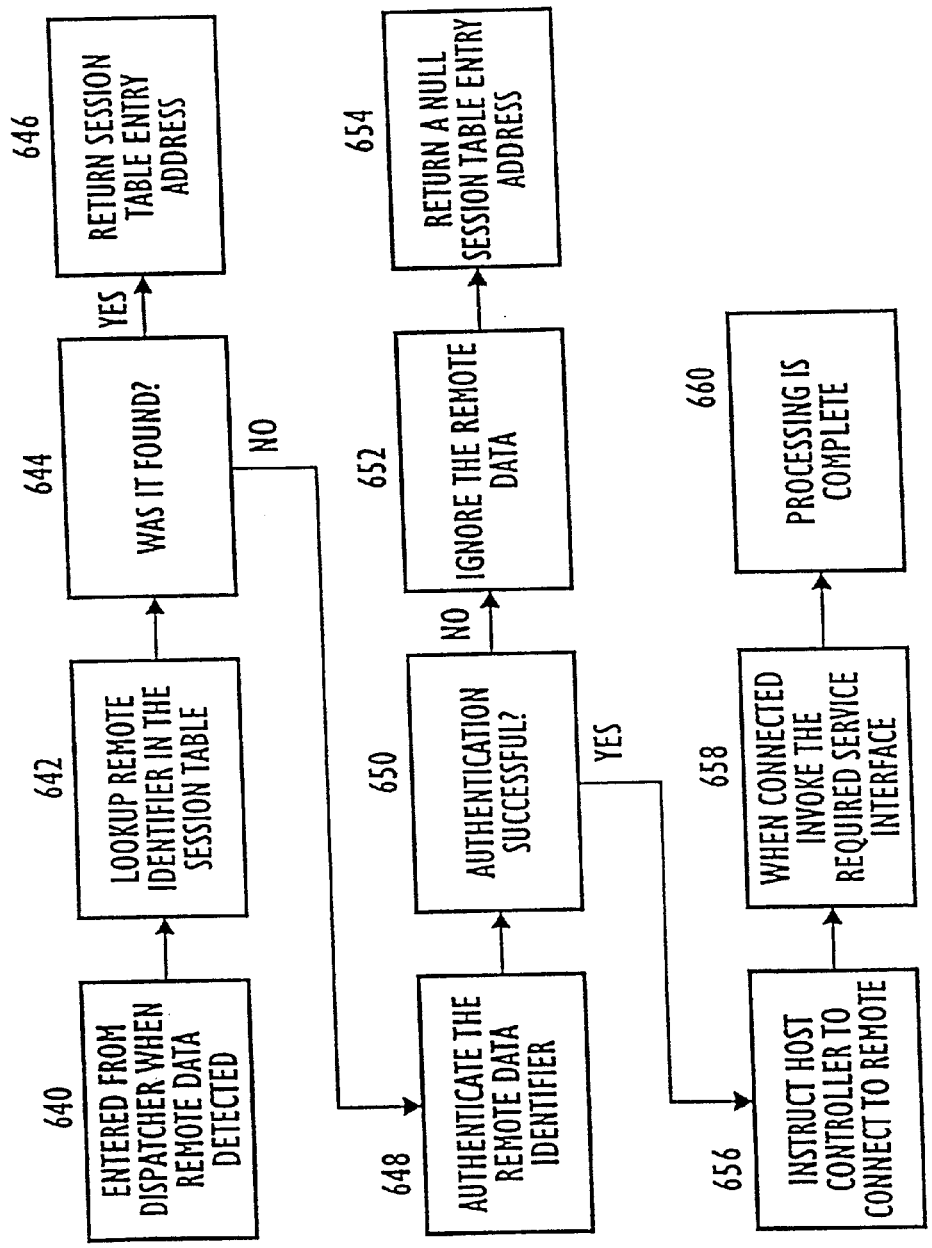
FIG. 8 is a flow chart for indicating the processing of a mobile session manager associated with the mobile interface of the present invention.

Referring now to FIG. 8, there is illustrated an exemplary flow chart describing the logic flow of the mobile session manager 64 of FIG. 5. At step 640, the mobile session manager 64 handler is entered from the event handler and multithreading dispatcher 24 when remote data is detected. At step 642, the remote identifier of the remote device 52 is looked up in a session table. At step 644, the mobile session manager 64 determines if the remote identifier was found in the session table. If the mobile session manager 64 determines that the remote identifier was found, the address is returned from the session table at step 646.

If the mobile session manager 64 does not find the remote identifier at step 644, then at step 648 the mobile session manager 64 attempts to authenticate the remote identifier. At step 650, the mobile session manager determines if the authentication is successful. If at step 650 the authentication is successful, then at step 656 the host data controller 22 is instructed to connect to the remote device 52 based on the remote identifier. After the host data controller 22 is connected to the remote device 52, the appropriate service interface 30 is invoked at step 658. At step 660, processing is complete. If at step 650, the authentication was not successful, the remote data is ignored at step 652, and a null session table entry address is returned by the mobile session manager 64.

Figure 9:
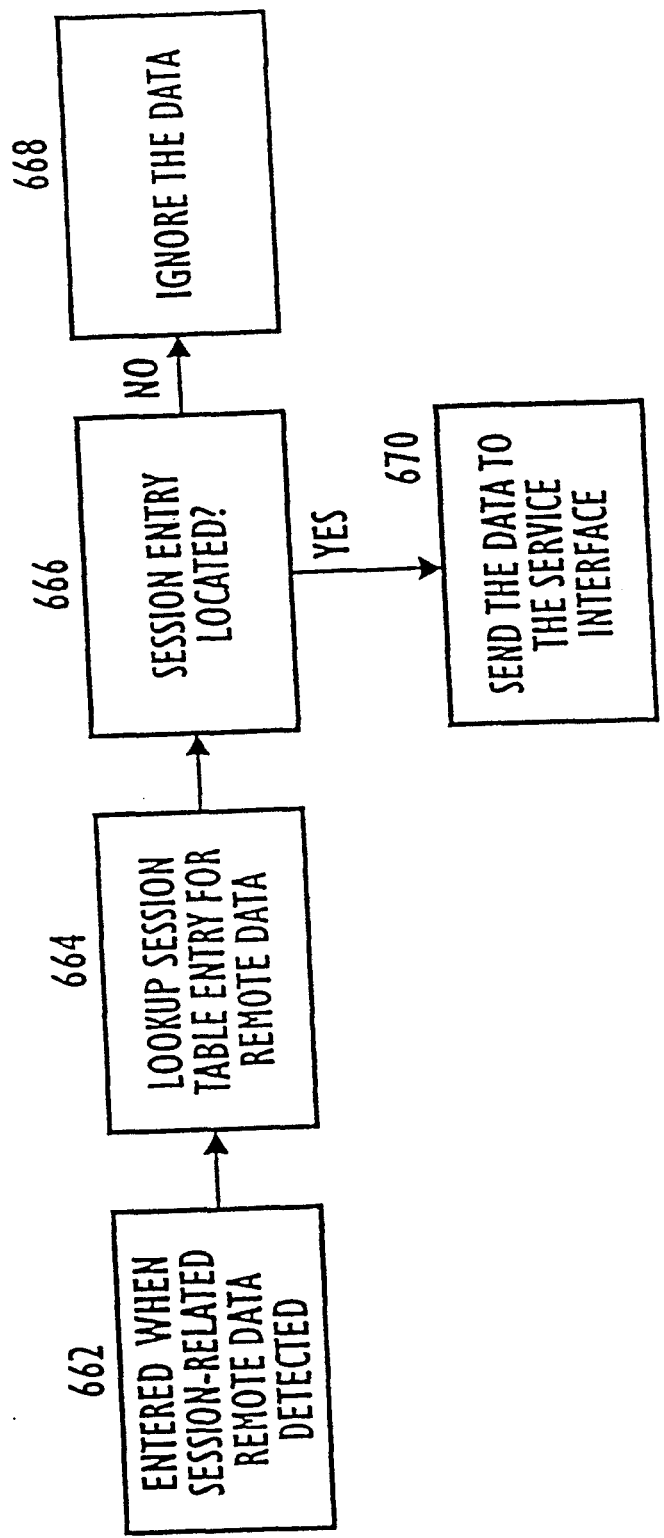
FIG. 9 is a flow chart of the processing steps for an inbound data event handler associated with the mobile interface of the present invention.

Referring now to FIG. 9, there is illustrated an exemplary flow chart of the processing steps of the inbound data event handler 66 of FIG. 5. At step 662, the inbound data event handler is invoked (from step 614 in FIG. 6). At step 664, the remote identifier of the remote device 52 is checked against the session table. At step 666, it is determined whether the inbound data event handler 66 found the remote identifier in the session table. If at step 666, the remote identifier is not found in the session table, the data is ignored and processing continues at step 604 in FIG. 6. If the remote identifier is found in the session table at step 666, the data is sent to the service interface 30 at step 670. Processing then continues at step 604 in FIG. 6.

Figure 10:
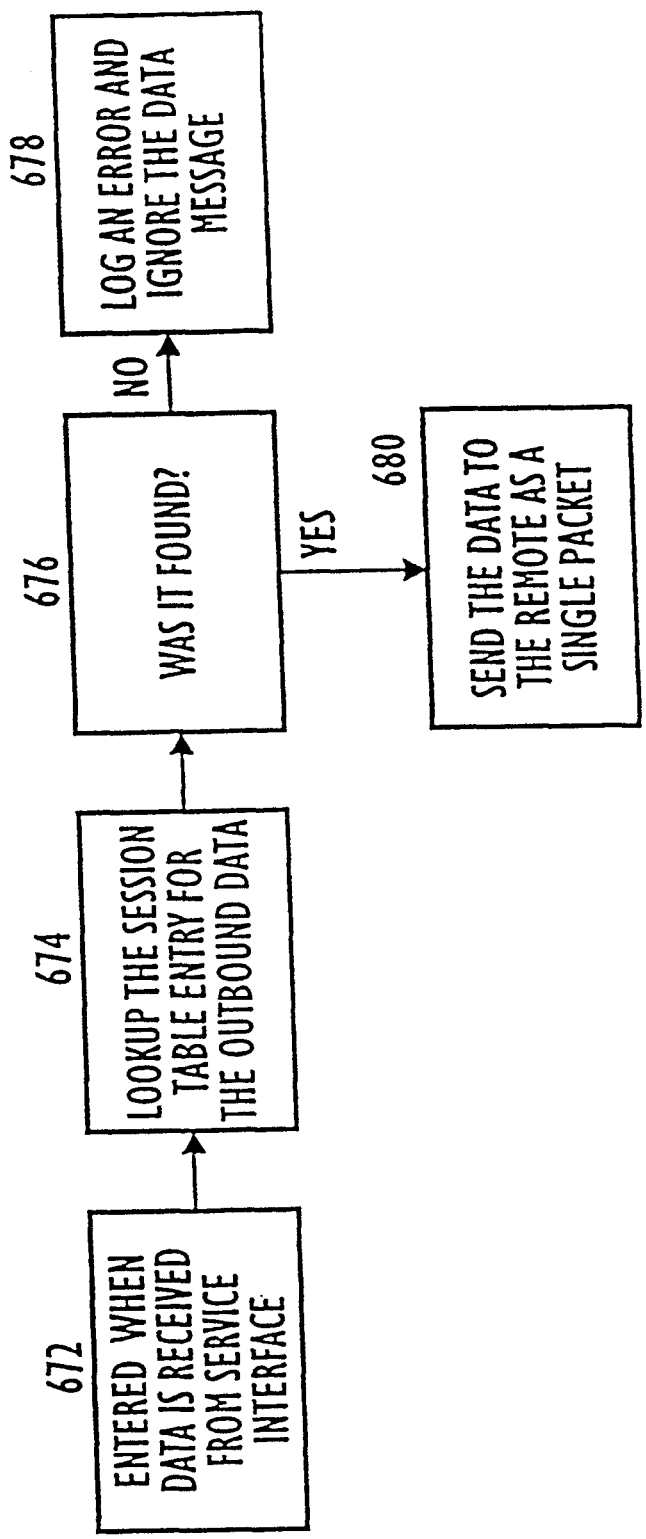
FIG. 10 is a flow chart of the processing steps for an outbound data event handler associated with the mobile interface of the present invention.

Referring now to FIG. 10, there is illustrated an exemplary flow chart of the processing steps of the outbound data event handler 68 of FIG. 5. At step 672, the outbound data event handler is invoked (from step 616, FIG. 6). At step 674, the session table is checked for the outbound data remote identifier. At step 676, it is determined if the outbound data event handler 68 found the remote identifier in the session table. If at step 676, the remote identifier is not found in the session table, an error is logged and the data message is ignored. Processing then continues at step 604 in FIG. 6. If the remote identifier is found in the session table at step 676, the data is sent to the remote device 52 as a single packet at step 680. Processing then continues at step 604 in FIG. 6.

Figure 11:
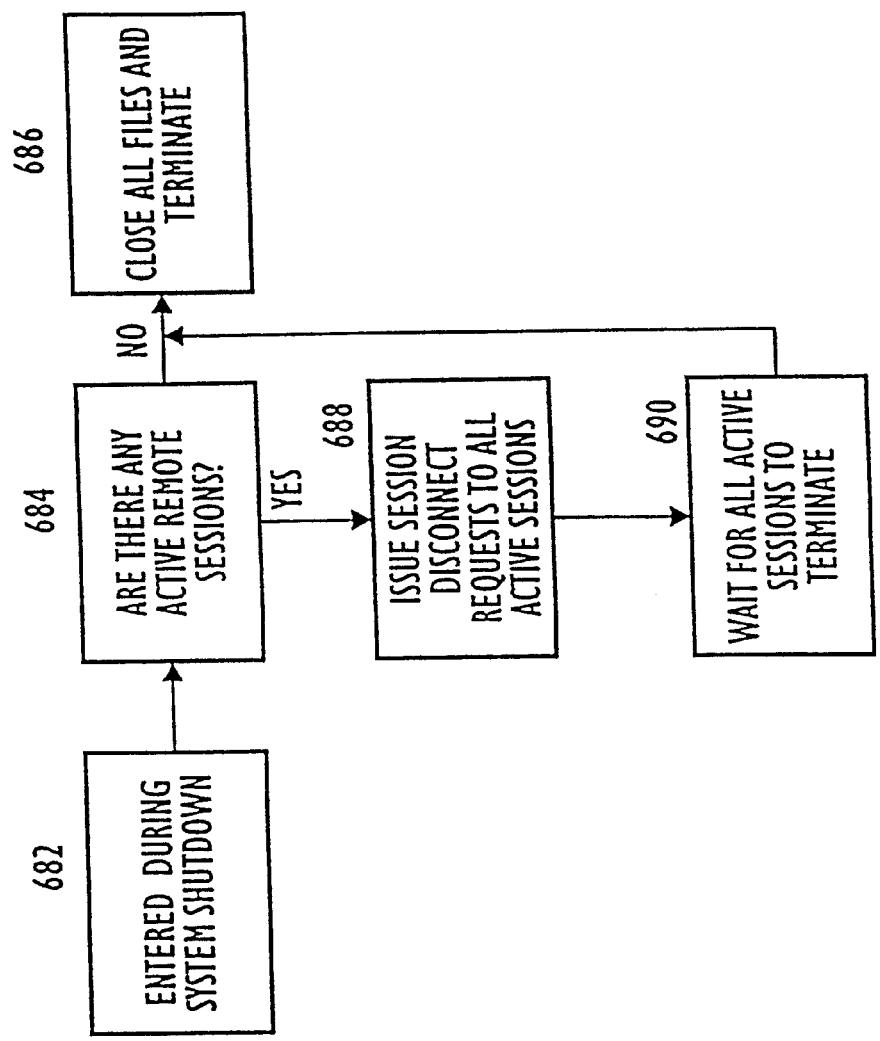
FIG. 11 is a flow chart of the processing steps for a process termination module associated with the mobile interface of the present invention.

Referring now to FIG. 11, there is illustrated an exemplary flow chart of the processing steps of the process termination module 70 of FIG. 5. At step 682, the process termination module 70 is invoked (from step 618 in FIG. 6). At step 684, the process termination module 70 determines if there are any active remote sessions. If, at step 684, it is determined by the process termination module 70 that there are no active sessions, then at step 686 all files are closed and the mobile interface 24 terminates. If, however, it is determined by the process termination module 70 that there are active sessions, then at step 688 all of the active sessions are issued a disconnect request. At step 690, the process termination module waits for all active sessions to terminate. Once all active sessions have terminated at step 690, then all files are closed and the mobile interface 24 terminates at step 686.

Figure 12:
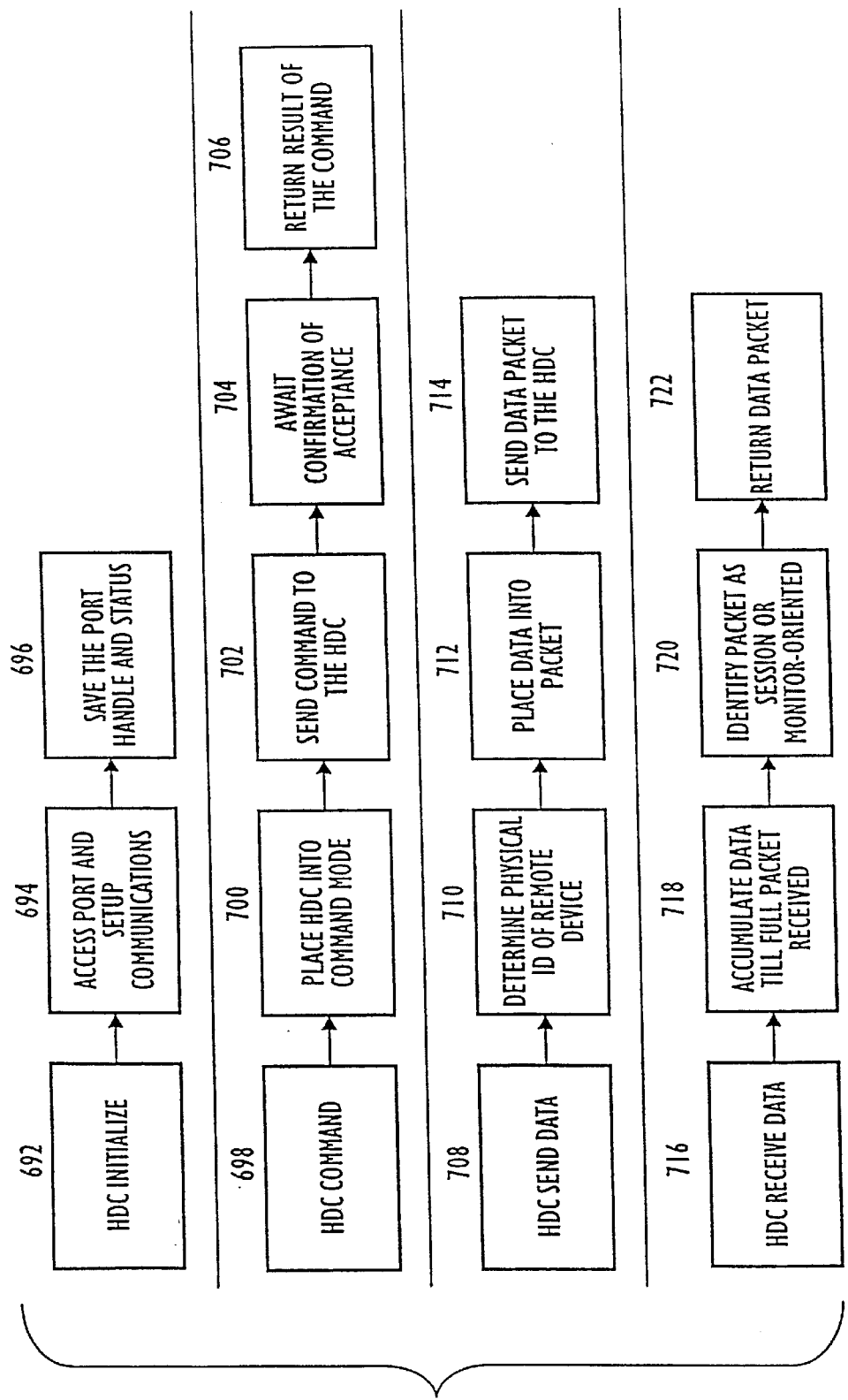
FIG. 12 is a flow chart of the processes associated with a host data controller interface module associated with the mobile interface of the present invention.

Referring now to FIG. 12, there is illustrated an exemplary flow chart of the processes associated with the host data controller interface module 72 of FIG. 5. The host data controller interface module 72 consists of a number of discrete functions (e.g., Initialize, Command, Send Data, and Receive Data) which are called when needed by the mobile interface 24 and share common information about the host data controller 22. The host data controller interface module 72 may access the host data controller 22 via a serial communications port which is assigned to the mobile interface 24 and remains fixed when the remote network controller 20 is in operation.

A host data controller 22 initialize routine begins at step 692. The initialization routine may be initiated in accordance with step 602 (see FIG. 6) and steps 632 and 634 (see FIG. 7). At step 694, the serial communications port is accessed and setup. Thereafter, at step 696, the port handle and status is saved to be used by other processes within the host data controller interface module 72.

A host data controller 22 command routine begins at step 698. The command routine may be initiated upon the occurrence of a recognized event (see, e.g., step 604 in FIG. 6) so that the appropriate control or operation commands may be sent to the host data controller 22. At step 700, the host data controller 22 is placed into a command mode. At step 702, a command (e.g., disconnect or receive) is issued to the host data controller 22 based on the event that is recognized. At step 704, the host data controller interface module 72 awaits a confirmation of acceptance of the command from the host data controller 22. At step 706, the result of the command is returned to the host data controller interface module 72.

A host data controller 22 send data routine begins at step 708 and may be initiated from step 680 in FIG. 10. The send data routine is initialized so that data may be sent to the appropriate remote device 52. First, the physical identification of the remote device 52 is determined at step 710. Thereafter, the data to be sent to the remote device 52 is placed into a packet at step 712, and sent to the host data controller 22 at step 714.

At step 716, a host data controller 22 receive data routine is initiated in accordance with step 670 in FIG. 9. The receive data routine is initiated so that data from the remote device 52 may be received by the remote network controller 20. At step 718, data is accumulated within the host data controller 22 receive data routine (see, FIG. 12, step 716) until a full packet of information is received. Thereafter, at step 720, the packet is identified as either session oriented or monitor oriented data. The identified data packet is then returned, at step 722, to the mobile interface 24 and sent to the wired communication network 10 via the remote network controller 20.

Figure 13:
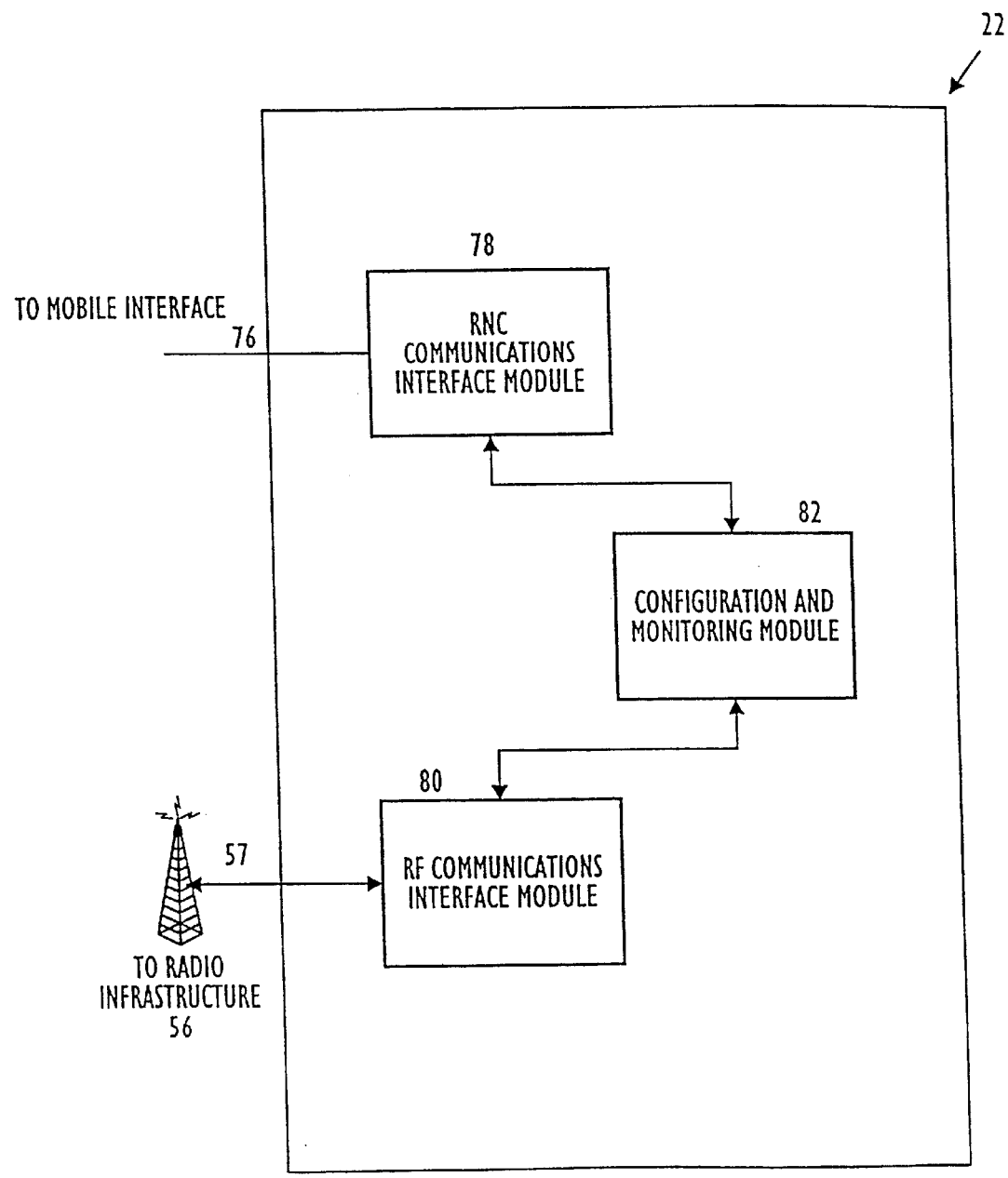
FIG. 13 is a block diagram of the various components of a host data controller in accordance with an aspect of the present invention.

Referring now to FIG. 13, in accordance with an aspect of the present invention, there is illustrated a block diagram of the basic components of the host data controller 22 (see, e.g., FIG. 2) of the present invention. The host controller 22 may be physically connected external to the remote network controller 20 via the mobile interface 24. The host data controller 22 is specifically designed to convert the radio infrastructure 56 protocol to the internal protocol of the remote network controller 20. Typically, one host data controller 22 may be connected to each mobile interface 24; however, one or more host data controllers 22 may be connected for redundancy and greater reliability.

As shown in FIG. 13, the host data controller 22 may comprise an RF communications interface module 80, a remote network controller communications interface module 78, and a configuration and monitoring module 82. The host data controller 22 may comprise any combination of hardware and software to perform the functions described herein. For example, the host data controller 22 may comprise a commercially available processor or multi-processor with overlying application software. The software running in the host data controller 22 may be written in Z80 or other appropriate high-level language (e.g., Pascal). The host data controller 22 may also contain a plurality of serial ports for communicating with other devices.

The remote network controller communications interface module 78 is connected to the mobile interface 24 of the remote network controller 20 and is responsible for sending and receiving data to and from the remote network controller 20. A subsystem port 76 (e.g., an RS-232 adapter) may be used to connect the remote network controller communications interface module 78 to the mobile interface 24 of the remote network controller 20. If the host data controller 20 is connected to more than one remote network controller, then additional subsystem port connection(s) may also be provided to connect to the interface module 78 to the additional remote network controllers. The remote network controller communications interface module 78 sends health and status information regarding the host data controller 22 to the mobile interface 24. This information informs the remote network controller 20 that the host data controller 22 is operational and accepting data.

The configuration and monitoring module 82 is specific to the type of radio infrastructure 56 employed. Software parameters, such as the number of subsystem ports, how often to send health and status requests, and a list of mobile data controllers 54 to which the host data controller 22 can communicate, may be set and stored in the configuration and monitoring module 82. The configuration and monitoring module 82 can also accumulate statistics which are passed to the mobile interface 24.

In order to diagnose potential system errors in the host data controller 22, the remote network controller 20 may test and analyze the host data controller 22 over a diagnostic port (not shown) to determine a cause of the system failure or error. The diagnostic port may be used not only to determine if the host data controller 22 is operational, but also to configure software parameters particular to the type of radio infrastructure 56. These parameters can be changed to communicate with a different radio infrastructure 56 type as necessary.

The RF communications interface module 80 is responsible for sending and receiving the radio-frequency transmissions. The RF communications interface module 80 is specific to the radio infrastructure 56 in use and is connected to the radio infrastructure 56 by a communication line 57. Again, because the host data controller 22 is designed to integrate with an existing radio infrastructure 56, each host data controller 22 is software configured to work with many different types of radio infrastructure 56 protocols for flexibility. The host data controller 22 may be designed to be plugged into the remote network controller 20, connecting to the mobile interface 24, and can simply be exchanged with a different host data controller 22, or reprogrammed depending on the radio infrastructure 56 employed. Host data controllers 22 may be configured so as to be compatible with, for example, conventional point-to-point radio systems, conventional repeater-based radio systems, LTR Trunking, Motorola Trunking, Ericsson (EDACS) Trunking—Voice Path, EDACS RDI Trunking—Data Path, and EDACS IMC Voice Path radio infrastructures.

Figure 14:
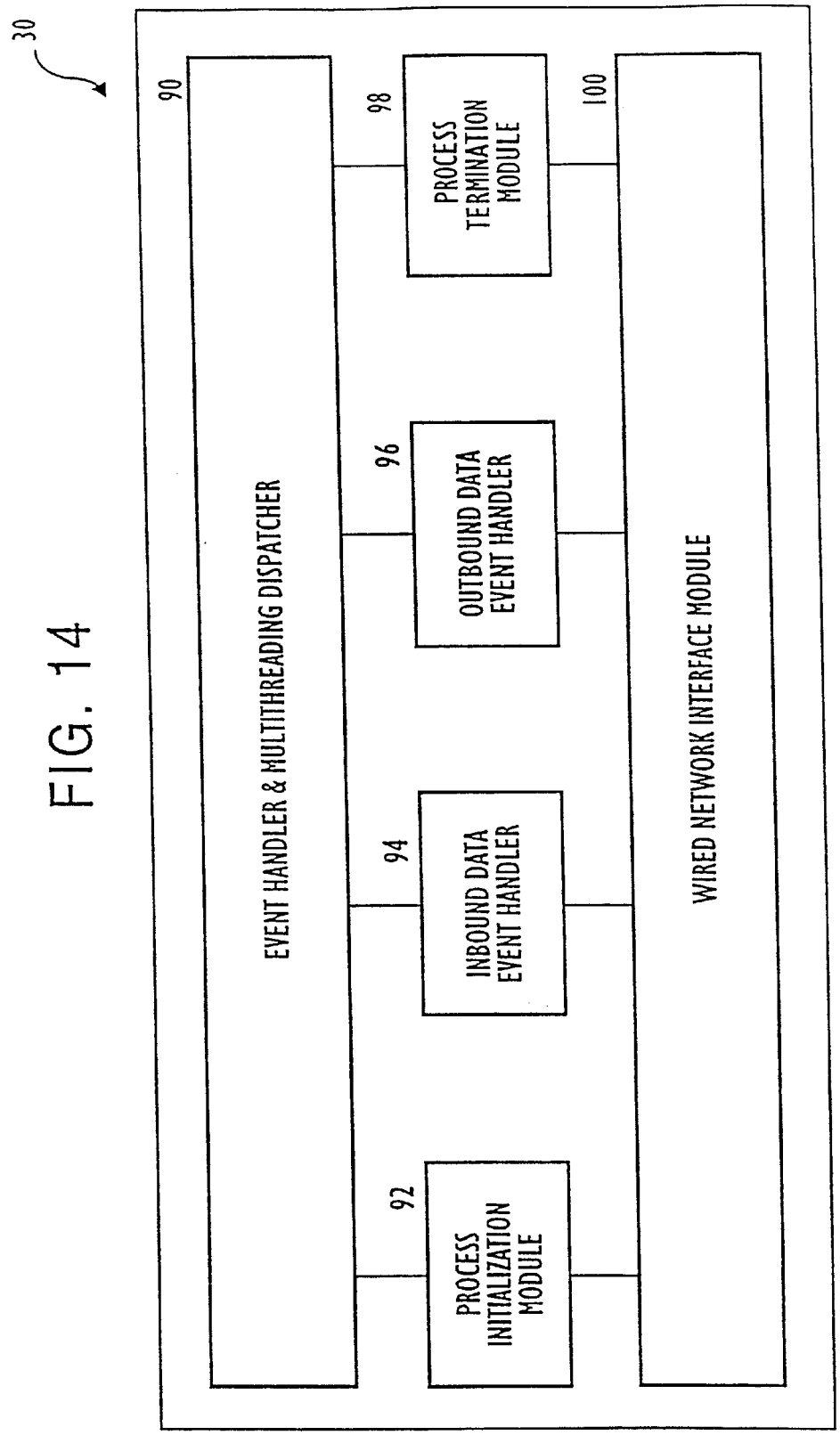
FIG. 14 is a block diagram of the components comprising a service interface according to the present invention.

Referring to FIG. 14, there is illustrated a block diagram of the components comprising the service interface 30 (see FIG. 2) of the present invention. The service interface 30 is responsible for communicating to and from the wired communication network 10. The service interface 30 is concerned only with the software level protocols of the wired communication network 10. The hardware interface to the wired communication network 10 is accomplished by a known network control card, such as an Ethernet controller or a Token-Ring controller.

The number of service interface 30 connections to the wired communication network 10 is dictated by the type of wired communication network 10. If the wired communication network 10 uses asynchronous data transfer, there will be one service interface 30 for every entry point, e.g., serial port, into the wired communication network 10. In a local area network (LAN) environment, each service interface 30 may handle a variety of different network addresses. A different service interface 30 may be used for each type of wired communication network 10.

As shown in FIG. 14, the service interface 30 may include an event handler and multithreading dispatcher 90, a process initialization module 92, an inbound data event handler 94, an outbound data event handler 96, a process termination module 98 and a wired network interface module 100. The event handler and multithreading dispatcher 90 may contain high-level logic and be used to control the overall execution flow of the service interface 30. The process initialization module 92 acquires resources and establishes the operation environment of the service interface 30 process. The inbound data event handler 94 responds to signals from the interprocess communication manager 28 that inbound data is available and preprocess session control information. The inbound data event handler 94 may also handle asynchronous timer events. The outbound data event handler 96 is provided to respond to signals from wired communication network interface module 100 that outbound data is available or that a timer event has occurred. The process termination module 98 functions to release previously-acquired resources and terminate the service interface 30 process gracefully. The wired communication network interface module 100 handles low-level interaction with the associated wired communication network transport mechanism, i.e., communication protocol, being used.

Figure 15:
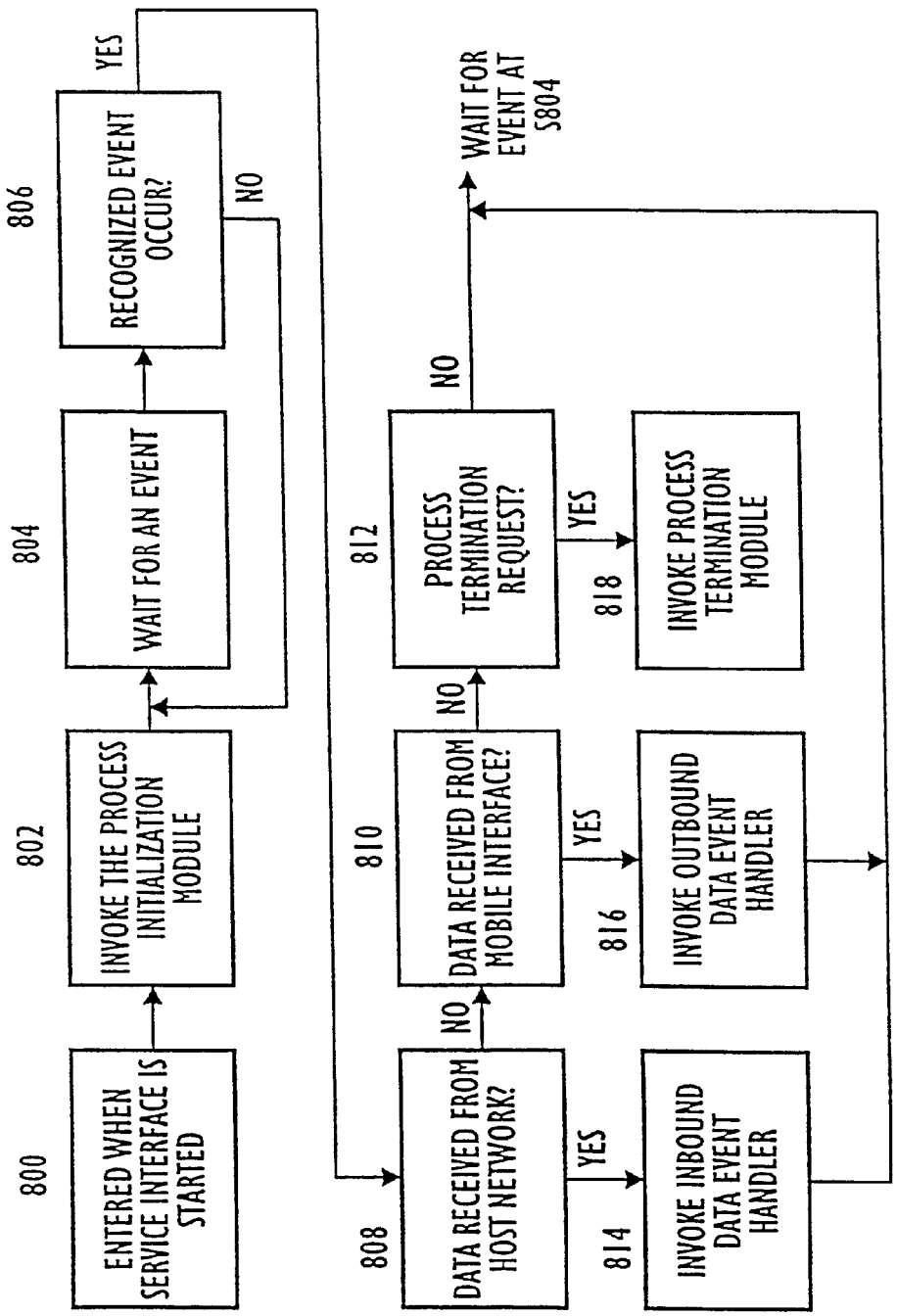
FIG. 15 is a flow chart of the processing of an event handler and multithreading dispatcher associated with the service interface of the invention.

An exemplary process flow of the event handler and multithreading dispatcher 90 (see FIG. 14) of the present invention will now be described with reference to FIG. 15. At step 800, the process begins when the service interface 30 is powered up and initialized. At step 802, the process initialization module 92 is invoked (described below with reference to FIG. 16). At step 804, the event handler and multithreading dispatcher 90 waits for an event to occur in response, e.g., to network or remote device activity. While the event handler and multithreading dispatcher 90 waits for an event to occur, the service interface 30 may be placed in a "sleep" mode to conserve processing power. At step 806, once an event occurs, the event handler and multithreading dispatcher 90 determines if it is a recognized event. Recognized events may include Initialize, Send Data, Receive Data and/or Terminate. If the event handler and multithreading dispatcher 60 determines it is not a recognized event at step 806, then processing returns to step 804. If the event handler and multithreading dispatcher 90 recognizes the event at step 806, then processing continues at step 808, where the event handler and multithreading dispatcher 90 determines if the data was received from the host communication network 10.

At step 808, if the event handler and multithreading dispatcher 90 determines the data was received from the host wired communication network 10, the event handler and multithreading dispatcher 90 invokes the inbound data event handler 94, at step 814 (described below with reference to FIG. 17) and, thereafter, processing continues at step 804. If at step 808 the event handler and multithreading dispatcher 90 determines that the data was not received from the host wired communication network 10, the event handler and multithreading dispatcher 90 then determines if the data was received from the mobile interface 24 at step 810.

If the event handler and multithreading dispatcher 90 determines at step 810 that the data was received from the mobile interface 24, then at step 816 the outbound data event handler 96 is invoked (described below with reference to FIG. 18) and, thereafter, processing continues at step 804. If the event handler and multithreading dispatcher 90 at step 810 determines that the data was not received from the mobile interface 24, then at step 812 the event handler and multithreading dispatcher 90 determines if there is a process termination request., If, at step 812, the event handler and multithreading dispatcher 90 determines there is a process termination request, then at step 818 the process termination module 98 is invoked (described below with reference to FIG. 19). However, if at step 812 the event handler and multithreading dispatcher 90 determines that there is not process termination request, then processing returns to step 804 to wait for another event.

Figure 16:
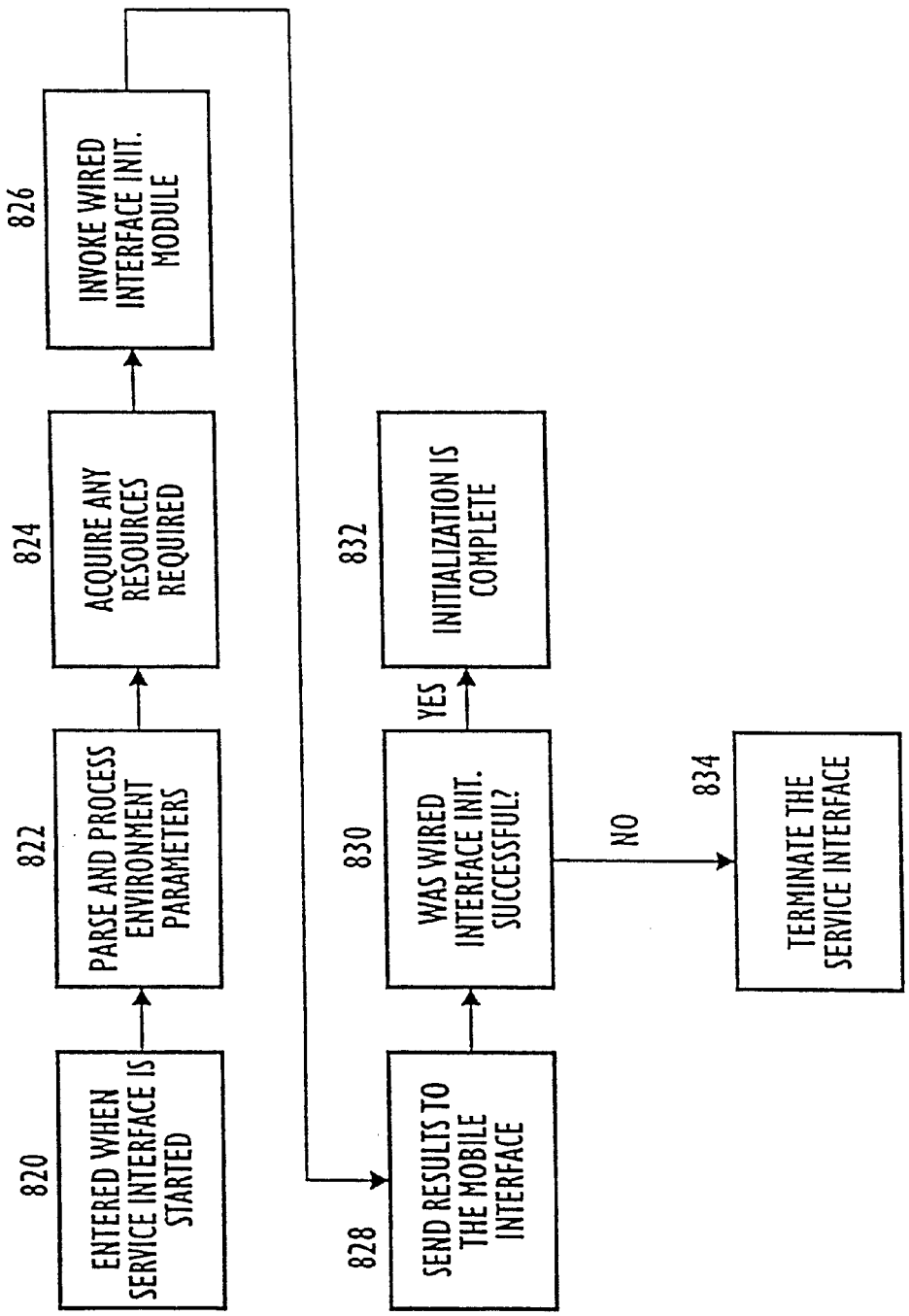
FIG. 16 is a flow chart describing the process flow of a process initialization module associated with the service interface of the invention.

Referring now to FIG. 16, there is illustrated an exemplary flow chart describing the process flow of the process initialization module 92 (see, e.g., FIG. 14) of the present invention. At step 820, the interprocess communications interface is setup when the service interface 30 is started or powered up. At step 822, the operating environment parameters are parsed and processed (i.e., the parameters of the operating environment are processed individually). At step 824, any resources required (e.g., memory) are acquired. Thereafter, at step 826, the wired communication network interface module 100 is invoked (see FIGS. 20–24 discussed below). As discussed below, the wired communication network interface module 100 may include several procedures associated with initializing the connectivity with the wired communication network 10, reading data from the wired communication network 10, writing data to the wired communication network 10, and terminating connectivity with the wired communication network 10. In accordance with an aspect of the present invention, a unique set of procedures may be provided by the wired communication network interface module 100 for each type of wired communication network 10. For example, a unique set of procedures may be provided for networks utilizing transparent asynchronous communications, TCP/IP stream sockets, Vehicle Location Reporting Facilities, Bidirectional Messaging Facilities, or Credit Card Verification Facilities.

After the wired communication network interface module 100 is invoked, the results of the previous operations performed at step 826 are sent at step 828 to the mobile interface 24. At step 830, it is determined by the process initialization module 92 if the wired communication network interface module 100 was successfully invoked at step 826. If it is determined at step 830 that the wired communication network interface module 100 was successfully invoked, then the initialization is complete at step 832, and processing returns to step 804 in FIG. 15. If, however, it is determined at step 830 that the wired communication network interface module was not successfully invoked, then the service interface 30 is terminated at step 834.

Figure 17:
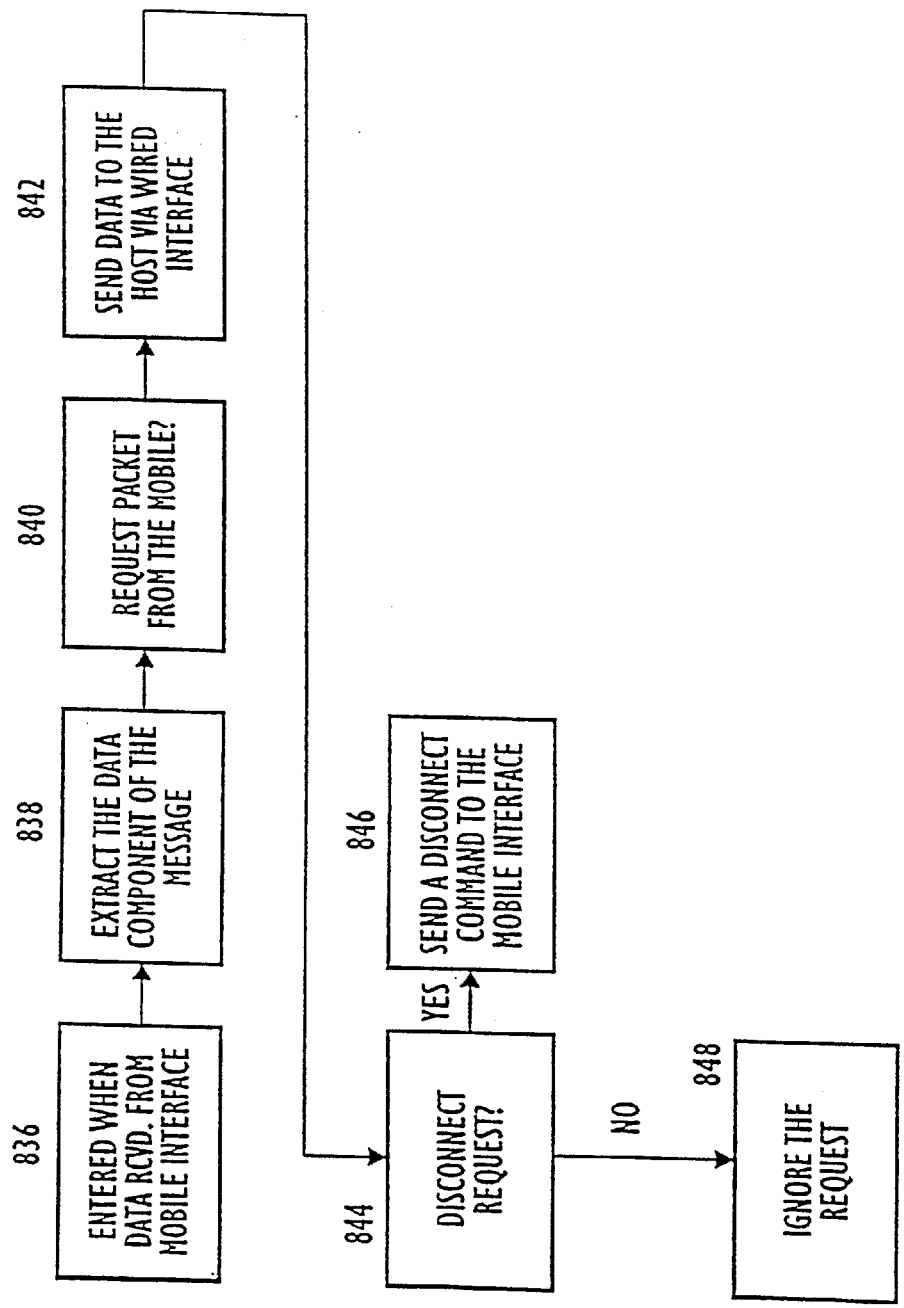
FIG. 17 is a flow chart of the processing steps for an inbound data event handler associated with the service interface of the present invention.

Referring now to FIG. 17, there is illustrated an exemplary flow chart of the processing steps for the inbound data event handler 94 (see, e.g., FIG. 14) of the present invention. At step 836, the inbound data event handler is invoked (from step 814 in FIG. 15). At step 838, the data portion of the message sent by the wired communication network 10 is extracted. At step 840, the service interface 30 requests a packet of data from the mobile interface 24. At step 842, after the packet is accepted by the service interface 30, data is sent to the appropriate destination via the wired communication network 10. The inbound data event handler 94 then waits for a disconnect request at step 844. If the inbound data event handler 94 receives a disconnect request at step 844, then a disconnect command is sent to the mobile interface 24 at step 846. Processing then continues at step 804 in FIG. 15. If, however, the inbound data event handler 94 does not receive a disconnect request at step 844, then the request received is ignored at step 848 and, thereafter, processing then continues at step 804 in FIG. 15.

Figure 18:
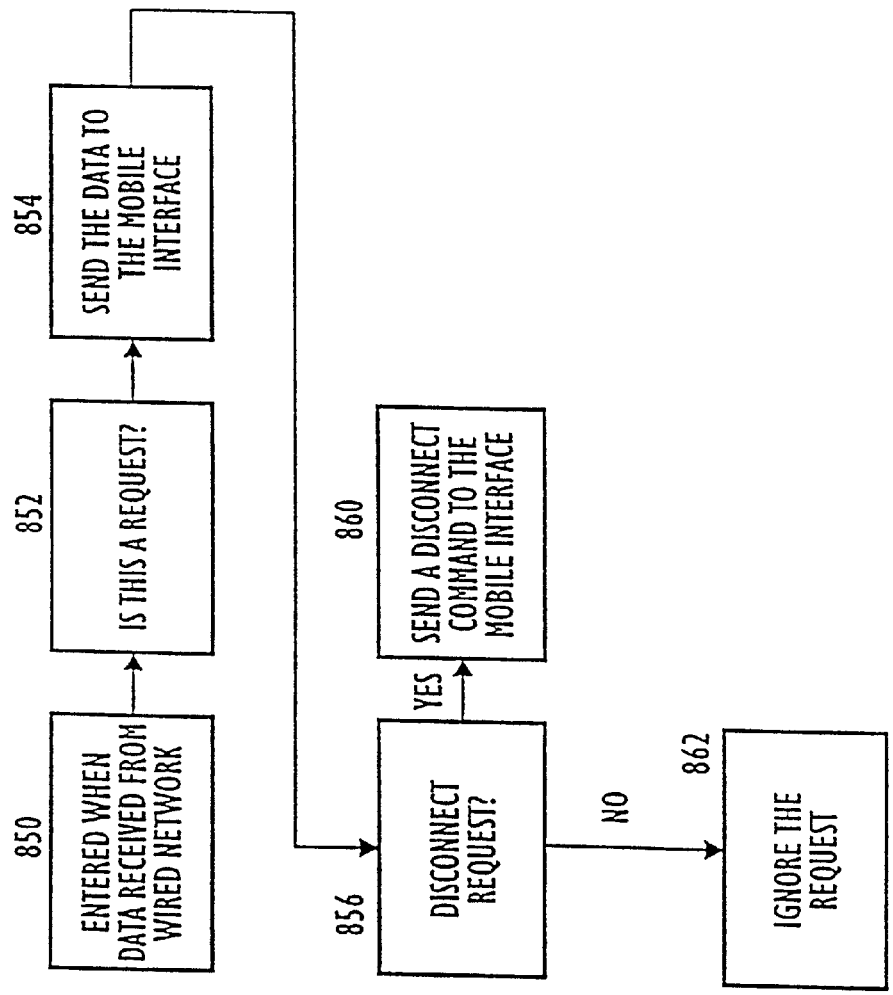
FIG. 18 is a flow chart of the processing steps for an outbound data event handler associated with the service interface of the present invention.

Referring now to FIG. 18, there is illustrated an exemplary flow chart of the processing steps for the outbound data event handler 96 (see FIG. 14) of the present invention. At step 850, the outbound data event handler is invoked (from step 816 in FIG. 15). At step 852, the outbound data event handler 96 determines if there is a request (e.g., a disconnect request from the wired communication network 10 or the remote device 52). If there is a request, then processing continues at step 856. However, if there is presently not a request, then at step 854 the outbound data from the network 10 is sent to remote device 52 via the mobile interface 24. At step 865, the outbound data event handler 96 then determines if a disconnect request has been received. If the outbound data event handler 96 receives a disconnect request at step 856, then a disconnect command is sent to the mobile interface 24 at step 860 by the interprocess communication manager 28 (see, e.g., FIG. 2). Processing then continues at step 804 in FIG. 15. If, however, the outbound data event handler 96 does not receive a disconnect request at step 856, then the request received is ignored at step 862 and processing then continues at step 804 in FIG. 15.

Figure 19:
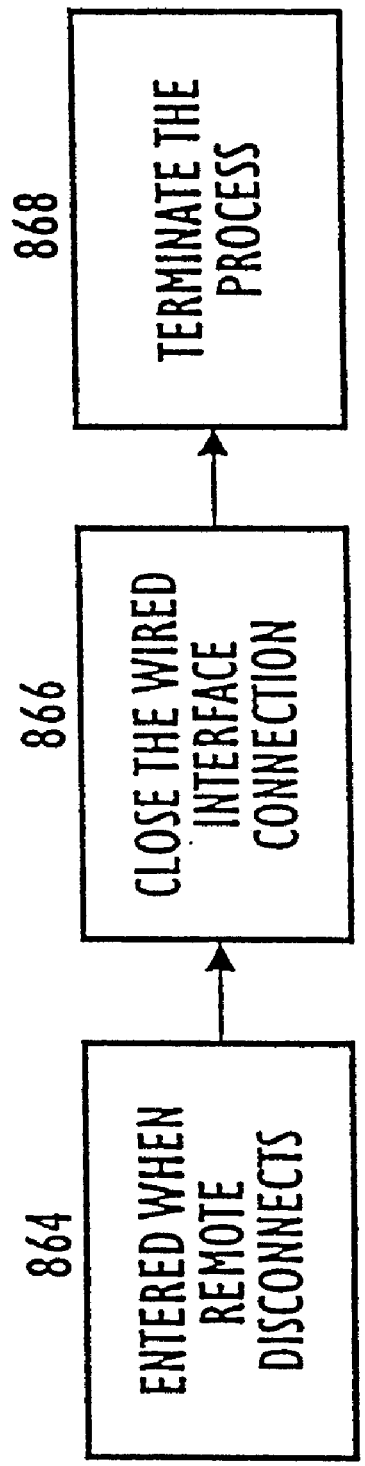
FIG. 19 is a flow chart of the processing steps for a process termination module associated with the service interface of the present invention.

Referring now to FIG. 19, there is illustrated an exemplary flow chart of the processing steps for the process termination module 98 (see FIG. 14) of the present invention. At step 864, the process termination module 98 is invoked (from step 818 in FIG. 15). At step 866, the wired communication network interface module 100 connection is closed. Thereafter, at step 868, the processes associated with the service interface 30 are terminated.

Referring now to FIGS. 20–24, there are illustrated exemplary flow charts of the various processes that may be performed by the wired communication network interface module 100 of the present invention. The wired communication network interface module 100 may consist of a number of discrete functions which provide the service interface 30 with a uniform means of communicating with various host computer networks, irrespective of the communication protocols of the wired communication network 10. All protocol and other feature-specific communications translation and handling is performed at the wired communication network interface module 100. The wired communication network interface module 100 may be designed for networks utilizing different implementations, such as transparent asynchronous communication, Hayes compatible communication, TCP/IP stream socket, Bidirectional Messaging Facilities, File Transfer Facilities, SNA Protocol Enveloping, Vehicle Location Reporting Facilities, Credit Card Verification Facilities, and Harris DNP 3.0 Frame Relay. As noted above, a unique set of procedures may be provided by the wired communication network interface module 100 for each type of wired communication network 10. Examples of several of these sets of procedures are provided below.

Figure 20:
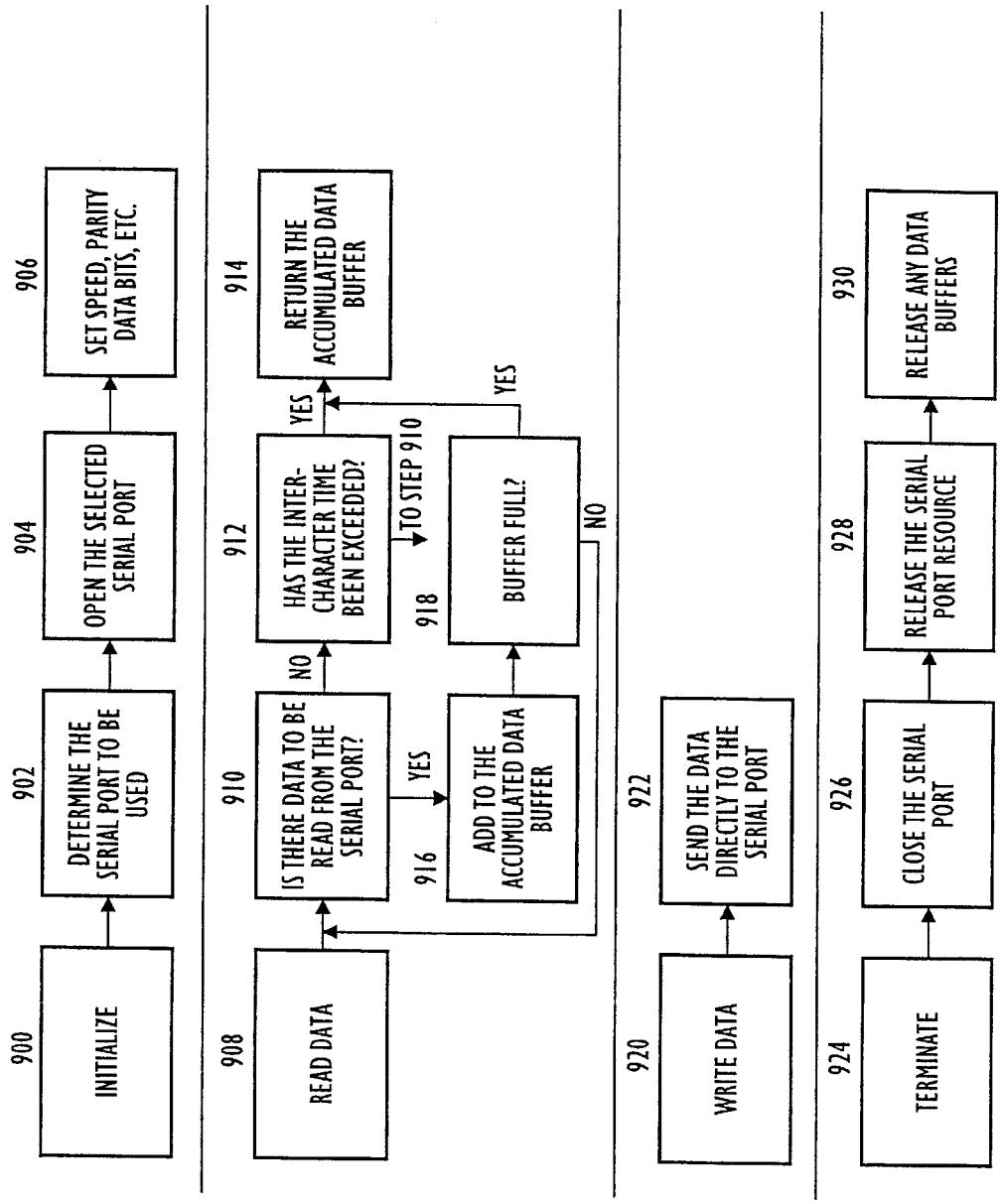

Referring now to FIG. 20, there is illustrated an exemplary flow chart of the set of procedures associated with the wired communication network interface module 100 that are designed for transparent asynchronous communication networks. At step 900, an initialization process begins in accordance, for example, with step 802 of FIG. 15. At step 902, the serial port of the wired communication network 10 that is to be used is determined, and the identified port is opened or accessed at step 904. At step 906, the speed (bps), the parity (odd or even), and the data bits for communication with the network 10 are established along with other appropriate parameters.

At step 908 a data read operation begins. The data read routine may be invoked by the outbound data event handler 96 at step 850 (see FIG. 18). Initially, at step 910, the wired communication network interface module 100 determines if there is data to be read from the serial port. If at step 910 the wired communication network interface module 100 determines there is data to be read, then at step 916 the data is added to an accumulated data buffer within the remote network controller 20. At step 918, if the wired communication network interface module 100 determines that the data buffer is full, then at step 914 the data accumulated in the buffer is returned to the calling module. If, however, at step 910 the wired communication network interface module 100 determines there is no data to be read from the serial port attached to the network 10, then at step 912 it is determined if the inter-character time (e.g., a predetermined character receipt delay time) has been exceeded. If at step 912 the inter-character time has been exceeded, then at step 914 the accumulated data buffer is returned to the calling module to be further processed. Otherwise, if the inter-character time has not been exceeded, then processing continues at step 910 so that the wired communication network interface module 100 may again determine if there is data to be read from the serial port.

At step 920, a write data routine is started. The write data routine may be initiated by the inbound data event handler 94 at step 836 in FIG. 17. At step 922, the data is sent directly to the serial port of the wired communication network 10. The write data routine is thereafter completed.

At step 924, a terminate routine is initiated. The terminate routine may be initiated in accordance with a terminate request at step 818 in FIG. 15. In response to initiation of the terminate routine, the serial port of the network 10 is closed at step 926. Thereafter, at step 928, the serial port resource is released so it may be used by another process. Finally, at step 930, any data buffers in use are also released.

Referring now to FIG. 21, there is illustrated exemplary flow charts of the set of procedures associated with the wired communication network interface module 100 for networks utilizing TCP/IP stream socket connectivity. At step 932, an initialization process begins in accordance, for example, with step 802 of FIG. 15. At step 934, a host network and serial port to be used are determined. At step 936, an appropriate socket is created. At step 938, the socket server is accessed for data transport.

At step 940 a data read operation begins. The data read routine may be invoked the outbound data event handler 96 at step 850 (see FIG. 18). Initially, at step 942, the wired communication network interface module 100 determines if there is data to be read from the socket. If at step 942 the wired communication network interface module 100 determines there is data to be read, then at step 944 the data buffer is returned to the remote network controller 20 for further processing.

At step 946, a write data routine is started. The write data routine may be initiated by the inbound data event handler 94 at step 836 in FIG. 17. At step 948, the data is sent by the wired network interface module 100 directly to the socket at the wired communication network 10. The write data routine is thereafter completed.

At step 950, a terminate routine is initiated. The terminate routine may be initiated in accordance with a terminate request at step 818 in FIG. 15. Initially, the socket is closed at step 952. Thereafter, at step 954, the socket resource is released so it may be used by another process. Finally, at step 956, any data buffers in use are also released.

Referring now to FIG. 22, there is illustrated exemplary flow charts of the set of procedures associated with the wired communication network interface module 100 for use with networks utilizing Vehicle Location Reporting Facilities. At step 958, an initialization process begins in accordance, for example, with step 802 of FIG. 15.

At step 960 the wired communication network interface module 100 determines a position recording file to be used to record data. The position recording file may be stored within the wired communication network 10. At step 962, the position recording file is accessed from the network 10. Thereafter, at step 964, the recording interval is placed into a read buffer that may be provided to the remote device 52 via the mobile data controller 54.

At step 966 a data read operation begins. The data read routine may be invoked by the outbound data event handler 96 at step 850 (see FIG. 18). Initially, at step 968, the wired communication network interface module 100 determines if there is data in the read buffer. If at step 968 the wired communication network interface module 100 determines there is data in the read buffer, then at step 970 the contents of the read buffer is returned to the calling module.

At step 972, a write data operation is started. The write data routine may be initiated by the inbound data event handler 94 at step 836 in FIG. 17. Initially, at step 974, the wired communication network interface module 100 determines if a full Global Positioning Satellite (GPS) message has been accumulated. If at step 974, the wired communication network interface module 100 determines that a full GPS message has not been accumulated, then no action is taken at step 980. If at step 974, the wired communication network interface module 100 determines that a full GPS message has been accumulated, then the message is converted at step 976 to a standard form usable by the wired communications network 10. At step 978, the position recording file at the host is appended with the GPS message.

At step 982, a terminate routine is initiated. The terminate routine may be initiated in accordance with a terminate request at step 818 in FIG. 15. The terminate routine may comprise closing the position recording file at step 984.

Figure 23A:
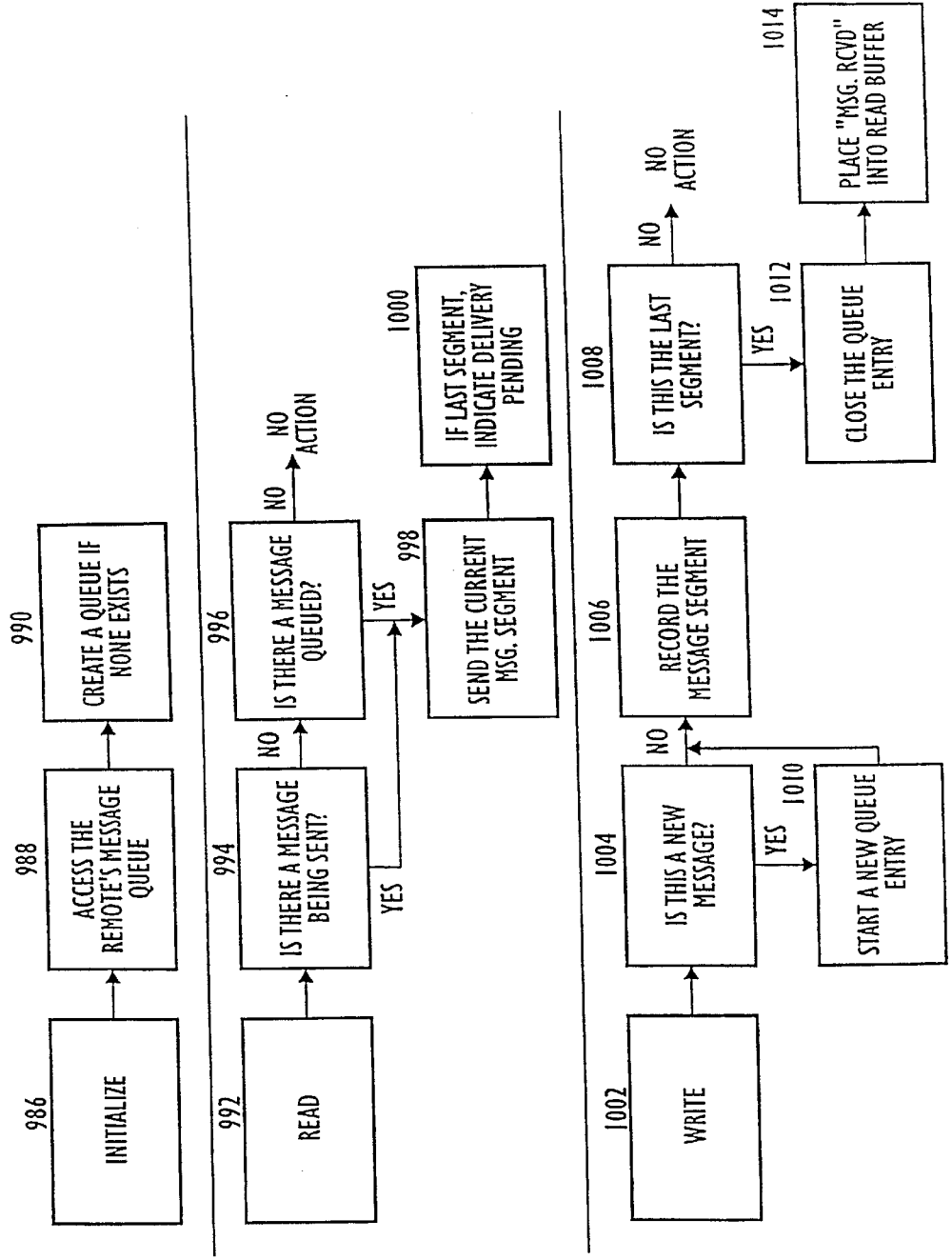
Figure 23B:
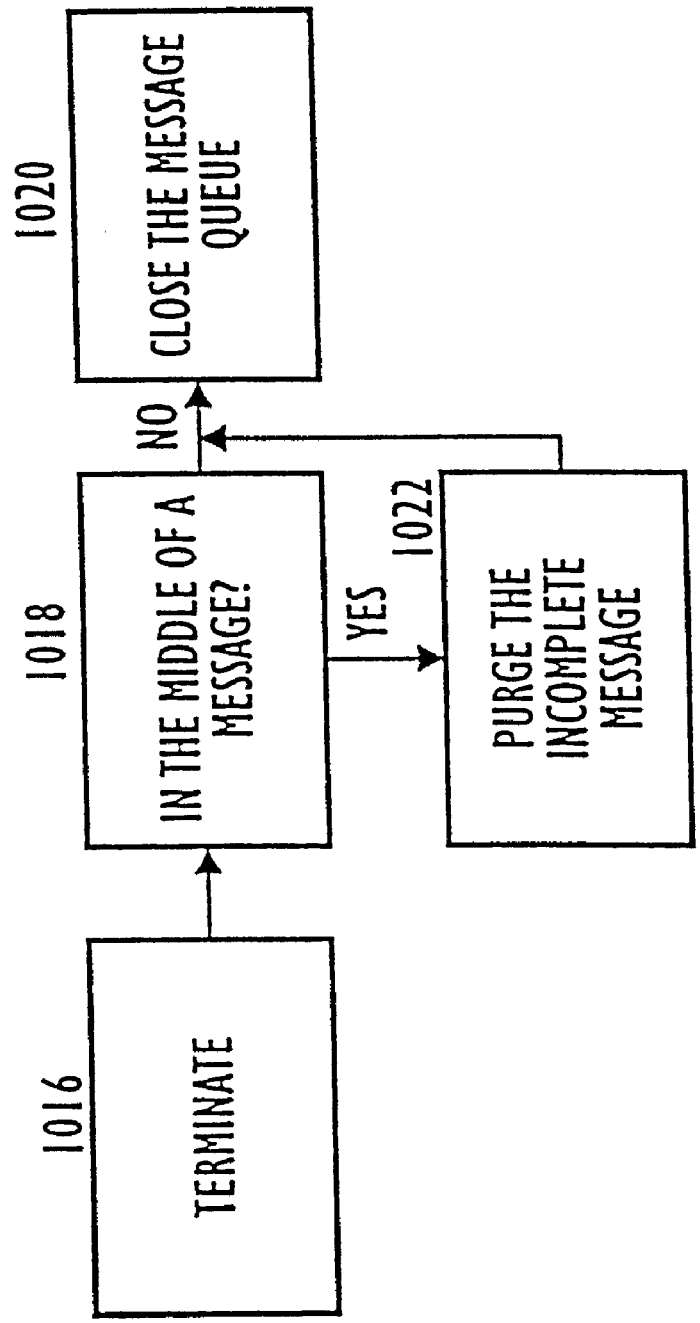

Referring now to FIGS. 23A and 23B, there is illustrated exemplary flow charts of the set of procedures associated with the wired communication network interface module 100 that are designed for networks utilizing Bidirectional Messaging Facilities or Store and Forward Messaging Facilities. Referring to FIG. 23A, at step 986, an initialization process begins. The initialization process may be started in accordance, for example, with step 802 of FIG. 15. At step 988, a message queue for the remote device 52 is accessed. Thereafter, at step 990, if no queue exists for the remote device 52, a message queue is created at the remote network controller 20.

At step 992 a data read operation begins. The data read routine may be invoked by the outbound data event handler 96 at step 850 (see FIG. 18). Initially, at step 994, the wired communication network interface module 100 determines if a message is in the process of being sent. If at step 994 the wired communication network interface module 100 determines that a message is being sent, then at step 998, the current message segment is sent by the remote device 52 to the wired communication network 10. If at step 994 the wired communication network interface module 100 determines that no message is being sent, then at step 996, the wired communication network interface module 100 determines if there is a message queued. If at step 996 the wired communication network interface module 100 determines that no messages are queued then no action is taken. However, if at step 996 the wired communication network interface module 100 determines that there is a message queued for the remote device 52, then the current message queued is sent at step 998. After the last segment of the message is sent, the wired communication network interface module 100 may indicate that delivery of the message is pending to the remote device 52 at step 1000.

At step 1002, a write data routine is initiated. The write data routine may be initiated by the inbound data event handler 94 at step 836 in FIG. 17. Initially, at step 1004, the wired communication network interface module 100 determines if a new message is present. If at step 1004 the wired communication network interface module 100 determines that a new message is present, then at step 1010 the wired communication network interface module 100 starts a new queue entry. Thereafter, processing continues at step 1006, where the message segment is recorded. At step 1008, the wired communication network interface module 100 determines if this is the last segment. If at step 1008 the wired communication network interface module 100 determines that it is the last segment, then at step 1012, the queue entry is closed and "Message Received" message may be placed into the read buffer at step 1014 to be sent to the remote device 52. If at step 1008, the wired communication network interface module 100 determines that it is not the last segment, then no action is taken.

Referring to FIG. 23B, at step 1016, a terminate routine is started. The terminate routine may be initiated in accordance with a terminate request at step 818 in FIG. 15. At step 1018, the wired communication network interface module 100 determines if the terminate request has come in the middle of a message. If at step 1018, the wired communication network interface module 100 determines that the request came in the middle of a message, then the message is purged at step 1022. Processing then continues at step 1020, where the wired communication network interface module 100 closes the message queue.

Referring now to FIG. 24, there is illustrated flow charts of the set of procedures associated with the wired communication network interface module 100 designed for use with networks utilizing Credit Card Point-of-Sale Facilities. At step 1024, an initialization process begins. The initialization process may be started in accordance, for example, with step 802 of FIG. 15. In accordance with the invention, no action is required for the initialization procedure.

At step 1026 a data read operation begins. The data read routine may be invoked the outbound data event handler 96 at step 850 (see FIG. 18). Initially, at step 1028, the wired communication network interface module 100 determines if there is a response from a server attached to the wired communication network 10. If at step. 1028 the wired communication network interface module 100 determines there is a response from the server, then at step 1030 the response is read, and the response buffer is returned to the remote device 52 at step 1032. If at step 1028 there is no response from the server, then no action is taken.

At step 1034, a write data operation is started. The write data routine may be initiated by the inbound data event handler 94 at step 836 in FIG. 17. At step 1036, the wired communication network interface module 100 first determines if a full request by the remote device 52 has been accumulated. If at step 1036 the wired communication network interface module 100 determines that a full request has not been accumulated, then the remote device 52 continues to accumulate a request at step 1042. If at step 1036 a full request has been accumulated, then at step 1038, the request is formatted for the server on the wired communications network 10. Thereafter, the request is placed into the server file at step 1040.

At step 1044, a terminate routine is illustrated. The terminate routine may be initiated in accordance with a terminate request at step 818 in FIG. 15. According to the present invention, no action is necessary for the terminate routine.

Referring now to FIG. 25, there is illustrated a block diagram of the various components of the mobile data controller 54, according to another aspect of the present invention. The mobile data controller 54 may be specifically designed to match the asynchronous data transferred to and from the remote device 52 to the radio infrastructure 56 protocol. Typically, there is one type of mobile data controller 54 that is associated with a host data controller 22 which is connected to the mobile interface 24 of the remote network controller 20. In addition, the mobile data controller 54 may have a unique identifier associated with it for routing purposes.

In accordance with the present invention, the mobile data controller 54 may be implemented by any combination of hardware and software. For example, the mobile data controller 54 may comprise a commercially available processor with overlying software and random access memory. The software running in the mobile data controller 54 may be written in Z80 or other appropriate processor-based (i.e., native) assembly language and configured to the specific radio infrastructure 56. The software may specify the various voltage levels and logic signals necessary to communicate via the RF communications infrastructure 56. As noted above, the mobile data controller 54 may translate and pass any protocols associated with the wired communications network 10 to and from the remote device 52 to make it appear to the wired communication network 10 that the remote device 52 is locally-attached.

The mobile data controller 54 is configurable over the radio infrastructure 56. configuration information may be input by an operator at the remote network controller 20 through the console interface 34 (see FIG. 2) and passed over the radio infrastructure 56 to the mobile data controller 54. This allows parameters such as packet size to be changed at the host wired communications network 10 without the necessity of altering the mobile data controller 52 in the field.

As shown in FIG. 25, the mobile data controller 54 may comprise an RF communications interface module 106, a remote device communications interface module 102, and a configuration and monitoring module 104. The mobile data controller 54 may be connected to the remote device 52 via a communication port 108 for sending and receiving data. The remote device communications interface module 102 is connected to the remote device 52 via the communication port 108 and is responsible for sending data to, and receiving data from, the remote device 52. The communication port 108 may comprise, for example, an RS-232 adapter.

The configuration and monitoring module 104 is specific to the type of radio infrastructure 56 employed. Software parameters, such as the number of subsystem ports, how often to send health and status requests, and a list of host data controllers 22 to which the mobile data controller 54 can communicate, may be set and stored in the configuration and monitoring module 104. The configuration and monitoring module 104 can also accumulate statistics which are passed to the host data controller 22.

In order to diagnose potential system errors in the mobile data controller 54, an operator may be provided with the ability to field test and analyze the mobile data controller via an external diagnostic port 112 to determine a cause of the system error or failure. The diagnostic port 112 may be used not only to determine if the mobile data controller 54 is operational, but also can be used to configure software parameters to determine the type of the radio infrastructure 56. These parameters can be changed to communicate with a different type of radio infrastructure 56 as necessary.

The RF communications interface module 106 is responsible for sending and receiving the data via radio-frequency (RF) transmission. The RF communications interface module 106 is specific to the radio infrastructure 56 used, and is connected to the radio infrastructure 56 through a communication line 110. Because the mobile data controller 54 is designed to integrate with an existing radio infrastructure 56, each mobile data controller 54 may be software configured, for purposes of flexibility, to work with many types of radio infrastructure 56 protocols. The RF communications interface module 106 may also send health and status information regarding the mobile data controller 54 to the host data controller 22. This information may inform the remote network controller 20 that the mobile data controller 54 is operational and the remote device 52 is accepting data.

According to the present invention, the RF communication interface module 106 may include a commercially available modem (not shown). The modem may be selected depending on the data rate(s) of the communication line 100 and the radio infrastructure 56. More than one modem may be provided if multiple data rates are required. Optionally, the modem can be implemented using a Digital Signal Processing (DSP) chip and associated software. The DSP chip can be a commercially available programmable signal processing chip. In such a case, the DSP implementation will allow a single modem to be changed (e.g., by uploading new parameters to the DSP software) in order to communicate with a plurality of different types of radio infrastructures 56 having distinct protocols and data rates.

Similar to the host data controllers 22, the mobile data controllers 54 may be compatible with, for example, conventional point-to-point radio systems, conventional repeater-based radio systems, LTR Trunking, Motorola Trunking, Ericsson (EDACS) Trunking-Voice Path, EDACS RDI Trunking-Data Path, and EDACS IMC Voice Path based radio infrastructures 56.

Referring again to FIG. 2, a brief description of the interprocess communications manager 28 will be provided. According to the present invention, the interprocess communications manager 28 is responsible for routing all communication between the various modules and interfaces within the remote network controller 20. The interprocess communications manager 28 creates a logical route from the remote device 52 to the service interface 30 of the remote network controller. The interprocess communications manager 28 passes routing information which determines from which radio infrastructure 56 and remote device 52 the inbound data has come from, and to which radio infrastructure 56 and remote device 52 the outbound data will be sent.

The interprocess communications manager 28 may also pass information generated by the remote network controller 20, which is independent of the data and routing information. This information may include internal parameters and error detection codes. The interprocess communications manager 28 also interfaces with the control process module 26. The control process 26 may act as the "central hub" of the remote network controller 20. The control process 26 provides resource management, process management, session management, configuration management and system statistics management within the remote network controller 20.

As further shown in FIG. 2, the remote network controller 20 also includes a console interface 34. The console interface 34 may be adapted to allow a network operator to configure and control the wireless Network Interfaces described above, the mobile user characteristics and the configuration information of the wired communications network 10. The console interface 34 may be a stand-alone platform having a commercially available processor (e.g., an Intel or Motorola based processor) and an Ethernet controller card for communicating, for example, with another remote network controller 20.

Referring now to FIG. 26, there is illustrated a remote gateway 120, in accordance with another aspect of the present invention. As shown in FIG. 26, the remote gateway 120 is comprised of a transparent communications module 122, a field service interface module 128, a configuration and health module 124 and a RF communications module 126. The remote gateway 120 is functionally similar to the mobile data controller 54. However, the remote gateway 120 is a specific type of mobile data controller that may be used to attach to a remote telemetry unit for monitoring, for example, electrical power distribution.

The transparent communications module 122 is responsible for communicating with a terminal device, typically a Remote Telemetry Unit (RTU) located in the field, and accepts data from the RF communications module 126. As shown in FIG. 26, the transparent communications module 122 may be connected to a RTU 133 via a communication line 130. The transparent communications module 122 does not recognize any protocol, but handles hardware flow control and buffering and packetizing. Data communication between the transparent communications module 122 and the RTU 133 may be carried through asynchronous serial transfer.

The RF communications module 126 is configured to communicate with the remote network controller 20 using whatever protocol is required for data transport over the radio infrastructure 56. The RF communications interface module 126 interfaces with the radio infrastructure 56 in a similar manner as previously described above with regard to the RF communications interface module 106. The RF communications interface module 126 accepts data from the transparent communications module 122 and delivers it to the radio infrastructure 56 for transmission to the remote network controller. The RF communications interface module 126 detects collisions with inbound RF data and restarts outbound transmissions. The RF communications interface module 126 performs error/retry functions and notifies the transparent communications module 122 of successes or failures.

The field service interface module 128 allows a technician to field test the remote gateway 120 and troubleshoot the remote gateway should a system error or problem arise. An external diagnostic port 112 connected to the field service interface module 128 may be provided for this purpose. The field service interface module 128 may interact with the configuration and health module 124 to query, set, and reset local configuration of the remote gateway 120.

The configuration and health module 124 may accept configuration information from the remote network controller 20 via the radio infrastructure 56 and adjust the operating parameters of the remote gateway 120 accordingly. The configuration and health module 124 may also monitor and determine if the RF communications module 126 has successfully transmitted a packet of information to the host data controller 22 by analyzing the data stream. If a packet of information has not been successfully transmitted, the configuration and health module 124 may direct the RF communications module 126 to resend the packet of information to the host data controller 22.

Figure 27:
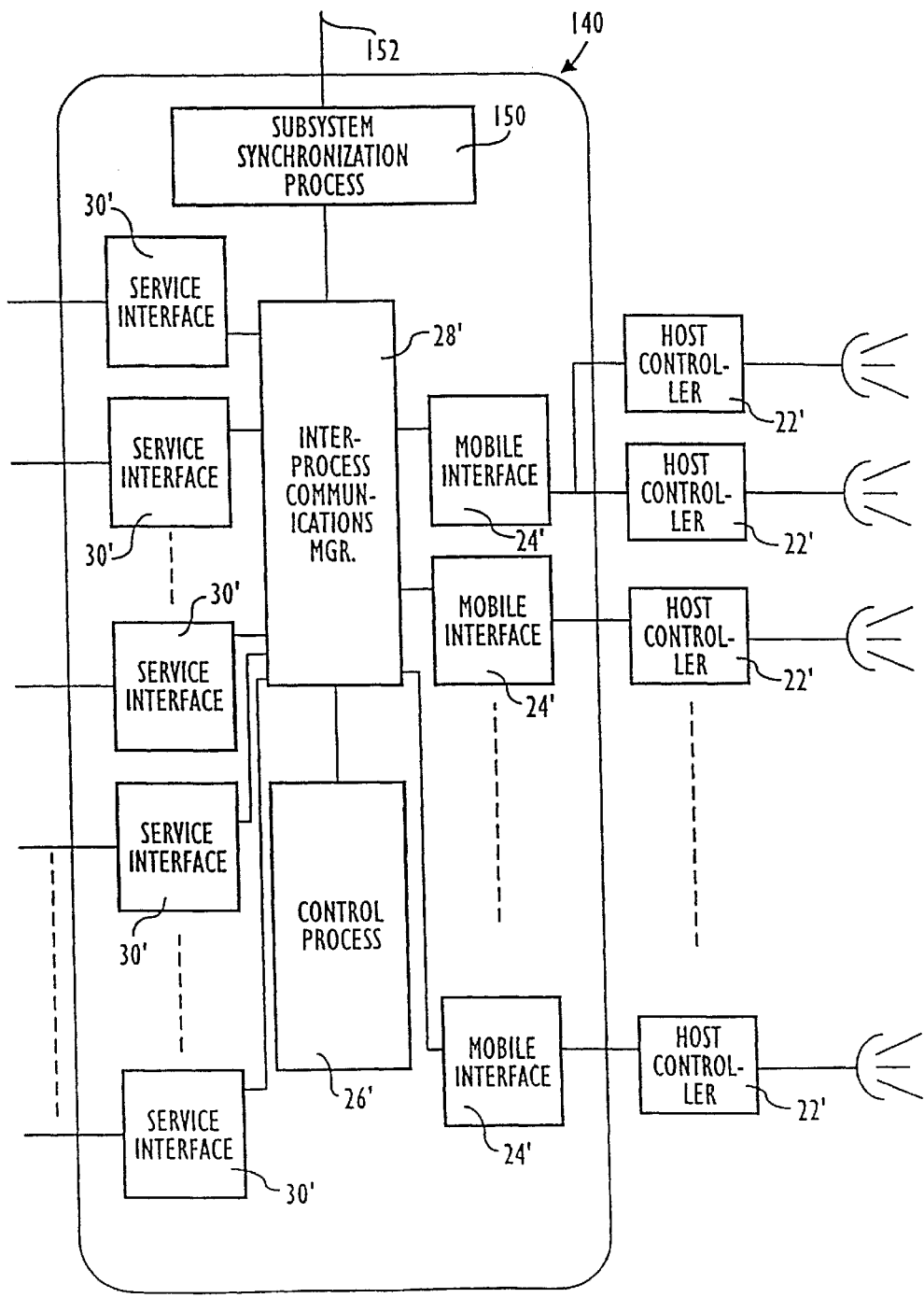
FIGS. 27 and 28 illustrate a block diagram of a remote network controller in accordance with still another aspect of the present invention, in which a subsystem synchronization process module is utilized.
Figure 28:
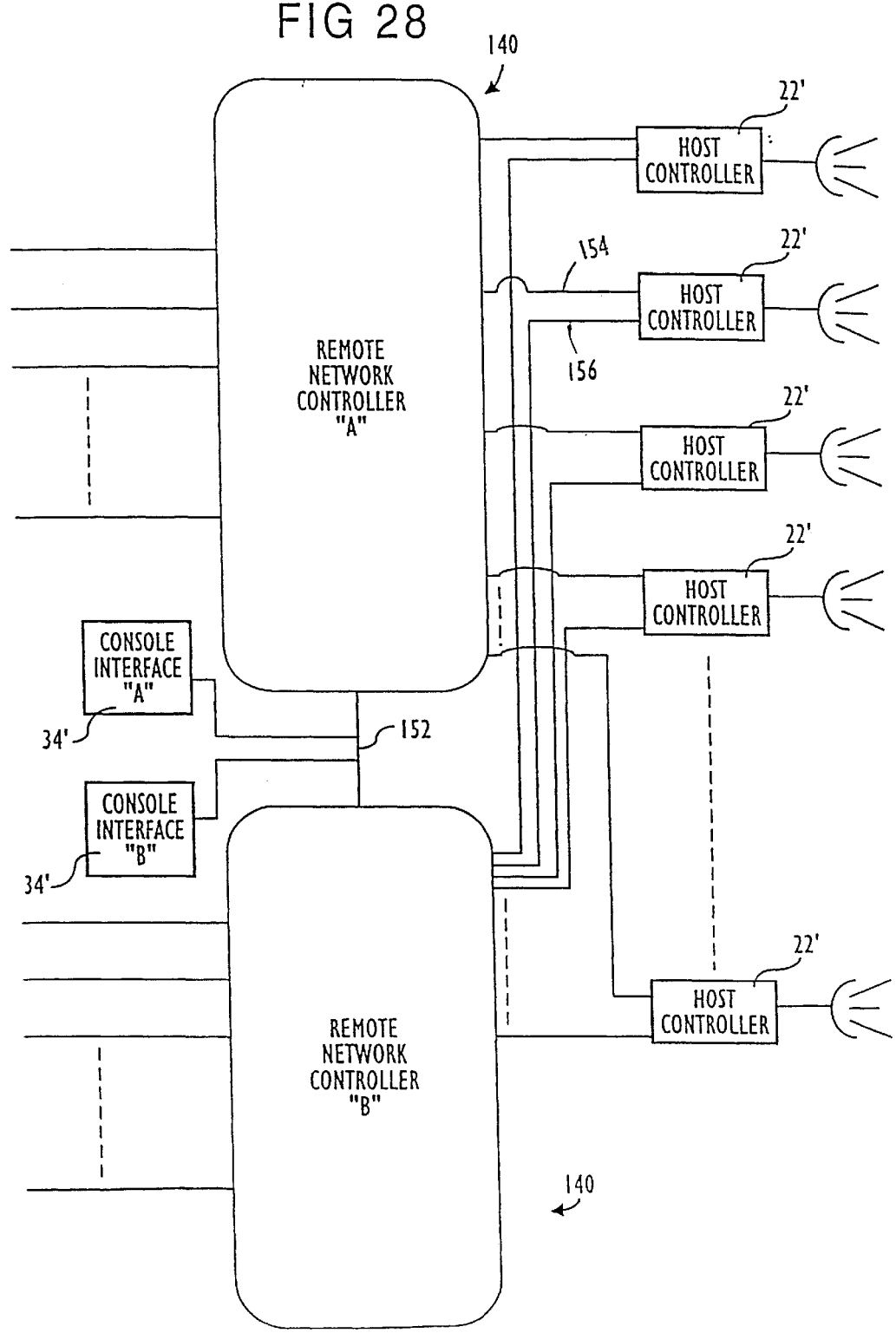

Referring now to FIGS. 27 and 28, there is illustrated a block diagram of an integrated remote network controller 140 according to another aspect of the present invention. The components of the remote network controller 140 that are similar to that discussed above with respect to FIG. 2 are designated with the same reference numeral and also with a prime ("'") added thereto.

As shown in FIG. 27, the remote network controller 140 according to another aspect of the present invention may include one or more service interfaces 30', an interprocess communications manager 28', a control process 26', one or more mobile interfaces 24', and a subsystem synchronization processor 150 which is used to link one or more remote network controllers 140 together (see FIG. 28). As further shown in FIG. 27, one or more host data controllers 22' are connected to the mobile interfaces 24' and provided externally to the remote network controller 140. The number of host data controllers 22' and mobile interfaces 24' may be dependent on the number of radio infrastructures 56 present. In addition, the number of service interfaces 30' may be dependent on the number and type of wired communications networks 10 present.

According to an aspect of the present invention, two remote network controllers 140 may be linked by a local network 152 (see FIG. 28). This configuration provides a redundant system which insures greater reliability of communication between the remote device 52 and the wired communications network 10. For example, should any particular component fail, such as a host controller 22' or an interprocess communications manager 28', the remote device 52 can still communicate with the wired communication network 10 because of the redundancy of the components of the remote network controllers 140 provided.

There are two main implementations of this system according to the present invention. With the first implementation, only one of the remote network controllers 140 is operating at any given time. Should the operational remote network controller 140 fail, the other remote network controller 140 may immediately take its place. For example, if remote network controller "A" fails, then remote network controller "B" may be activated to take its place.

Under the second implementation, a distributed processing scheme is utilized and both of the remote network controllers 140 are operated at the same time. According to the distributed processing scheme, the processing load (e.g., event handling and data transfer) may be distributed among the operational remote network controllers 140. Should a particular remote network controller 140 (e.g., controller "B") fail, the remaining operational remote network controller 140 (e.g., controller "A") will handle the entire processing load.

The above-mentioned distribution of the processing load is generally a function of the radio infrastructure 56, and not the processing capacity of the remote network controllers 140. This is because performance increases are mainly based on the number of available communications channels, rather than the raw processing capability of the remote network controllers 140 attached to the wired communications network 10. For example, if the radio infrastructure 56 is a trunking radio network with five channels, it is possible for all five channels to be simultaneously allocated and used by the remote network controllers 140. On the other hand, if there is only one channel available in the radio infrastructure 56, then only one remote network controller 140 can access the radio infrastructure 56 at a time; as a result, no performance gain may be realized by employing multiple remote network controllers 140 when only limited channels are available.

As illustrated in FIG. 28, the local network 152 is used to connect the remote network controllers 140 together. The local network 152 may be, for example, an Ethernet local area network. Each of the remote network controllers 140 includes a subsystem synchronization process module 150 that is connected to the local network 152. Two separate console interfaces 34' may also be attached to the local network 152. Each console interface 34' may be attached to the local network 152 to allow an operator to configure and control a particular remote network controller 140.

The subsystem synchronization process module 150 may be implemented through any combination of hardware and software and is responsible for keeping track of all routing tables and health and status information associated with both of the remote network controllers 140. Each subsystem synchronization process module 150 is connected to an interprocess communications manager 28' of one of the remote network controllers 140 and may access all routing tables and health and status information with respect to the remote network controller from the interprocess communications manager. The health and status information and routing tables may be periodically updated based on the status of and events present at the remote network controller 140. The periodically updated health and status information and routing tables may then be shared with the other subsystem synchronization process module 150 via the local network 152 so that the tables and information associated with both of the remote network controllers 140 is maintained in each of the subsystem synchronization process modules 150. Since the tables and information are periodically updated, a synchronization routine may be provided so that the information and tables are sent to the respective subsystem synchronization process modules 150 at predetermined intervals. If a particular subsystem synchronization process module 150 does not send or receive the tables and information, or if a particular subsystem synchronization process module 150 sends information indicating that one of the remote network controllers 140 has malfunctioned, the other subsystem synchronization process module 150 may reroute any existing connections to the host data controllers 22' and to the wired network 10 of the malfunctioning remote network controller 140 to the remaining operational remote network controller 140.

As further shown in FIG. 28, the host data controllers 22' have two ports, 154 and 156, that are connected to a different remote network controller 140. As in FIG. 52, the remote network controller 140 communicates to the host data controller 22' and sends health and status information through the ports. If the host data controller 22' does not receive information that one of the remote network controllers 140 is operational, the host controller 22' can switch ports, e.g., from port 154 to port 156, in order to communicate with the other remote network controller 140.

While the invention has been described with references to several exemplary embodiments, it is understood that the words which have been used herein are words of description and illustration, rather than words of limitation. Changes may be made, within the purview of the appended claims, without departing from the scope and spirit of the invention in its aspects.

For example, although FIG. 28 only shows two remote network controllers 140 that are connected by a local network 152, it is possible to connect two or more remote network controllers by the local network 152 to provide increased redundancy. In addition, a plurality of local networks 152 may be provided to connect the remote network controllers. Other modifications to the present invention may include selectively processing inbound and outbound data in a different logic order and/or by different components. In accordance with such a modification, processing functions may be performed only by the control process, or in the interprocess communication manager. Another application may be combining the mobile interface with a host data controller, and placing the integrated unit within the remote network controller.

Figure 29:
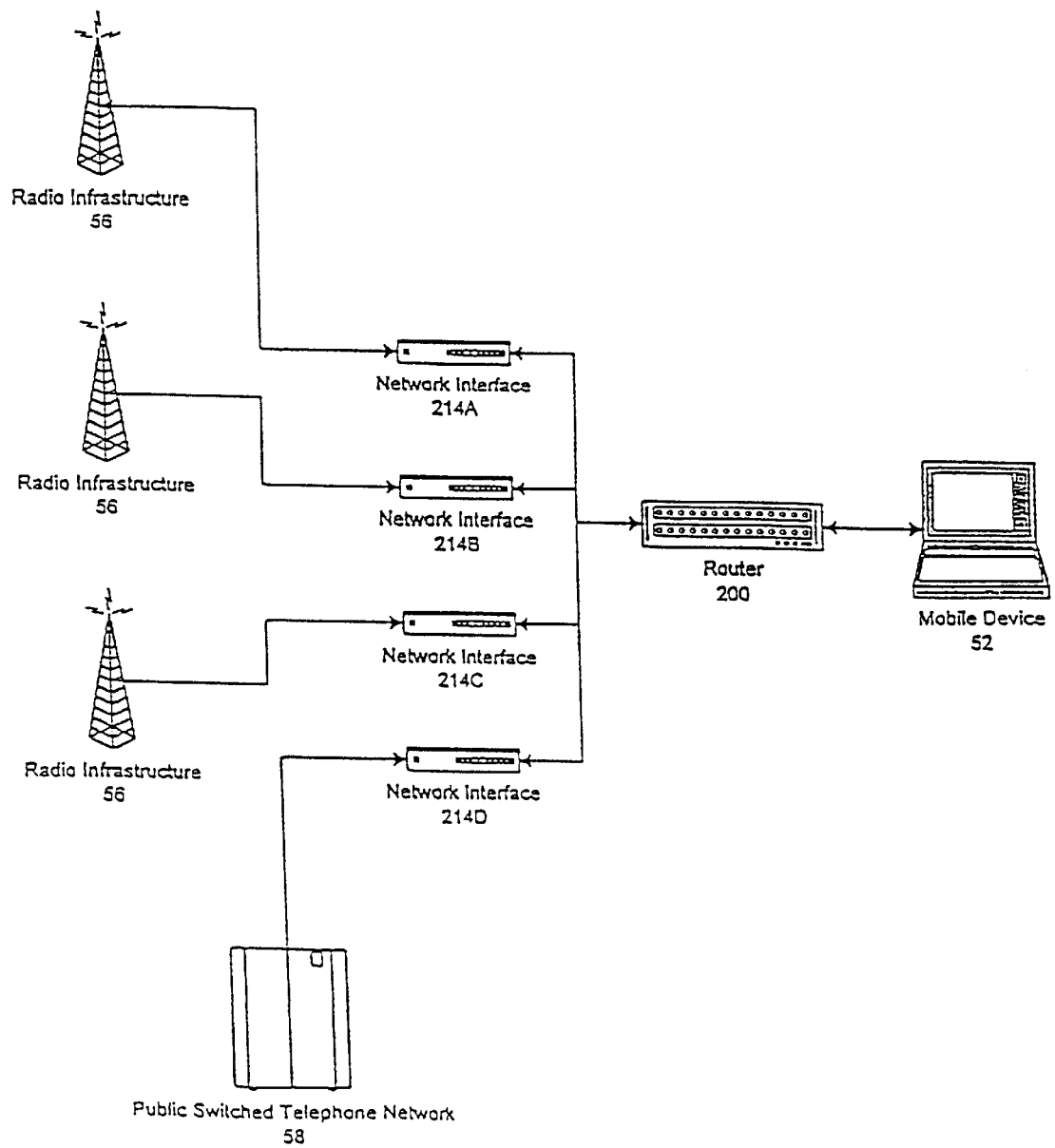
FIG. 29 illustrates a general overview of another embodiment of the present invention which includes a mobile router in accordance with an aspect of the present invention.

Referring now to FIG. 29, therein is illustrated a general overview of another embodiment of the present invention which includes a mobile Router 200 in accordance with an aspect of the present invention. The Router 200 provides the mobile application or device 52 with the capability to selectively transmit and receive data over a plurality of radio frequency infrastructures 56 and/or the public switched telephone network 58 in accordance with user configured parameters.

Figure 30:
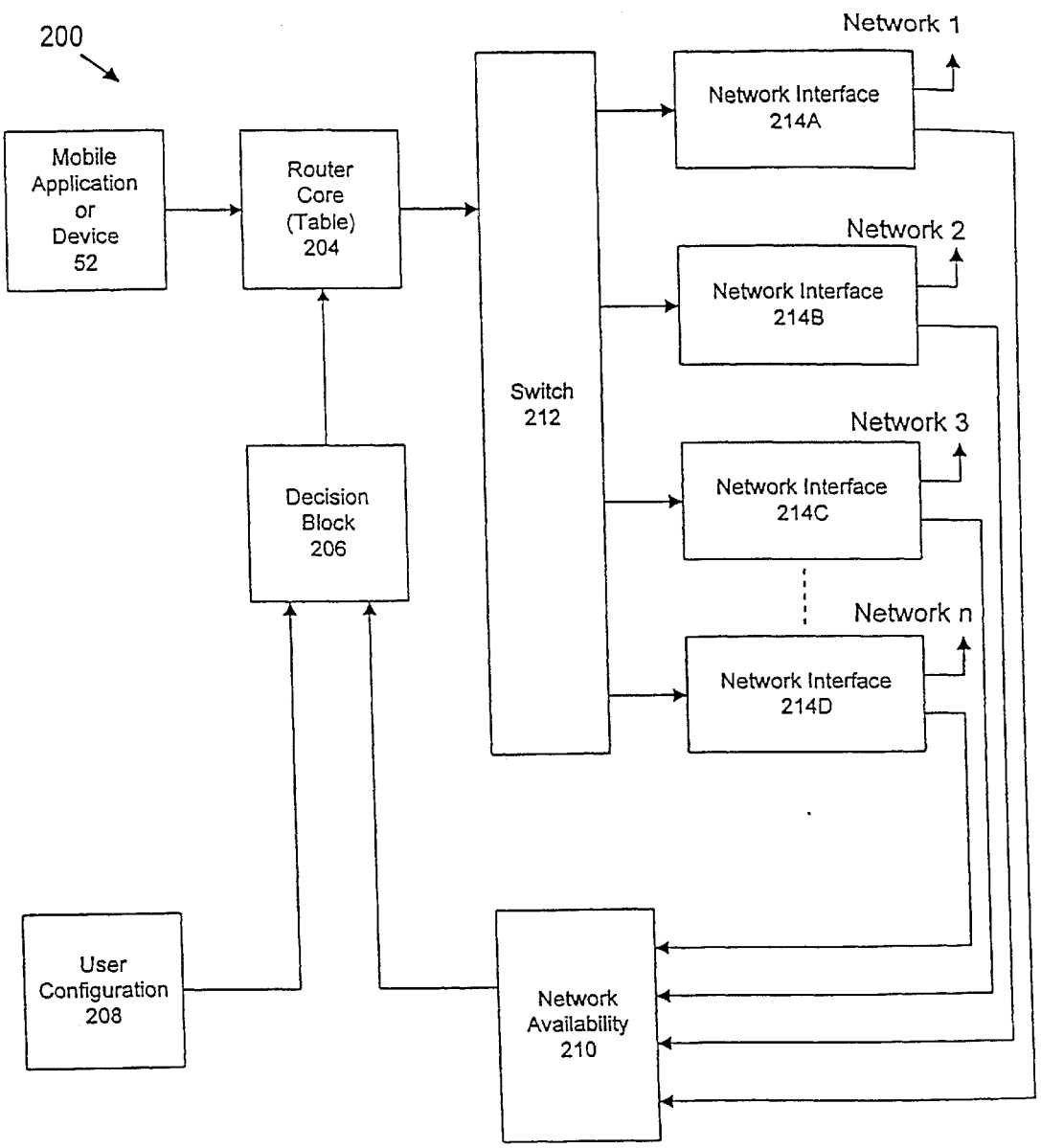
FIG. 30 illustrates a schematic block diagram of the mobile router in accordance with an aspect of the present invention.

Referring now to FIG. 30, therein is illustrated a schematic block diagram of the mobile Router 200. In the following description of the Router 200, each of the elements will be initially generally described and in greater detail thereafter. As shown in FIG. 30, the mobile application or device 52 may be attached to multiple Networks by the Router 200 through Network Interfaces 214A–D, a Router Core 204, and a Switch 212. The Network Interfaces 214A–D provide connectivity for data between the Switch 212 and the various Networks infrastructures (e.g., radio infrastructures 56 and public switch telephone network 58) through which the mobile device or application 52 connects to the communications network 10 (see FIG. 1). The Switch 212 is actuated by the Router Core 204, and sends data to a fixed host application or device (e.g., RNC 20) via the selected network. The Network Interface 214 provides information to the Network Availability process 210, which sends this information to the Decision process 206. The Decision process 206 operates in accordance with User Configured parameters 208 which specify when and through which Network the data is to be transmitted. The decision process 206 monitors the User Configuration parameters 208, and the Network Availability 210. When the Decision process 206 (in accordance with User Configuration 208 parameters) specifies that a Network (e.g., Network 3) different than the Network currently in use (e.g., Network 1) should be used, the Decision process 206 checks the Network Availability 210 for the particular Network to be switched to. If the Network is available, the Decision process 206 instructs the Router Core 204 to switch to the new Network. The Router Core 204 then updates routing tables (not shown) maintained within the Router Core 204 to reflect the new data path, and actuates the Switch 212 to connect to the new Network. Data may then flow over the new Network. In accordance with an aspect of the present invention, data may flow inbound to the fixed host through one Network, and outbound to the remote mobile Application or device 52 through the same Network, or through a different Network.

With reference to FIG. 30, the mobile application or device 52 may comprise a software application running on a portable or laptop computer performing a variety of functions as programmed by the software application (e.g., database services). The Application or device 52 may also comprise a special purpose device designed to perform a particular function, such as a credit card reader or barcode scanner. The Application or device 52 may generate a data stream which is sent to a fixed location (e.g., a host computer infrastructure 10).

An exemplary application running on the mobile device 52 is a mobile remote client application which provides the remote user with the capability to send and retrieve data from a fixed database server application. The data may consist of customer records which, for example, may be used by service personnel operating a fleet of vehicles to service customers scattered about a wide geographic area. In the exemplary application, the mobile client application may request customer records from the fixed database server, and display the records for viewing by mobile service personnel. The mobile client application may send updated records to the fixed database as the service personnel finish assigned tasks. The updated records may contain a service history, equipment upgrades, and repairs for each customer.

Another exemplary application running on the mobile device 52 may be a client application which retrieves a list of dispatched jobs to be performed by the service personnel during each day. The jobs may be uploaded to the remote mobile device 52 each morning and stored in another client application in the mobile device 52. As the service personnel change job locations, the status of each job may be updated to indicate a status, e.g., en route, arrived and finished with comments. The status may be sent from the application to the fixed home office, so a dispatcher at the home office is aware of the locations of service personnel in the field.

By way of non-limiting examples, the mobile device 52 may comprise a portable or laptop computer; a computer having an embedded Router 200; a terminal or terminal emulator; a data gathering device (e.g., a SCADA system or remote telemetry system for obtaining data from a remote location for forwarding to a central location for processing); a card-swipe reader device (e.g., credit/debit/bank cards) for use in a mobile billing application, such as a taxi or mobile food cart; a smart-card reader; a logging device, such as those used in a package delivery system or fleet; a device for reading bar codes (e.g., for inventory control); and a remote application with data to send or to receive, from a fixed application or device (e.g., remote diagnostic tool). The above-noted applications are provided merely for exemplary purpose, and other applications and mobile devices 52 may be used with the Router 200 of the present invention.

Typically the device or Application 52 sends and receives data using a variety of protocols (e.g., Internet Protocol (IP)/transparent (via MDC 54)/ack-nack, etc.). The use of a variety of protocols provides for open transport of data throughout many networks, and in particular, networks which support open standards such as IP. However, many proprietary networks which require interface and/or protocol translation remain in use. In the Router 200 of the present embodiment, the function of interfacing with networks and protocol translation may be performed by the Network Interfaces 214A–D.

According to another aspect of the invention, other types of devices may be connected to the Network Interface 214. Such devices may be used for functions other than data and voice communication. By way of non-limiting examples, these devices may include Global Positioning System (GPS) receivers and application processors.

The Router Core 204 is a function which shuttles messages between the Application or Device 52 and the various Networks. In accordance with the present embodiment, the router Core 204 may control which network of a plurality of usable network messages are to travel over, and connect access ports (described below) to each Network and the Application or Device 52.

The Router Core 204 may also comprise a list of all possible "names" or "addresses" to which data may be sent, or from which data may be received. The local "names" or "addresses" of the Router Core 204 are stored in tables within a memory (not shown) of the Router Core 204. Thus, the Router Core 204 may serve as a communications "address book" for the Router 200 of the present embodiment. The Router Core 204 also checks all messages passing through, and decides, based on the address and/or name entries in the tables, if the message is relevant to the attached Application or Device 52, or to the fixed host (e.g., RNC 20). The address of the fixed host may be stored in the Router Core table as well. In accordance with the table entries, received messages may be determined to be valid or invalid. The Router Core 204 may also actuate the Switch 212 in accordance with the output of the decision process 206. The Switch 212 is actuated such that incoming and outgoing messages can be sent through the "current" network, as determined by the decision function 206 (to be described below).

The Switch 212 may comprise a message multiplexor, i.e., the Switch 212 performs a one-to-many function for in-bound messages (to the fixed hosts), and a "many-to-one" function for outbound messages (from the fixed host). As noted above, the appropriate network selection is made by the Router Core 204 in accordance with the output of the decision process 206. Messages travel through the Switch 212, the Router Core 204, and the current Network Interface 214.

Figure 32:
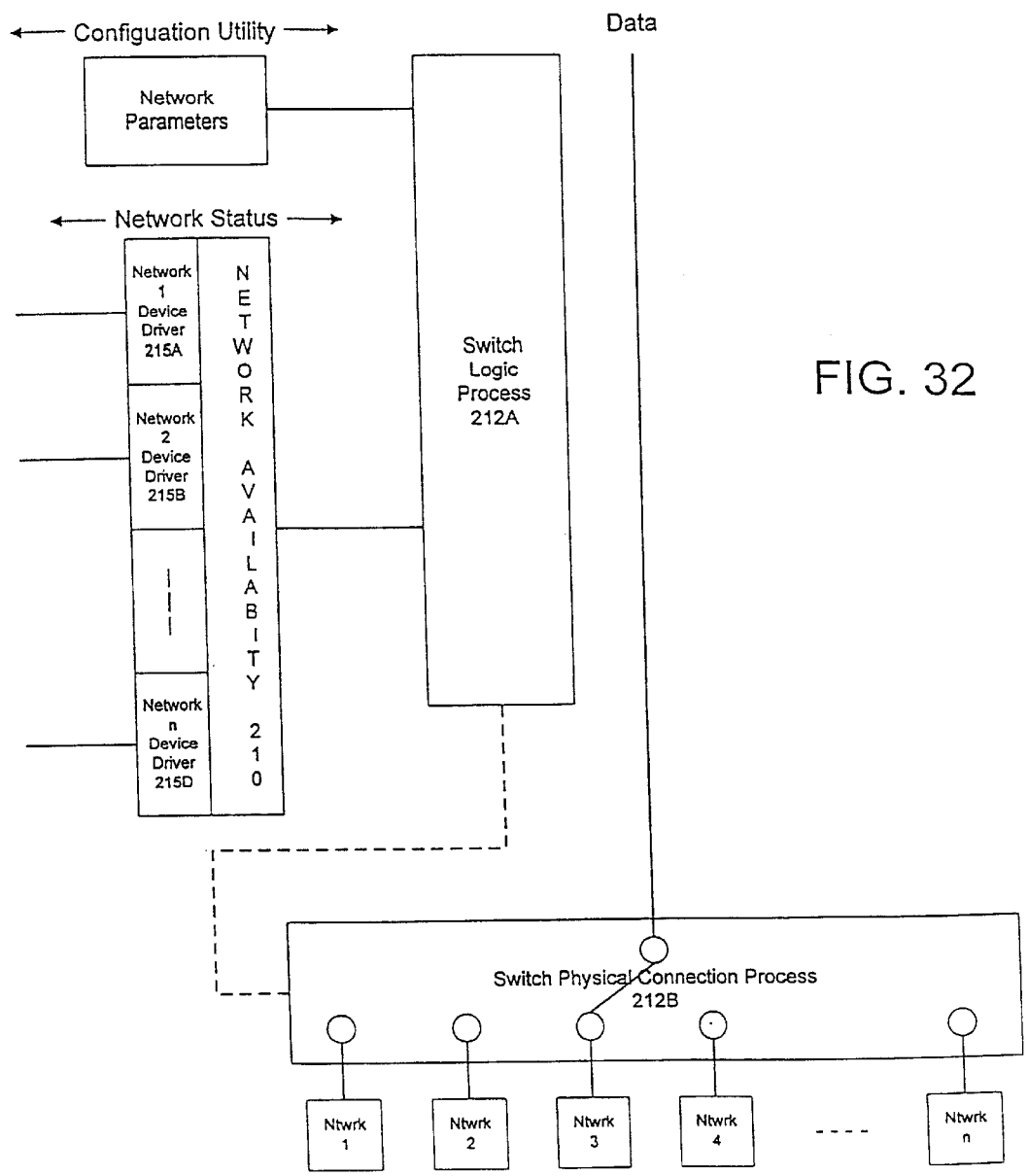
FIG. 32 is an illustration of a block diagram of the switch within the router according to the present invention.

Referring to FIG. 32, the Switch 212 may be implemented using a combination of hardware (e.g., multiple electronic ports, one per Network Interface 214) to perform the physical connection process 212B, and software (e.g., handlers which are interrupted at each character to move the character to either the Router Core 204 (outbound), or to the current Network Interface 214 (in-bound)) to perform the switch logic process 212A.

As a non-limiting exemplary hardware implementation, the Switch 212 may comprise an 80386EX microprocessor, running at 33 MHZ, 256 kilobytes of FLASH ROM, 512 kilobytes of static RAM, six asynchronous serial ports, two TTL-to-RS232 convertors interfacing with two of the six serial ports directly to compatible devices external to the Switch 212, and four internal TTL serial interfaces to internally-mounted daughter boards, which carry Network Interfaces 214A–D. Each Network Interface 214 mounted on a daughter board may include a power supply for the Network Interface, a serial interface to the 80386EX microprocessor, and an interface to the outside network. The outside network may be a radio, a LAN, an antenna (for internally-mounted radios in the Network Interface 214), or other device accepting or supplying data from/to the Router 200.

The Switching function of the Switch 212 is provided by each serial Network Interface port at the 80386EX microprocessor, and the software residing in FLASH ROM. The software logic determines which Network Interface to use for transmission and receipt of data. The decision is implemented in the Switch, by selecting a physical serial port (and therefore which Network Interface) is to be used as the current Network. The Decision software in the FLASH ROM instructs the microprocessor to send the data to a specific serial port (which is mapped to specific physical addresses within the address range of the 80386EX microprocessor). The microprocessor then constructs the next message in the message buffers in RAM, and sends the message through the specific serial port which is designated as the "current Network" Interface port. The data then goes to the Network Interface (e.g., network interface 214A) connected to that specific serial port and on to the Network infrastructure. Received data is input to the Network Interface (e.g., network interface 214B which may be set to the "current Network" serial port) and the microprocessor, where the received data is processed by the microprocessor. In accordance with an aspect of the present invention, messages which are received through Network Interfaces which are not designated as the "current Network" are ignored.

The Network Interfaces 214A–D are devices which present data to, or obtain data from the radio operating at the various R.F. Network frequencies, bandwidths, and modulations. The Network Interfaces 214A–D may provide a port through which messages pass, to and from the Switch 212. The messages are typically in the form of a sequence of serial digital bits. The Network Interfaces 214A–D also may provide a modulator/demodulator function which transforms the digital data into an analog form which may be easily sent through the R.F. Network voicepath, based on characteristics of the assigned frequency band of the R.F. Network. The characteristics of analog transmissions are typically bandwidth (in Hertz, or cycles per second), noise present in the Network, and assigned frequency of the R.F. Network. Further, the Network Interfaces may interface with a radio, which may be included within the Network Interface 214, or may be mounted externally to the Router 200 (as shown in FIG. 29). The Network interface 214 radio interface comprises the actual physical connections to the radio for the voicepath data, the muting function (if present and/or required) and the functionality for issuing a Press-to-Talk to the radio, and for receiving the Transmit Grant signal from the radio; both are used for handshaking between the radio network and the Network Interface 214. This handshaking may be necessary for proper timing of the data out onto the RF Network. The muting function is used for silencing received signals which represent data, rather than voice traffic, which enables a remote user to mute the audible noise of the data traffic, which can be annoying to the remote user.

Examples of Network Interface 214A–D include the MDC 54 and the NovaTel Wireless NRM-6812 Cellular Digital Packet Data (CDPD) modem. Where the network interface 214 comprises the MDC 54, the radio is mounted external to the MDC 54, whereas in the NovaTel example, the radio and the network interface are integrated into a single unit.

As noted above, the Network Interfaces 214 provide connections to various types of networks. These networks may be wired (for example Public Switched Telephone Network 58), or wireless (for example Cellular Digital Packet Data (CDPD)). The following non-limiting list includes networks that may be interfaced to the Router 200 by the Network Interfaces 214A–D: private voice radio including conventional and trunked radios (e.g., using MDC 54), Cellular Digital Packet Data (CDPD), Spread Spectrum (e.g., direct sequence and channel-hop), GSM, GPS receiver, satellite transponder, RDI (Ericsson) interface, AMPS, RAM Mobile (Mobitex), RS232, RS485, Angel (AT&T), Asynchronous Transfer Method (ATM), Integrated Services Digital Network (ISDN), public switched telephone network (PSTN (POTS) telephone network), Ethernet, Ardis, Personal Communications Services (PCS), and any other network which is either transparent or operates using a specific protocol.

The specific protocols to the above-listed networks are implemented in the Network Interfaces 214A–D. These protocols may be very different, and therefore incompatible with each other. Additionally, a translation device may be provided in each Network Interface 214 to translate between IP and the particular network protocol. By providing such a translation device, the Application or Device 52 can use IP data regardless of the particular network the Application or Device 52 is actually using.

Figure 31:
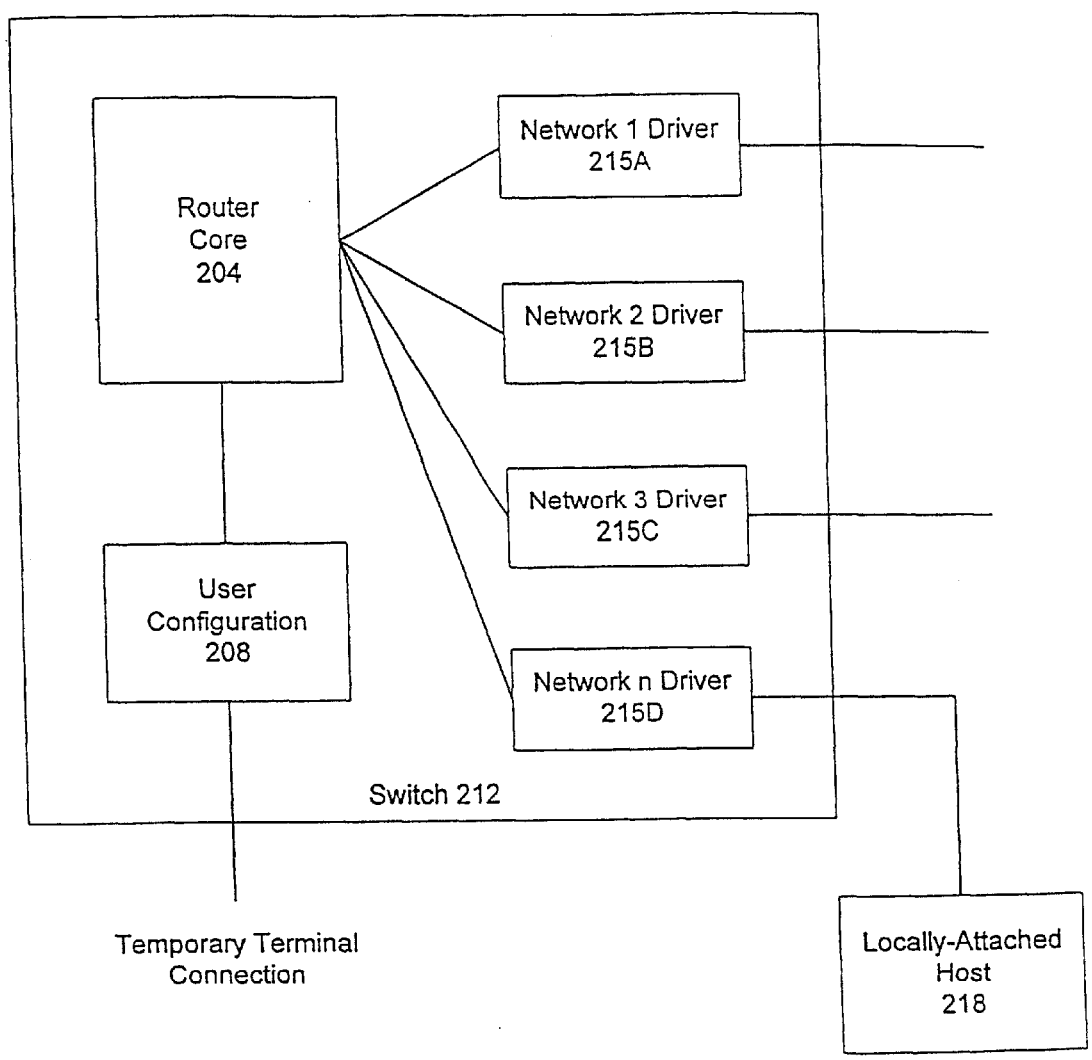
FIG. 31 is an illustration of a block diagram of the functional components of the router in accordance with an aspect of the present invention.

Referring to FIG. 31, a description of the functional components of the Router 200 will now be described. The Router 20 may be implemented as an autonomous device with multiple connections to the networks through which data is to be routed. The user Configuration Interface 208 provides a means whereby an external device such as a keyboard/terminal may be used to supply configuration information such as preferred routes, network node addresses, etc. to the router. Such information is accepted by the Configuration Interface 208 and is placed into a non-volatile store (e.g., memory) which may be queried by other router components. In addition, capability may be provided whereby diagnostic information may be requested from the router and sent to the terminal device for evaluation by a technician.

The Router Core 204 is responsible for making all routing decisions. For a given destination network address specified within a data packet or datagram received from one of the network interface drivers 215A–D, the most-preferred path will be selected and the data packet or datagram forwarded through the preferred network interface driver 215A–D. Routing decisions are generally based upon such metrics as network speed and interface availability. Other metrics such as destination network, time of day, type of data, etc. may also be incorporated into the routing decision. Further, routing decisions may be made at the packet level such that each individual packet of data may be transmitted and/or received on different networks in accordance with the user configured parameters 208.

Exemplary Network Drivers 215A–D may include an Ethernet Driver, a Token-Ring Driver, and a Serial PPP Driver. The Ethernet Driver provides a means for sending and receiving data through an Ethernet-type network. The function of the driver is to shield the Router Core from the details of network media access. The Token-Ring Driver provides a means for sending and receiving data through a Token-Ring-type network. The function of the driver is to shield the Router Core from the details of network media access. The Serial PPP Driver provides a means for sending and receiving data through a PPP-based serial data link. The function of the driver is to shield the Router Core from the details of network media access. Other drivers 215A–D may be provided to interface with other types of networks as necessary.

The Network Availability 210 (see also FIG. 30) is a function which periodically interrogates each installed Network Interface 214 in the Router 200 and may determine if the Network Interface 214 is installed; if the Network Interface 214 is properly configured and functioning properly; if the Network Interface 214 is connected to the Network, on-line, and available for sending/receiving messages; and if the Network Interface 214 is in good health. The above interrogation process may be accomplished by monitoring a timer tick (provided by the switch microprocessor), which instructs the Network Availability 210 to query each Network Interface 214. When the timer tick occurs, the Network Availability 210 function interrogates each Network Interface 214 as noted above. The status of each Network Interface 214 is then passed to the Decision process 206, which determines what the "next Network" will be if the result of the interrogation indicates that the "current Network" is experiencing transmission problems.

The Network Availability 210 of each Network Interface 214 is determined in a manner specific to the particular interfaced Network. For example, if the Network is CDPD, the Network Availability 210 interrogates the network to determine if the Network Interface 214 is currently registered with the Network, and therefore active. Also, in the CDPD network, the Network Availability 214 determines if the Received Signal Strength Indication (RSSI) is sufficient to transmit relatively error-free data. For example, in the NovaTel CDPD Network Interface a RSSI of −100 dBm will provide for good data transmission qualities. Thus, if the Network Availability 210 function queries the NovaTel CDPD Network Interface for the RSSI, and the response is −110 dBm, then the signal is too weak for error-free transmission, and therefore cannot be used at this time. This information is passed to the Decision process 206 to determine if the "current Network" should remain the "current Network", and if not, to determine what the "next Network" should be.

The User Configuration 208 block is used to define user configurable parameters by which the Router Core 204 selects the "current Network" and the "next Network". The Router parameters may include the date and time (e.g., yr-mo-da, hh:mm:ss), and the Network Interface 214 installed in each of the internal slots of the Router 200. According to the present embodiment there are six internal slots to accommodate Network Interfaces to any of private voice radio using e.g., the MDC 54 and a variety of radios, both conventional and trunked; Cellular Digital Packet Data (CDPD), such as Sierra Wireless or NovaTel CDPD modems; spread spectrum, either direct sequence, or channel-hop, as Xetron Hummingbird spread spectrum modem; GSM, such as Ericsson serial GSM module; GPS receiver, such as Motorola VP Encore GPS receiver, or Trimble SVEE Six receiver; satellite transponder; RDI (e.g., Ericsson) interface, implemented via a software protocol module and quasi-RS232 interface to radio; AMPS; RAM Mobile (e.g., Mobitex); RS232 default and fixed for example in slots 1 and 2; RS485; Angel (e.g., AT&T); ATM; ISDN; PSTN; Ethernet; Ardis; PCS; any other network which is either transparent or operates using a specific protocol; and none. Although six slots are disclosed herein, other numbers of slots may be provided.

Other user configurable parameters include: the priority of each internal slot, (e.g., 1 to 6) where the slot with priority 1 is the default startup slot and Network; baud rate of each slot (a default rate may be set to 9600 bits per second, but may be configured to be any standard baud rate, divisible by 300, up to 115.2 kilo bits per second); cost per kilobyte per slot (e.g., $0.xx per kilobyte where the least costly slot that is available and highest priority will be default); protocol per slot (e.g., none, Point to Point (PPP), Serial Line Internet Protocol (SLIP), Hayes "AT" commands, transparent); slot mode, for example, transparent, PSTN, cellular, IP, receive only; slot name or address or phone number; slot to be used for diagnostics (e.g., default may be set to slot 2); slot muting to be used (e.g., none, PL, DTMF, other); number of retry transmissions per Network Interface (per slot) before declaration of Network Interface failure (e.g, 0–10); if slot Network Interface needs to be configured before it can operate (e.g., y,n); slot to be used for remote display (e.g., default may be set to slot 2); slot to be used for Device or Application 52 (e.g., a connection to a mobile computer; default is slot 1); and frequency at which Network Availability 210 is checked (e.g., default may be set to five seconds). Other user configurable parameters may be introduced and configured as necessary.

The User Configuration 208 function provides the user with the capability to instruct the Router 200 how to select a particular Network. These metrics may include, but are not limited to: which Network is connected to which Router port, time of day and date, priority (switching sequence) of each Network, cost per packet of each Network, and preferred default Network.

On power up, the User Configuration 208 is checked to determine if it is current. If the User Configuration 208 is determined to be out of date, the end user is requested to input a configuration. The user is notified by blinking LEDs on the front panel or by a message sent to the mobile device 52. If the User Configuration 208 is determined to be current, no user input is requested.

Further, each Network is continuously evaluated for health and connectivity status. There are a number of parameters which are examined to determine this, including, but not limited to: Received Signal Strength Indication (RSSI), Clear to Send (CTS), Channel Clear/Channel Ready, and Transmit Grant.

The Decision process 206 continuously examines the User Configured parameters in the user configuration block 208, to determine the next Network to use, in case the current Network becomes unavailable to send or receive data. Such an unavailability may arise because the remote user (and consequently the Router 200) has moved beyond coverage of the Network, or because a problem has occurred with the current Network or the Network Interface 214.

After the Decision process 206 has determined the next Network to use, the decision process 206 queries the Network Availability 210. If the next Network is available, then the Decision process 206 updates the routing tables in the Router Core 204. The Router Core 204 will then actuate the Switch 212 to physically connect the next Network as the current Network.

The Decision process 206 uses the User Configuration 208 parameters defined above to determine the specific criteria for each slot, to be used when deciding if the current Network is to remain the current Network, and if not, what the next Network shall be. Once the decision process 206 has made a tentative decision to switch to another Network (i.e., the next network is to become the current network), it checks the Network Availability 210 to ascertain if the Network is actually installed, configured, on-line, and in good health. For example, if the current Network is configured as priority #3, and the Network Availability 210 of the priority #2 Network updates to, for example, "installed, configured, on-line, and in good health", then the priority #2 Network becomes the next Network. The Decision process 206 will instruct the Switch 212 to switch the priority #2 Network to the current network. Should the Decision process 206 decide to change Networks, it conveys an instruction to the Router Core 204 by instructing the Router Core 204 what the next Network Interface 214 is to be.

The process of the Decision process 206 checking the User Configuration 208 and the Network Availability 210 continues indefinitely, and is described in detail in FIGS. 33–36. Generally, the process helps to guarantee that the mobile user always has access to a Network for sending and receiving data. This process also allows what is known now as "seamless roaming". This means that the mobile user can move between Networks and continue to have reliable data transmission on the different Networks.

Figure 33:
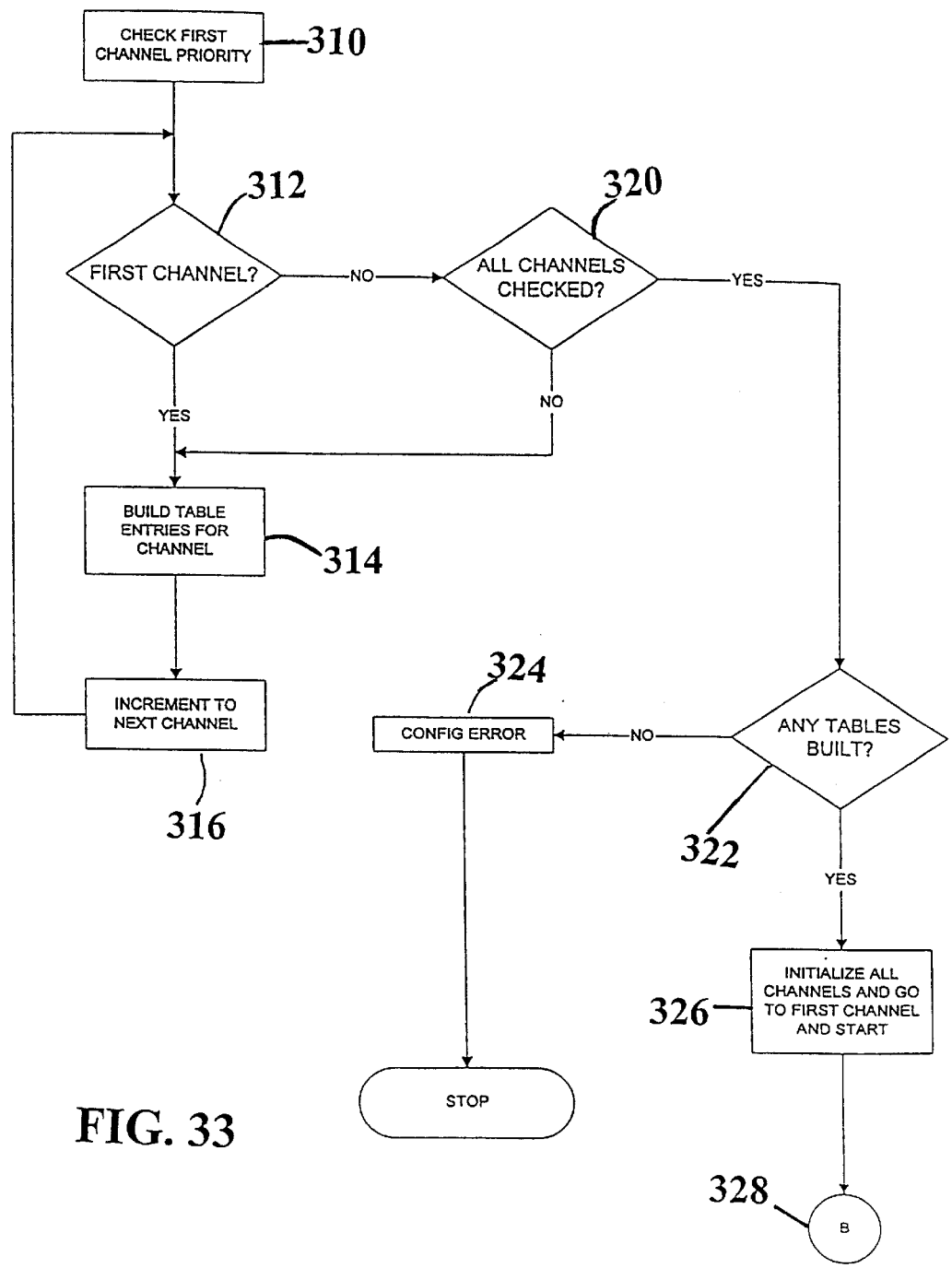
FIG. 33 is an illustration of a flow chart of the processing steps used by the router to initialize and build tables stored in the Router in accordance with an aspect of the present invention.

FIGS. 33–36 illustrate the logic of the software in the router. Referring now to FIG. 33, there is shown an exemplary initialization routine which builds the tables in the Router 200. Upon initialization of the system, at Step 310 the first channel priority is checked. At Step 312, it is determined whether or not the first channel is being examined. If it is the first channel, at Step 314, table entries for the first channel are built. Information which is included in the table may be, e.g., IP address of the destination, intervening intermediate IP addresses, the assigned port, channel priorities, and the application being used. Typically channel one is assigned the highest priority. After the tables are built, the processing increments to the next channel at step 316. From Step 316, processing returns to Step 312. If at Step 312 it is determined that the channel being checked is not the first channel, processing proceeds to Step 320 to query whether all channels have been checked. If all channels have not been checked, processing returns to Step 314 to continue building the table entries via steps 314 and 316 until all channels have been checked.

Once it has been determined that all channels have been checked, at Step 322 it is determined whether any tables have been built. If no tables have been built, at Step 324 a configuration error is recognized and the processing stops. Tables may not have been built previously, e.g., if there are problems with the IP address, i.e., there was no destination address. If at Step 322 it is determined tables were already built, processing proceeds to Step 326 where all channels are initialized and data transportation begins via the first channel.

Figure 35:
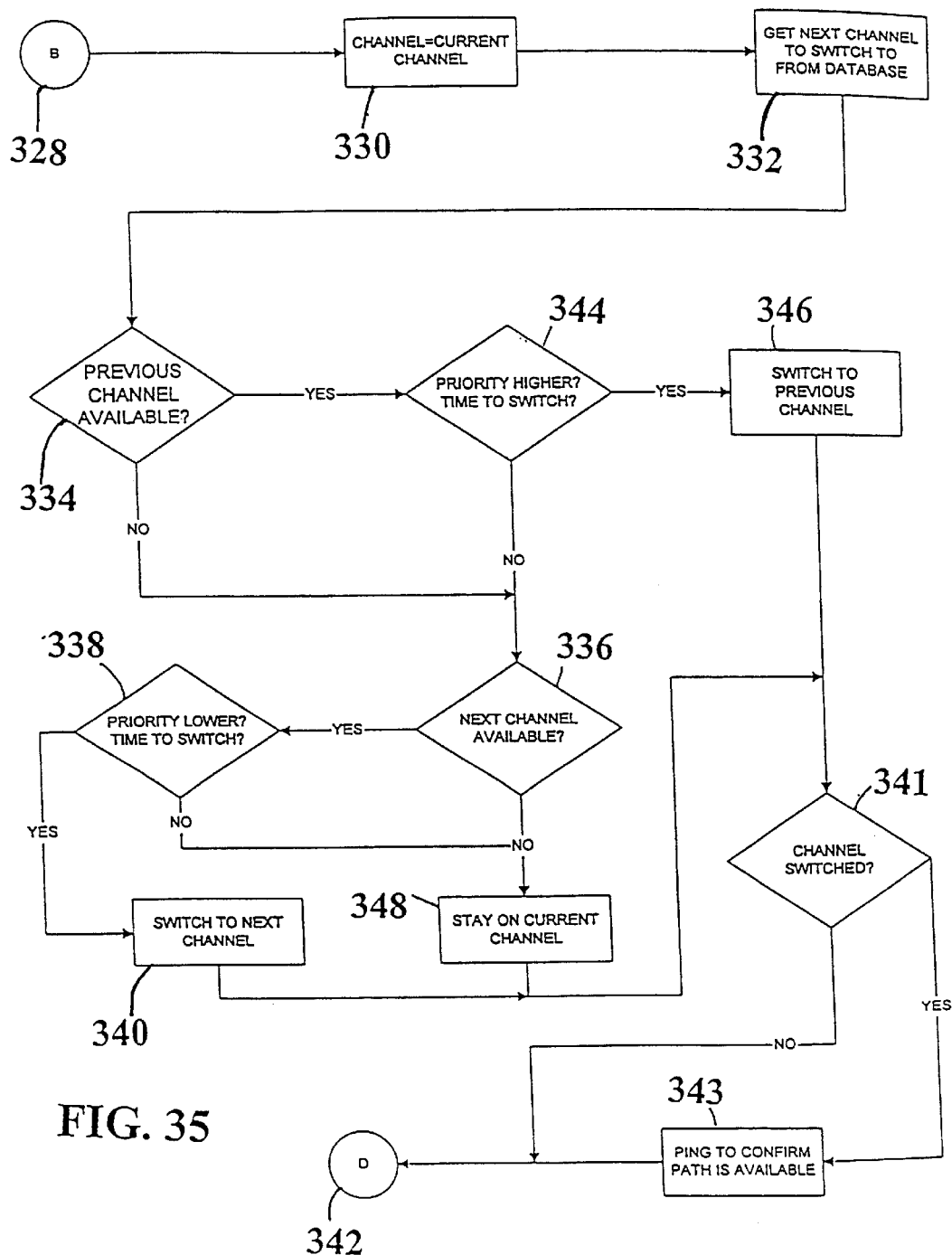
FIG. 35 is a flow chart of the processing steps used by the router to account the availability of the channels and the user's configuration in order to decide which channel to use for transporting data in accordance with an aspect of the present invention.

From Step 326 the processing proceeds to Step 328, also shown in FIG. 35, which illustrates an exemplary flow diagram of the Router 200 logic for accounting the Network Availability 210 (FIG. 30) and User Configuration 208 (FIG. 30) to decide which channels to use for data transport. Beginning at Step 328, processing proceeds to Step 330 where the channel is set to the current channel in a database which is described in more detail below. From there, processing proceeds to Step 332 to retrieve the next channel to switch to from the database. The database is stored in flash memory and contains configuration information for each channel including how each channel is set up in the Router 200 and what configuration values are for each Network Interface 214A–D. In addition, the database stores which channel is current and the history of previous current channels. The tables discussed with reference to FIG. 33 at Step 314 are also stored in the database.

At step 334 a determination is made as to whether the previous channel is available. Of course if this is the first time through, no previous channel will exist. If the previous channel is not available, at Step 336 a determination is made as to whether the next channel is available. If the next channel is available, at Step 338 a determination is made as to whether or not the priority is lower and it is time to switch. The determination is made by looking at the information in the User Configuration 208 (FIG. 30). If it is time to switch, at Step 340 a switch to the next channel is made. From there, processing continues to step 341, where it is determined if the channel was switched. If the channel was switched, processing continues to step 343 where a ping is sent to confirm the path is available. From step 343, the processing continues to Step 342, also shown in FIG. 34. If, at step 341, it is determined the channel was not switched, processing continues to step 342.

Returning to Step 334, if it is determined that a previous channel is available, at Step 344 an inquiry is made as to whether or not the previous channel has a higher priority and it is time to switch. The determination is made by consulting the information in the User Configuration 208 (FIG. 30). If it is determined the previous channel is a higher priority and it is time to switch, at Step 346 a switch to the previous channel is made. From Step 346, the processing proceeds to Step 341 as previously described.

If at Step 344 it is determined that it is not time to switch and the priority is not higher, processing proceeds to Step 336 where it is determined whether the next channel is available. If the next channel is not available, at Step 348 the current channel is not switched and the processing proceeds to Step 341 as described above. If at Step 336 the next channel is available, then at Step 338 the inquiry into priority and time to switch is made as previously described. At Step 338, if it is not time to switch and the priority of the next channel is not lower, the Router 200 stays on the current channel at Step 348.

Figure 34:
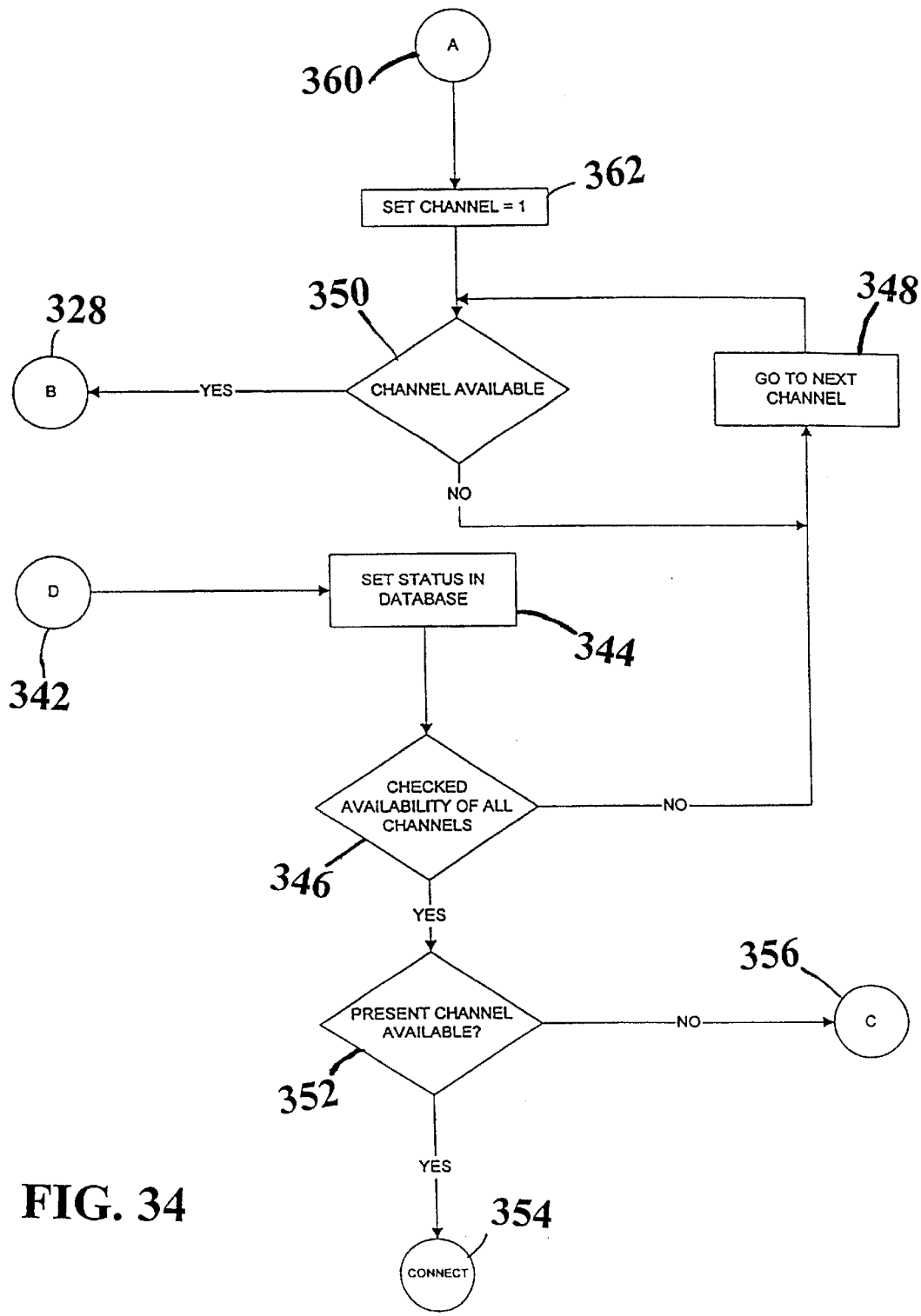
FIG. 34 is a flow chart of the processing steps used by the router for checking availability of each network interface in accordance with an aspect of the present invention.

Refer now to FIG. 34 which illustrates a flow chart of exemplary logic for checking the availability of each network interface. Starting at Step 342 processing proceeds to Step 344 where the status of the channel being used is recorded in the database. Furthermore, at Step 344, the Router 200 front panel LED's are updated. If at Step 346 it is determined the availability of all channels has not been checked, at Step 348 the next channel is identified and at Step 350 the next channel's availability is polled. A channel is not available if it is being used for a mobile device 52 i.e. the channel is already one end of the network. If the channel is not available, the processing returns to step 348. If the channel is determined to be available at step 350, processing proceeds to Step 328 also shown in FIG. 35.

If at Step 346 it is determined that the availability of all channels has been checked, at Step 352 the availability of the present channel is determined. If the present channel is available, a connection is made at Step 354. If the present channel is not available, processing proceeds to Step 356 for error handling. The error handling procedure is discussed with reference to FIG. 36 below. Upon completion of the error handling procedure, at Step 360 the channel is set equal to one at Step 362. At Step 350, the procedure continues as previously described.

Figure 36:
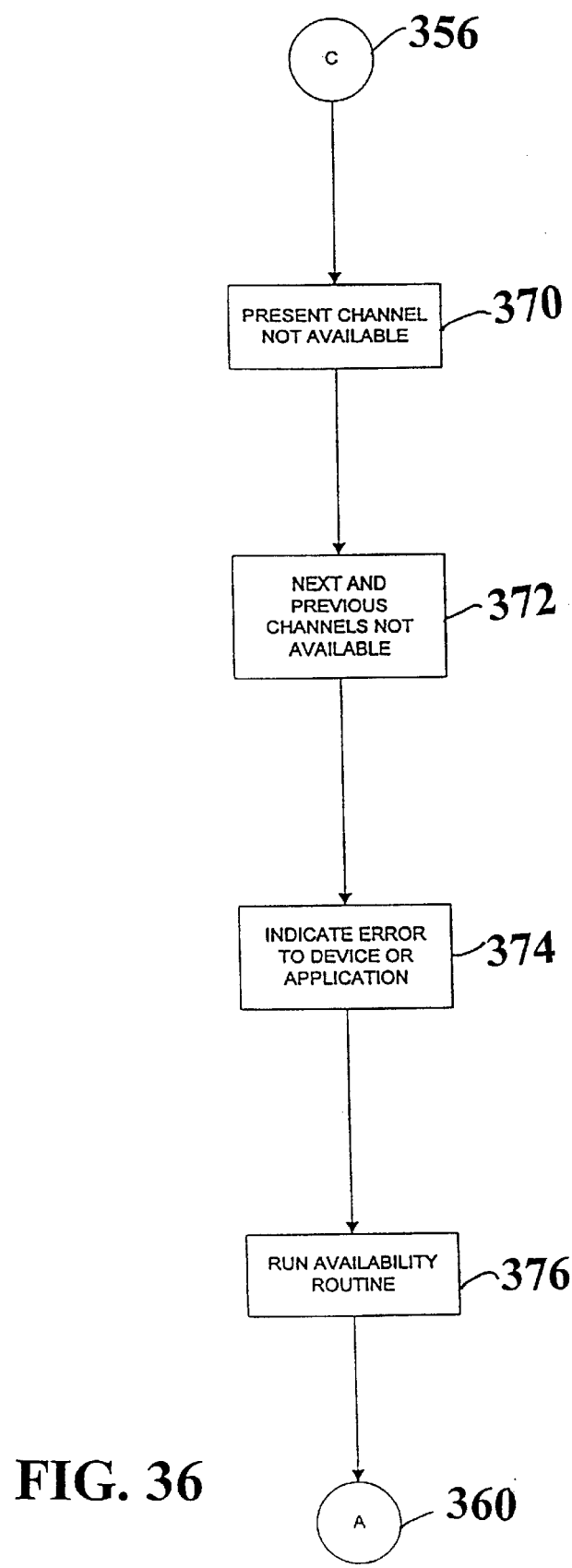
FIG. 36 is a flow chart of the processing steps used by the router for an error handler in accordance with an aspect of the present invention.

Referring now to FIG. 36, which is an exemplary flow diagram of the Router, 200 error handling logic, Step 356 continues from FIG. 34. At Step 370, the present channel is deemed to be non-available. At Step 372, the next and previous channels are also confirmed to be non-available. At Step 374 an error is indicated to the device or application. At Step 376 an availability routine is run such as that described previously. From the availability routine at Step 36, the processing continues to Step 360 as discussed with reference to FIG. 34.

The Router 200 of the present invention may be used inside a mobile vehicle, or carried by a person in a portable application. Further, the Router 200 may be provided as an external component connected to a portable device (e.g., a laptop computer) or may be implemented within the portable device, such that the portable device and the Router 200 are provided as one integrated unit. Further, the Router 200 may be used in conjunction with, or integrated into measuring and testing equipment, and transmission equipment. Such a remote device may be needed for very remote monitoring applications, such as wildlife studies, etc., necessitating the use of multiple Networks.

Figure 37:
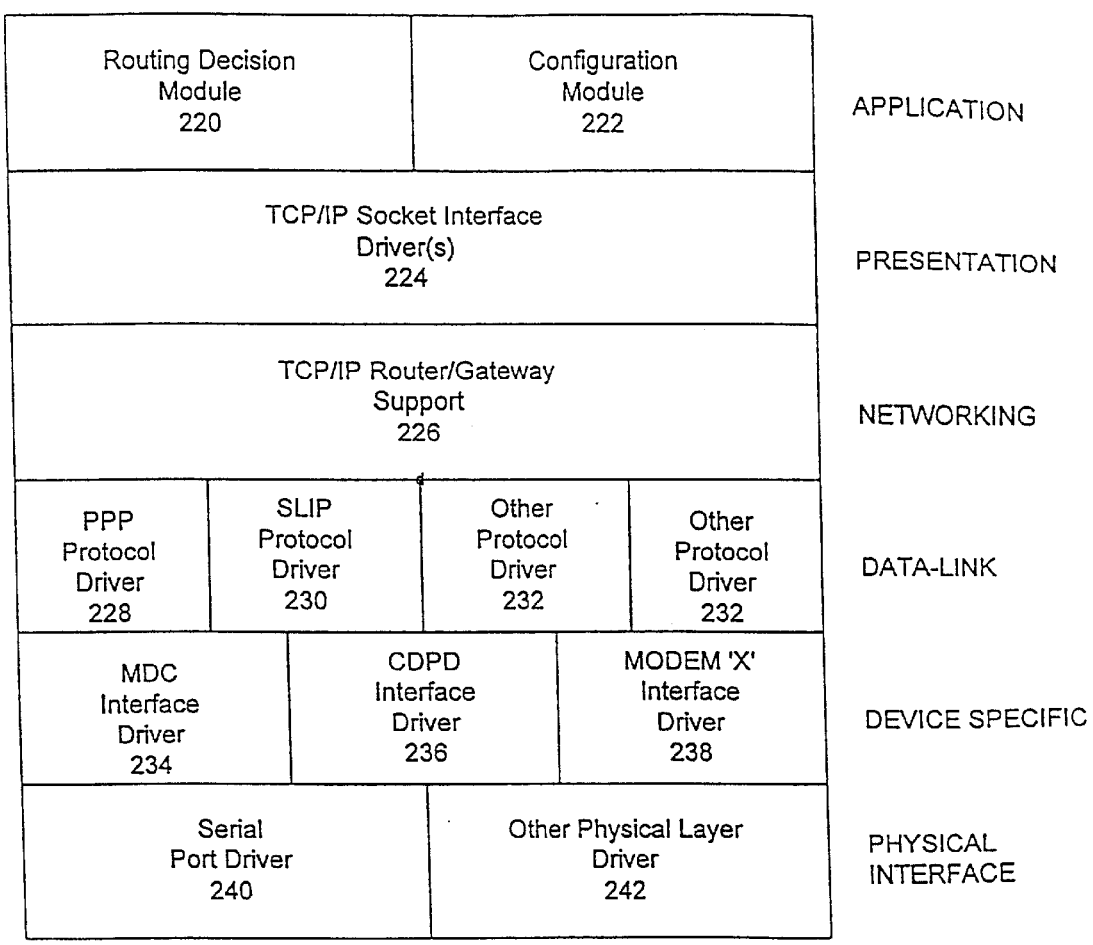
FIG. 37 is an illustration of the software architecture of the Router in accordance with an embodiment of the present invention.

Referring now to FIG. 37, there is shown the software architecture 219 of the Router 200 in accordance with an embodiment of the present invention. The architecture is strictly layered in that data flows only vertically between adjacent layers. The definition of each layer will now be described.

The Application layer consists of various processes that perform services directly related to the function(s) for which the device is defined. This includes such services as defining a device configuration, making decisions about which route to select for the transport of data and performing various diagnostic functions.

The Presentation layer consists of a protocol-independent insulating layer between the applications and the lower-level networking functions. The Presentation layer implements a Berkley sockets compliant application programming interface (API).

The Networking layer performs all processing related to handling the Internet Protocol (IP). The main function of the networking layer in this environment is the routing of data passed into the layer from either above or below back out through selected Network Interfaces to deliver that data to the intended destination. The relationship of destination and network interface is maintained by the Configuration Module and Routing Decision Module applications.

The Data-Link layer provides logical Network Interfaces through which the Networking Layer may send and receive data. One or more of these Network Interfaces may be active at any time. At least one network interface must be active for the device to function properly. The main purpose of the Data-Link layer is to insulate the Networking layer from the details of the many link-level protocols used to transport data.

The Device-Specific layer deals with the details of establishing and maintaining data communications through various types of communication devices such as radios, modems and data controllers. Each Device-Specific driver handles the vagaries of configuring and interfacing with various types of communication devices while presenting a uniform interface to the Data-Link layer.

The Physical Interface layer handles the direct interface to external components. For example: A serial port driver may handle the sending and receiving of individual data bytes through a specific type of serial controller such as an Intel 8250.

A description of the functionality supported by various module blocks as presented in FIG. 37 will now be described.

The Configuration Module 222 is an Application layer module that allows a technician to maintain a database of device configuration information. A technician may access the Configuration Module via a diagnostic serial port. Another implementation may allow a technician to access the Configuration module through any of the defined Network Interfaces via a standard socket.

The Routing Decision Module 220 selects the preferred network interface through which outbound data is transmitted. This decision is based upon a variety of metrics including: Interface availability; Time of day; Type of service required; Interface priority and others. Examples of various routing metric schemes are presented later.

The TCP/IP Socket Interface 224 supports an Application Programming Interface (API) which, for example, conforms to the standard Berkley sockets paradigm. Its purpose is to shield the Application Layer from the details of the underlying networking protocols. It allows different network implementations to be employed without the applications being required to adapt.

The TCP/IP Router/Gateway 226 implements standard IP host support with the additional capability of being able to act as a gateway between multiple networks. IP datagrams received by this layer that are not destined for a local IP host address are forwarded through the network interface that is currently designated as the preferred route for the given destination address. It is possible that the management and selection of preferred routes is implemented by the Routing Decision Module 220 in the Application layer.

The PPP Protocol Driver 228 provides a network interface whose data-link protocol conforms to the Point-To-Point protocol standard. The SLIP Protocol Driver 230 provides a network interface whose data-link protocol conforms to the Serial-Line Internet Protocol de facto standard. Other protocol drivers 230 may be implemented which provide Network Interfaces which support either existing protocols or future protocols. The intent is to convey that the underlying link-layer protocol is transparent to the upper and lower layers and that additional protocols may be easily supported.

The MDC Interface Driver 234 provides device-specific support for Mobile Data Controller 54, as described above. The CDPD Interface Driver 236 provides device-specific support for a Cellular Digital Packet Data controller. Other device-specific drivers, e.g., Modem "X" Interface Driver 238 may be implemented to support current or future devices.

The Serial Port Driver 240 deals with the hardware aspects of asynchronous serial data communications such as manipulating a Serial I/O controller or other such external interface. Other physical layer drivers 242 may be implemented which support different external interface devices either existing or in the future.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

For example, the router of the present invention may be included as an internal component of the mobile device, proving for an integrated mobile device. Optionally, the router may be implemented entirely as a software process running on, for example, a portable personal computer. In such an implementation, the internal slot(s) of the personal computer may be provided with network interface(s) and a software program may serve as the router core. Further, data may be routed to the different networks at another level than at the packet level. For example, entire messages may be routed over various networks if such a configuration is required.

What is claimed is:

1. A method for dynamically routing data over multiple dissimilar parallel wireless networks that are each monitored for status information, the method comprising:

maintaining a priority of each wireless network, the priorities indicating a most preferred path;

determining availability of each wireless network based upon status information associated with each wireless network;

indicating a current most preferred network from the wireless networks determined to be available, the indication being based upon the network priorities;

switching from a current network, which is dissimilar from the current most preferred network, to the current most preferred network during a transmission, at least one of the current network and current most preferred network being time continuous; and remaining connected to the current network for a period of time after switching to the current most preferred network.

2. The method of claim 1, in which the multiple wireless networks are simultaneously in coverage.

3. The method of claim 1, further comprising defining priorities based upon user defined criteria.

4. The method of claim 1, in which the switching further comprises switching to a higher priority network when the higher priority network becomes available.

5. The method of claim 1, in which the switching further comprises not switching to a lower priority network when a higher priority network is available.

6. The method of claim 1, further comprising dynamically modifying the priority of each wireless network.

7. The method of claim 1, in which the selecting further comprises selecting based upon information in addition to the network priorities.

8. The method of claim 7, in which the information comprises cost for each transmission.

9. The method of claim 1, in which the determining availability further comprises determining if a previous network is available; and the selecting further comprises selecting the previous network as the current most preferred network when the previous network is available and the previous network is a higher priority than a current network.

10. The method of claim 9, in which the determining availability further comprises determining if a next network is available when the previous network is not available; and the selecting further comprises selecting the next network as the current most preferred network when the next network is available and the next network is a higher priority than the current network.

11. The method of claim 10, in which the determining availability further comprises determining if a next network is available when the previous network is a lower priority than the current network; and the selecting further comprises selecting the next network as the current most preferred network when the next network is available and the next network is a higher priority than the current network.

12. A method for transmitting data from a local device through a plurality of dissimilar parallel wireless networks, at least two of the networks having different transmission formats, the method comprising:

receiving data from the local device in a first format;

selecting a first network from the plurality of wireless networks;

switching to the first wireless network;

converting the received data from the first format to a second format that is required by the selected first wireless network;

transmitting the converted data through the selected first wireless network;

restoring the data to the first format after transmission through the first wireless network occurs;

selecting a second network from the plurality of wireless networks, the second network being dissimilar from the first network;

switching to the second network; and transmitting the data received in the first format through the selected second wireless network;

wherein a transmission occurs from the local device while switching from the first wireless network to the second wireless network and/or while switching from the second wireless network to the first wireless network;

and wherein after switching networks the local device remains connected to both the first network and the second network for a period of time.

13. The method of claim 12, further comprising:

converting the data received from the first format to a third format required by the selected second wireless network, after switching to the second network;

wherein the transmitting of the data received in the first format further comprises transmitting the data converted to the third format through the selected second wireless network and restoring the data to the first format after the transmission through the second wireless network occurs.

14. The method of claim 13, in which the second format comprises an IP based format and the third format comprises a non-IP based format.

15. The method of claim 13, in which the second format comprises a non-IP based format and the third format comprises another non-IP based format that is dissimilar from the second format.

16. The method of claim 13, in which the second format comprises an IP based format and the third format comprises another IP based format that is dissimilar from the second format.

17. A computer readable medium storing a program for dynamically routing data over multiple dissimilar parallel wireless networks that are each monitored for status information, the medium comprising:

a priority code segment that maintains a priority of each wireless network, the priorities indicating a most preferred path;

an availability code segment that determines availability of each wireless network based upon status information associated with each wireless network;

an indicating code segment that indicates a current most preferred network from the wireless networks determined to be available, the indication being based upon the network priorities;

a switching code segment that switches from a current network, which is dissimilar at a link layer from the current most preferred network, to the current most preferred network during a transmission while remaining connected to the current network for a period of time after switching to the current most preferred network.

18. The medium of claim 17, further comprising a defining code segment that defines priorities based upon user defined criteria.

19. The medium of claim 17, further comprising a modifying code segment that dynamically modifies the priority of each wireless network.

20. The medium of claim 17, in which the selecting code segment further selects based upon information in addition to the network priorities.

21. The medium of claim 20, in which the information comprises cost for each transmission.

22. The medium of claim 17, in which the availability code segment further comprises determining if a previous network is available; and the selecting code segment further comprises selecting the previous network as the current most preferred network when the previous network is available and the previous network is a higher priority than a current network.

23. The medium of claim 22, in which the availability code segment further comprises determining if a next network is available when the previous network is not available; and the selecting code segment further comprises selecting the next network as the current most preferred network when the next network is available and the next network is a higher priority than the current network.

24. The medium of claim 23, in which the availability code segment further comprises determining if a next network is available when the previous network is a lower priority than the current network; and the selecting code segment further comprises selecting the next network as the current most preferred network when the next network is available and the next network is a higher priority than the current network.

25. A computer readable medium storing a program for transmitting data from a local device through a plurality of dissimilar parallel wireless networks, at least two of the networks having different transmission formats, the medium comprising:

a receiving code segment that receives data from the local device in a first format;

a first selecting code segment that selects a first network from the plurality of wireless networks;

a first switching code segment that switches to the first wireless network;

a first converting code segment that converts the received data from the first format to a second format that is required by the selected first wireless network;

a first transmitting code segment that transmits the converted data through the selected first wireless network;

a first restoring code segment that restores the data to the first format after transmission through the first wireless network occurs;

a second selecting code segment that selects a second network from the plurality of wireless networks, the second network being dissimilar from the first network;

a second switching code segment that switches to the second network; and a second transmitting code segment that transmits the data received in the first format through the selected second wireless network;

wherein a transmission occurs from the local device while switching from the first wireless network to the second wireless network and/or while switching from the second wireless network to the first wireless network, and wherein after switching networks the local device remains connected to both the first network and the second network for a period of time.

26. The medium of claim 25, further comprising:

a second converting code segment that converts the data received from the first format to a third format required by the selected second wireless network, after switching to the second network;

wherein the second transmitting code segment further comprises transmitting the data converted to the third format through the selected second wireless network and a second restoring code segment that restores the data to the first format after the transmission through the second wireless network occurs.

27. The medium of claim 26, in which the second format comprises an IP based format and the third format comprises a non-IP based format.

28. The medium of claim 26, in which the second format comprises a non-IP based format and the third format comprises another non-IP based format that is dissimilar from the second format.

29. The medium of claim 26, in which the second format comprises an IP based format and the third format comprises another IP based format that is dissimilar from the second format.

30. A router for dynamically routing data over multiple dissimilar parallel wireless networks that are each monitored for status information, the router comprising:

a priority system that maintains a priority of each wireless network, the priorities indicating a most preferred path;

a plurality of transmitters, each transmitter operating with one of the wireless networks:

a determining system that determines availability of each wireless network based upon status information associated with each wireless network;

an indicator that indicates a current most preferred network from the wireless networks determined to be available, the indication being based upon the network priorities; and a switch that switches from a current network, which is dissimilar from the current most preferred network, to the current most preferred network during a transmission while remaining connected to the current network for a period of time after switching to the current most preferred network.

31. The router of claim 30, further comprising a modification system that dynamically modifies the priority of each wireless network.

32. The router of claim 30, in which the selector selects based upon information in addition to the network priorities.

33. The router of claim 32, in which the information comprises cost for each transmission.

34. A router for transmitting data from a local device through a plurality of dissimilar parallel wireless networks, at least two of the networks having different transmission formats, the router comprising:

a receiver that receives data from the local device in a first format;

a first selector that selects a first network from the plurality of wireless networks;

a first switch that switches to the first wireless network;

a first converter that converts the received data from the first format to a second format that is required by the selected first wireless network;

a first transmitter that transmits the converted data through the selected first wireless network;

a first restoring system that restores the data to the first format after transmission through the first wireless network occurs;

a second selector that selects a second network from the plurality of wireless networks, the second network being dissimilar from the first network;

a second switch that switches to the second network; and a second transmitter that transmits the data received in the first format through the selected second wireless network;

wherein a transmission occurs from the local device while switching from the first wireless network to the second wireless network and/or while switching from the second wireless network to the first wireless network, and wherein after switching networks the local device remains connected to both the first network and the second network for a period of time.

35. The router of claim 34, further comprising:

a second converter that converts the data received from the first format to a third format required by the selected second wireless network, after switching to the second network;

wherein the second transmitter transmits the data converted to the third format through the selected second wireless network and the router further comprises a second restoring system that restores the data to the first format after the transmission through the second wireless network occurs.

36. The router of claim 35, in which the second format comprises an IP based format and the third format comprises a non-IP based format.

37. The router of claim 35, in which the second format comprises a non-IP based format and the third format comprises another non-IP based format that is dissimilar from the second format.

38. The router of claim 35, in which the second format comprises an IP based format and the third format comprises another IP based format that is dissimilar from the second format.

39. A computer readable medium storing a program for dynamically routing data over multiple dissimilar parallel wireless networks that are each monitored for status information, the medium comprising:

an availability code segment that ascertains availability of at least two of the wireless networks based upon the status information;

a determining code segment that determines whether to switch between networks when at least two networks are available, in response to a user configuration and each network's speed; and a switching code segment that switches from a first available network to a second available network, which is dissimilar at a link layer from the first available network, during a transmission while remaining connected to both the first network and the second network for a period of time.

40. The medium of claim 39, in which the availability code segment further comprises a pinging code segment that pings at least two of the wireless networks.

41. The medium of claim 39, in which the status information comprises a received signal strength of each wireless network.

42. The medium of claim 39, in which the switching occurs when the second network is faster than the first network.

43. The medium of claim 39, in which the switching occurs when the second network has a higher priority than the first network.

44. The medium of claim 39, further comprising a packet size code segment that determines a packet size prior to transmitting data.

45. The medium of claim 39, in which one of the dissimilar networks comprises a CDPD network.

46. The medium of claim 39, in which one of the dissimilar networks comprises a GSM network.

47. The medium of claim 39, in which one of the dissimilar networks comprises a EDACS network.

48. The medium of claim 39, in which one of the dissimilar networks comprises a satellite network.

49. The medium of claim 39, in which the availability code segment further comprises periodically checking the status of the networks.

50. A method for dynamically routing data over multiple dissimilar parallel wireless networks that are each monitored for status information, the method comprising:

ascertaining availability of at least two of the wireless networks based upon the status information;

determining whether to switch between networks when at least two networks are available, in response to a user configuration and each network's speed;

switching from a first available network to a second available network during a transmission, the second network being dissimilar from the first network;

stopping transmitting over the first available network after switching to the second available network; and remaining connected to the first network for a period of time after switching to the second network.

51. A computer readable medium storing a program for dynamically routing data over multiple dissimilar parallel wireless networks that are each monitored for status information, the medium comprising:

an availability code segment that determines availability of at least two of the wireless networks;

an identifying code segment that identifies a current most preferred network from the wireless networks determined to be available, the identification being based upon a type of data being transmitted; and a switching code segment that switches from a current network, which is dissimilar from the current most preferred network, to the current most preferred network during a transmission and remains connected to the current network for a period of time after switching.

52. The medium of claim 51 in which the availability code segment further comprises a pinging code segment that pings at least two of the wireless networks.

53. The medium of claim 51 in which the status information comprises a received signal strength of each wireless network.

54. The medium of claim 51, in which the availability code segment further comprises periodically checking the status of the networks.

55. The medium of claim 51, in which the switching occurs when the current most preferred network has a higher priority than the current network.

56. The medium of claim 51, further comprising a packet sizing code segment that determines a packet size prior to transmitting data.

57. The medium of claim 51, in which one of the dissimilar networks comprises a CDPD network.

58. The medium of claim 51, in which one of the dissimilar networks comprises a GSM network.

59. The medium of claim 51, in which one of the dissimilar networks comprises a EDACS network.

60. The medium of claim 51, in which one of the dissimilar networks comprises a satellite network.

61. A method for dynamically routing data over multiple dissimilar parallel wireless networks that are each monitored for status information, the method comprising:

determining availability of at least two of the wireless networks;

identifying a current most preferred network from the wireless networks determined to be available, the identification being based upon a type of data being transmitted;

switching from a current network, which is dissimilar from the current most preferred network, to the current most preferred network during a transmission; and remaining connected to the current network for a period of time after switching to the current most preferred network.

62. A method for dynamically routing data over multiple dissimilar parallel wireless networks that are each monitored for status information, the method comprising:

determining availability of at least two of the wireless networks;

identifying a current most preferred network, when multiple wireless networks are determined to be available, the identification being based upon a speed of each available network; and switching from a current network, which is dissimilar at a link layer from the current most preferred network, to the current most preferred network during a transmission; and remaining connected to the current network for a period of time after switching to the current most preferred network.

63. The method of claim 62, further comprising determining a packet size prior to transmitting data.

64. The method of claim 62, in which one of the dissimilar networks comprises a CDPD network.

65. The method of claim 62, in which one of the dissimilar networks comprises a GSM network.

66. The method of claim 62, in which one of the dissimilar networks comprises a EDACS network.

67. The method of claim 62, in which one of the dissimilar networks comprises a satellite network.

68. A mobile system, comprising:

a local device comprising a database server application, the local device residing on a local area network;

a server connected to the local device via the local area network, the server being connected to a plurality of incompatible wireless networks; and a mobile device connected to the plurality of incompatible wireless networks, the mobile device being associated with a plurality of transmitters, each transmitter operating with one of the dissimilar networks, the mobile device comprising a client application that enables a remote user to send and retrieve data from the database server application via the server, the mobile device sending data to the database server application via at least two of the plurality of incompatible wireless networks while switching between the at least two incompatible wireless networks, and remaining connected to the at least two incompatible wireless networks for a period of time after switching.

69. A mobile system, comprising:

a local device residing on a local area network, the local device storing a list of jobs to be performed by field service personnel;

a server connected to the local device via the local area network, the server being connected to a plurality of incompatible wireless networks; and a mobile device connected to the plurality of incompatible wireless networks, the mobile device comprising a client application that retrieves the list of jobs to be performed by field service personnel, and that updates a job status, the updated job status being sent to the local device via the server to inform a dispatcher of locations of field service personnel, the updated status being transmitted via at least two of the plurality of incompatible wireless networks while switching between the at least two incompatible wireless networks, and remaining connected to the at least two incompatible wireless networks for a period of time after switching.

70. A computer readable medium storing a program that enables switching between a plurality of incompatible wireless networks connected between a server and a mobile device, the server being connected to a local device via a local area network, comprising:

a transmitting code segment that transmits an updated job status via the server to the local device to inform a dispatcher of locations of field service personnel, the updated status being transmitted via at least two of the plurality of incompatible wireless networks while switching between the at least two incompatible wireless networks, and remaining connected to the at least two incompatible wireless networks for a period of time after switching, the job status being updated by an application that also retrieves a list of jobs to be performed by field service personnel from the local device.

71. A method for dynamically routing data over multiple dissimilar parallel wireless networks that are each monitored for status information, the multiple wireless networks being simultaneously in coverage, each wireless network being associated with a transmitter, the method comprising:

maintaining a priority of each wireless network, the priorities indicating a most preferred network;

determining availability of each wireless network based upon status information associated with each wireless network, including determining if a previous network is available, and determining if a next network is available when the previous network is not available or is a lower priority than a current network;

indicating a current most preferred network from the wireless networks determined to be available, the indication being based upon the network priorities, the current most preferred network comprising the previous network when the previous network is available and the previous network is a higher priority than the current network, which is dissimilar at the link layer from the current most preferred network;

switching from the current network to the current most preferred network, which has a higher priority, during a transmission when the higher priority network becomes available;

interrupting transmitting over the current network after switching to the current most preferred network; and remaining connected to the current network for a period of time after switching to the current most preferred network.

72. A computer readable medium storing a program that enables switching between a plurality of dissimilar wireless networks, at least one of the dissimilar networks comprising a GSM network connected between a server and a mobile device, the server being connected to a local device via a local area network, comprising:

an availability code segment that periodically checks the status of the dissimilar networks, including the GSM network; and a transmitting code segment that transmits an updated job status via the server to the local device to inform a dispatcher of locations of field service personnel, the updated status being transmitted via at least two of the plurality of dissimilar networks while switching between the at least two dissimilar networks when a second of the dissimilar networks is faster than a first of the dissimilar networks and when the second network has a higher priority than the first network, and remaining connected to the at least two dissimilar networks for a period of time after switching, the job status being updated by an application that also retrieves a list of jobs to be performed by field service personnel from the local device.

\* \* \* \* \*